United States Patent
Imes et al.

(10) Patent No.: US 9,164,524 B2
(45) Date of Patent: *Oct. 20, 2015

(54) METHOD OF MANAGING A SITE USING A PROXIMITY DETECTION MODULE

(71) Applicant: Allure Energy, Inc., Austin, TX (US)

(72) Inventors: Kevin R. Imes, Austin, TX (US); James Hollister, Round Rock, TX (US)

(73) Assignee: Allure Energy, Inc., Austin, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/066,232

(22) Filed: Oct. 29, 2013

(65) Prior Publication Data

US 2014/0058568 A1 Feb. 27, 2014

Related U.S. Application Data

(63) Continuation of application No. 13/662,663, filed on Oct. 29, 2012, now Pat. No. 8,571,518, which is a continuation of application No. 13/302,071, filed on Nov. 22, 2011, now Pat. No. 8,442,695, which is a (Continued)

(51) Int. Cl.
*G05D 23/00* (2006.01)
*G05F 1/66* (2006.01)
(Continued)

(52) U.S. Cl.
CPC ............... *G05F 1/66* (2013.01); *F24F 11/006* (2013.01); *F24F 11/0086* (2013.01);
(Continued)

(58) Field of Classification Search
CPC ............. F24F 11/0012; F24F 11/0086; F24F 2011/0058; F24F 2011/0071; F24F 2011/0073; F24F 2011/0075; F24F 11/006; G05D 23/1917; G05D 23/1904; G05D 23/00; G06Q 50/06; G06F 1/26; H04L 43/08; H04L 67/10; H04W 4/008

USPC ................. 700/276–278, 286, 291, 295, 297, 700/299–300

See application file for complete search history.

(56) References Cited

U.S. PATENT DOCUMENTS

| 1,568,584 | A | 1/1926 | Blankenship |
| 2,042,633 | A | 6/1936 | Richardson |

(Continued)

FOREIGN PATENT DOCUMENTS

| EP | 1814260 A2 | 8/2007 |
| JP | H0879840 A | 3/1996 |

(Continued)

OTHER PUBLICATIONS

Inncom International, Inc. "Installation User Manual", Revision 3.1, Sep. 12, 2006, pp. 1-36.

(Continued)

*Primary Examiner* — Ramesh Patel
(74) *Attorney, Agent, or Firm* — Dickinson Wright PLLC

(57) ABSTRACT

According to an aspect of the disclosure, a method of managing a site in a mobile environment, which includes detecting an availability of a thermostat wherein the thermostat has an operating condition; detecting a location of a mobile device associated with the site; providing a proximity control selector within a user interface of the mobile device to manage a proximity detection module disposed on the thermostat, wherein the proximity control selector has an enabled setting of the proximity detection module and a disabled setting of the proximity detection module; enabling the proximity detection module in response to the enabled setting of the proximity control selector to allow for the modification of the operating condition of the thermostat based on the detected location of the mobile device relative to the site; and disabling the proximity detection module in response to the disabled setting of the proximity control selector.

11 Claims, 15 Drawing Sheets

Related U.S. Application Data continuation of application No. 12/948,806, filed on Nov. 18, 2010, now Pat. No. 8,082,065, which is a continuation of application No. 12/948,208, filed on Nov. 17, 2010, now Pat. No. 8,024,073, which is a continuation of application No. 12/948,889, filed on Nov. 18, 2010, now Pat. No. 8,108,076, which is a continuation of application No. 13/075,221, filed on Mar. 3, 2011, now Pat. No. 8,174,381, which is a continuation of application No. 13/089,817, filed on Apr. 19, 2011, now Pat. No. 8,396,602, which is a continuation of application No. 13/217,632, filed on Aug. 25, 2011, which is a continuation of application No. 12/840,142, filed on Jul. 20, 2010, which is a continuation of application No. 12/840,169, filed on Jul. 20, 2010, which is a continuation of application No. 12/840,059, filed on Jul. 20, 2010, now Pat. No. 8,509,954, which is a continuation of application No. 12/893,230, filed on Sep. 29, 2010, now Pat. No. 8,457,797, which is a continuation of application No. 12/893,327, filed on Sep. 29, 2010, now Pat. No. 8,099,195.

(60) Provisional application No. 61/255,678, filed on Oct. 28, 2009, provisional application No. 61/235,798, filed on Aug. 21, 2009.

(51) Int. Cl.
| | |
|---|---|
| *G05D 23/19* | (2006.01) |
| *G06Q 50/06* | (2012.01) |
| *H04L 12/26* | (2006.01) |
| *G06F 1/26* | (2006.01) |
| *H04W 4/00* | (2009.01) |
| *H04L 29/08* | (2006.01) |
| *H04W 84/10* | (2009.01) |
| *H04L 12/28* | (2006.01) |
| *F24F 11/00* | (2006.01) |

(52) U.S. Cl.
CPC ............ *G05D 23/00* (2013.01); *G05D 23/1904* (2013.01); *G05D 23/1917* (2013.01); *G06F 1/26* (2013.01); *G06Q 50/06* (2013.01); *H04L 12/2803* (2013.01); *H04L 12/2818* (2013.01); *H04L 12/2825* (2013.01); *H04L 43/08* (2013.01); *H04L 67/10* (2013.01); *H04W 4/008* (2013.01); *H04W 84/10* (2013.01); *F24F 11/0012* (2013.01); *F24F 2011/0058* (2013.01); *F24F 2011/0071* (2013.01); *F24F 2011/0073* (2013.01); *F24F 2011/0075* (2013.01); *H04L 2012/285* (2013.01)

(56) References Cited

U.S. PATENT DOCUMENTS

| | | |
|---|---|---|
| 2,427,965 A | 9/1947 | Henderson |
| 2,931,006 A | 3/1960 | Klumpp, Jr. |
| 2,960,677 A | 11/1960 | Stearn et al. |
| 3,194,957 A | 7/1965 | Caldwell et al. |
| 3,237,148 A | 2/1966 | Ege |
| 3,531,759 A | 9/1970 | Hansen |
| 3,675,183 A | 7/1972 | Drake |
| 3,808,602 A | 4/1974 | Hoeffel et al. |
| 4,407,447 A | 10/1983 | Sayegh |
| 4,437,716 A | 3/1984 | Cooper |
| 4,497,031 A | 1/1985 | Froehling et al. |
| 4,645,286 A | 2/1987 | Isban et al. |
| 5,127,575 A | 7/1992 | Beerbaum |
| 5,274,571 A | 12/1993 | Hesse et al. |
| 5,289,362 A | 2/1994 | Liebl et al. |
| 5,461,390 A | 10/1995 | Hoshen |
| 5,476,221 A | 12/1995 | Seymour |
| 5,537,339 A | 7/1996 | Naganuma et al. |
| 5,544,036 A | 8/1996 | Brown, Jr. et al. |
| 5,566,084 A | 10/1996 | Cmar |
| 5,595,342 A | 1/1997 | McNair et al. |
| 5,682,949 A | 11/1997 | Ratcliffe et al. |
| 5,725,148 A | 3/1998 | Hartman |
| 5,729,442 A | 3/1998 | Frantz |
| 5,764,146 A | 6/1998 | Baldwin et al. |
| 5,812,949 A | 9/1998 | Taketsugu |
| 5,819,840 A | 10/1998 | Wilson et al. |
| 5,884,072 A | 3/1999 | Rasmussen |
| 5,964,625 A | 10/1999 | Farley |
| 5,987,379 A | 11/1999 | Smith |
| 6,014,080 A | 1/2000 | Layson, Jr. |
| 6,073,019 A | 6/2000 | Lowdon |
| 6,108,614 A | 8/2000 | Lincoln et al. |
| 6,128,661 A | 10/2000 | Flanagin et al. |
| 6,175,078 B1 | 1/2001 | Bambardekar et al. |
| 6,353,180 B1 | 3/2002 | DeBartolo, Jr. et al. |
| 6,400,956 B1 | 6/2002 | Richton |
| 6,442,639 B1 | 8/2002 | McElhattan |
| 6,478,233 B1 | 11/2002 | Shah |
| 6,483,028 B2 | 11/2002 | DeBartolo, Jr. et al. |
| 6,553,418 B1 | 4/2003 | Collins et al. |
| 6,623,311 B1 | 9/2003 | Dehan |
| 6,636,893 B1 | 10/2003 | Fong |
| 6,684,087 B1 | 1/2004 | Yu et al. |
| 6,785,542 B1 | 8/2004 | Blight et al. |
| 6,785,630 B2 | 8/2004 | Kolk et al. |
| 6,850,252 B1 | 2/2005 | Hoffberg |
| 6,868,293 B1 | 3/2005 | Schurr et al. |
| 6,975,958 B2 | 12/2005 | Bohrer et al. |
| 6,976,366 B2 | 12/2005 | Starling et al. |
| 6,980,659 B1 | 12/2005 | Elliott |
| 6,999,757 B2 | 2/2006 | Bates et al. |
| 7,016,751 B2 | 3/2006 | Nordquist et al. |
| 7,031,945 B1 | 4/2006 | Donner |
| 7,082,460 B2 | 7/2006 | Hansen et al. |
| 7,083,109 B2 | 8/2006 | Pouchak |
| 7,099,483 B2 | 8/2006 | Inagaki |
| 7,114,554 B2 | 10/2006 | Bergman et al. |
| 7,127,328 B2 | 10/2006 | Ransom |
| 7,127,734 B1 | 10/2006 | Amit |
| 7,130,719 B2 | 10/2006 | Ehlers et al. |
| 7,139,564 B2 | 11/2006 | Hebert |
| 7,140,551 B2 | 11/2006 | De Pauw et al. |
| 7,155,305 B2 | 12/2006 | Hayes et al. |
| 7,159,789 B2 | 1/2007 | Schwendinger et al. |
| 7,188,003 B2 | 3/2007 | Ransom et al. |
| 7,197,011 B2 | 3/2007 | Fong |
| 7,216,021 B2 | 5/2007 | Matsubara et al. |
| 7,222,800 B2* | 5/2007 | Wruck .................... 236/51 |
| 7,224,966 B2 | 5/2007 | Caspi et al. |
| 7,257,397 B2* | 8/2007 | Shamoon et al. ......... 455/419 |
| 7,343,226 B2 | 3/2008 | Ehlers et al. |
| 7,349,761 B1 | 3/2008 | Cruse |
| 7,363,053 B2 | 4/2008 | Dalton et al. |
| 7,403,838 B2 | 7/2008 | Deen et al. |
| 7,444,401 B1 | 10/2008 | Keyghobad et al. |
| 7,451,017 B2 | 11/2008 | McNally |
| 7,460,827 B2 | 12/2008 | Schuster et al. |
| 7,477,617 B2 | 1/2009 | Chen et al. |
| 7,510,126 B2 | 3/2009 | Rossi et al. |
| 7,525,425 B2 | 4/2009 | Diem |
| 7,526,539 B1* | 4/2009 | Hsu .......................... 709/223 |
| 7,554,437 B2 | 6/2009 | Axelsen |
| 7,565,225 B2 | 7/2009 | Dushane |
| 7,567,844 B2 | 7/2009 | Thomas et al. |
| 7,574,208 B2 | 8/2009 | Hanson et al. |
| 7,574,283 B2 | 8/2009 | Wang et al. |
| 7,590,703 B2 | 9/2009 | Cashman et al. |
| 7,644,591 B2 | 1/2010 | Singh et al. |
| 7,665,670 B2 | 2/2010 | Ahmed |
| 7,668,532 B2* | 2/2010 | Shamoon et al. ......... 455/410 |
| 7,671,544 B2 | 3/2010 | Clark et al. |
| 7,693,581 B2 | 4/2010 | Callaghan et al. |

(56) References Cited

U.S. PATENT DOCUMENTS

| | | | |
|---|---|---|---|
| 7,706,928 B1 | 4/2010 | Howell et al. | |
| 7,715,951 B2 | 5/2010 | Forbes et al. | |
| 7,747,739 B2 | 6/2010 | Bridges et al. | |
| 7,752,309 B2 | 7/2010 | Keyghobad et al. | |
| 7,761,910 B2 | 7/2010 | Ransom | |
| 7,775,453 B2 | 8/2010 | Hara | |
| 7,783,738 B2 | 8/2010 | Keyghobad et al. | |
| 7,792,946 B2 | 9/2010 | Keyghobad et al. | |
| 7,798,417 B2 | 9/2010 | Snyder et al. | |
| 7,812,766 B2 * | 10/2010 | Leblanc et al. | 342/457 |
| 7,813,831 B2 | 10/2010 | McCoy et al. | |
| 7,865,252 B2 | 1/2011 | Clayton | |
| 7,881,816 B2 | 2/2011 | Mathiesen et al. | |
| 7,884,727 B2 | 2/2011 | Tran | |
| 7,886,166 B2 | 2/2011 | Shnekendorf et al. | |
| 7,895,257 B2 | 2/2011 | Helal et al. | |
| 7,908,019 B2 | 3/2011 | Ebrom et al. | |
| 7,908,116 B2 | 3/2011 | Steinberg et al. | |
| 7,908,117 B2 | 3/2011 | Steinberg et al. | |
| 7,912,559 B2 | 3/2011 | McCoy et al. | |
| 7,917,914 B2 | 3/2011 | McCoy et al. | |
| 7,918,406 B2 | 4/2011 | Rosen | |
| 7,921,429 B2 | 4/2011 | McCoy et al. | |
| 7,941,530 B2 * | 5/2011 | Ha et al. | 709/224 |
| 7,949,615 B2 | 5/2011 | Ehlers et al. | |
| 7,953,518 B2 | 5/2011 | Kansal et al. | |
| 7,973,707 B2 | 7/2011 | Verechtchiagine | |
| 7,975,051 B2 | 7/2011 | Saint Clair et al. | |
| 7,979,163 B2 | 7/2011 | Terlson et al. | |
| 8,005,780 B2 | 8/2011 | McCoy et al. | |
| 8,010,237 B2 | 8/2011 | Cheung et al. | |
| 8,010,418 B1 * | 8/2011 | Lee | 705/26.7 |
| 8,010,812 B2 | 8/2011 | Forbes, Jr. et al. | |
| 8,019,445 B2 | 9/2011 | Marhoefer | |
| 8,024,073 B2 | 9/2011 | Imes et al. | |
| 8,028,049 B1 | 9/2011 | Ellis et al. | |
| 8,028,302 B2 | 9/2011 | Glotzbach et al. | |
| 8,032,233 B2 | 10/2011 | Forbes, Jr. et al. | |
| 8,042,048 B2 | 10/2011 | Wilson et al. | |
| 8,049,592 B2 | 11/2011 | Wang et al. | |
| 8,063,775 B2 | 11/2011 | Reed et al. | |
| 8,082,065 B2 | 12/2011 | Imes et al. | |
| 8,090,477 B1 | 1/2012 | Steinberg | |
| 8,091,765 B2 | 1/2012 | Jiang et al. | |
| 8,091,795 B1 | 1/2012 | McLellan et al. | |
| 8,099,195 B2 | 1/2012 | Imes et al. | |
| 8,099,198 B2 | 1/2012 | Gurin | |
| 8,108,076 B2 | 1/2012 | Imes et al. | |
| 8,117,299 B2 | 2/2012 | Narayanaswami et al. | |
| 8,126,685 B2 | 2/2012 | Nasle | |
| 8,131,401 B2 | 3/2012 | Nasle | |
| 8,140,279 B2 | 3/2012 | Subbloie | |
| 8,140,667 B2 | 3/2012 | Keyghobad et al. | |
| 8,174,381 B2 * | 5/2012 | Imes et al. | 340/539.23 |
| 8,176,112 B2 | 5/2012 | Hicks, IIII et al. | |
| 8,204,979 B2 | 6/2012 | Vutharkar et al. | |
| 8,214,270 B2 | 7/2012 | Schaefer et al. | |
| 8,280,556 B2 | 10/2012 | Besore et al. | |
| 8,306,634 B2 | 11/2012 | Nguyen et al. | |
| 8,350,694 B1 | 1/2013 | Trundle et al. | |
| 8,355,865 B2 | 1/2013 | Wagner et al. | |
| 8,406,783 B2 | 3/2013 | Eitan et al. | |
| 8,406,933 B2 | 3/2013 | Nagel et al. | |
| 8,571,518 B2 * | 10/2013 | Imes et al. | 455/408 |
| 2002/0073217 A1 | 6/2002 | Ma et al. | |
| 2002/0147006 A1 * | 10/2002 | Coon et al. | 455/420 |
| 2002/0194500 A1 | 12/2002 | Bajikar | |
| 2002/0196151 A1 | 12/2002 | Troxler | |
| 2002/0198984 A1 | 12/2002 | Goldstein et al. | |
| 2003/0120817 A1 | 6/2003 | Ott et al. | |
| 2003/0122684 A1 * | 7/2003 | Porter et al. | 340/686.6 |
| 2003/0149734 A1 | 8/2003 | Aaltonen et al. | |
| 2003/0210126 A1 * | 11/2003 | Kanazawa | 340/5.5 |
| 2004/0034484 A1 | 2/2004 | Solomita, Jr. et al. | |
| 2004/0078153 A1 | 4/2004 | Bartone et al. | |
| 2004/0087314 A1 * | 5/2004 | Duncan | 455/456.1 |
| 2004/0119600 A1 * | 6/2004 | Hampton | 340/691.1 |
| 2004/0133314 A1 | 7/2004 | Ehlers et al. | |
| 2004/0193329 A1 | 9/2004 | Ransom et al. | |
| 2005/0038326 A1 | 2/2005 | Mathur | |
| 2005/0040247 A1 * | 2/2005 | Pouchak | 236/44 C |
| 2005/0040250 A1 | 2/2005 | Wruck | |
| 2005/0044427 A1 | 2/2005 | Dunstan et al. | |
| 2005/0060575 A1 * | 3/2005 | Trethewey et al. | 713/201 |
| 2005/0090267 A1 * | 4/2005 | Kotzin | 455/456.4 |
| 2005/0131583 A1 | 6/2005 | Ransom | |
| 2005/0143863 A1 | 6/2005 | Ruane et al. | |
| 2005/0144437 A1 | 6/2005 | Ransom et al. | |
| 2005/0172056 A1 | 8/2005 | Ahn | |
| 2005/0194457 A1 | 9/2005 | Dolan | |
| 2005/0242945 A1 | 11/2005 | Perkinson | |
| 2005/0246561 A1 | 11/2005 | Wu et al. | |
| 2006/0012489 A1 | 1/2006 | Yokota et al. | |
| 2006/0063522 A1 | 3/2006 | McFarland | |
| 2006/0097063 A1 | 5/2006 | Zeevi | |
| 2006/0099971 A1 | 5/2006 | Staton et al. | |
| 2006/0102732 A1 | 5/2006 | Garrett et al. | |
| 2006/0122715 A1 | 6/2006 | Schroeder et al. | |
| 2006/0161635 A1 * | 7/2006 | Lamkin et al. | 709/217 |
| 2006/0179079 A1 * | 8/2006 | Kolehmainen | 707/104.1 |
| 2006/0253894 A1 | 11/2006 | Bookman et al. | |
| 2006/0265489 A1 | 11/2006 | Moore | |
| 2006/0276175 A1 * | 12/2006 | Chandran | 455/411 |
| 2006/0283965 A1 | 12/2006 | Mueller et al. | |
| 2007/0032225 A1 | 2/2007 | Konicek et al. | |
| 2007/0037554 A1 * | 2/2007 | Freeny | 455/410 |
| 2007/0037605 A1 | 2/2007 | Logan | |
| 2007/0043477 A1 | 2/2007 | Ehlers et al. | |
| 2007/0043478 A1 | 2/2007 | Ehlers et al. | |
| 2007/0045431 A1 | 3/2007 | Chapman et al. | |
| 2007/0054616 A1 | 3/2007 | Culbert | |
| 2007/0055760 A1 | 3/2007 | McCoy et al. | |
| 2007/0060171 A1 | 3/2007 | Sudit et al. | |
| 2007/0061050 A1 | 3/2007 | Hoffknecht | |
| 2007/0061266 A1 | 3/2007 | Moore et al. | |
| 2007/0061487 A1 | 3/2007 | Moore et al. | |
| 2007/0112939 A1 * | 5/2007 | Wilson et al. | 709/219 |
| 2007/0114295 A1 | 5/2007 | Jenkins | |
| 2007/0115902 A1 | 5/2007 | Shamoon et al. | |
| 2007/0124026 A1 | 5/2007 | Troxell et al. | |
| 2007/0136217 A1 | 6/2007 | Johnson et al. | |
| 2007/0143499 A1 * | 6/2007 | Chang | 709/245 |
| 2007/0155401 A1 | 7/2007 | Ward et al. | |
| 2007/0156265 A1 | 7/2007 | McCoy et al. | |
| 2007/0156864 A1 | 7/2007 | McCoy et al. | |
| 2007/0156882 A1 | 7/2007 | McCoy et al. | |
| 2007/0158442 A1 | 7/2007 | Chapman, Jr. et al. | |
| 2007/0160022 A1 | 7/2007 | McCoy et al. | |
| 2007/0162158 A1 | 7/2007 | McCoy et al. | |
| 2007/0168486 A1 | 7/2007 | McCoy et al. | |
| 2007/0176771 A1 | 8/2007 | Doyle | |
| 2007/0188319 A1 * | 8/2007 | Upton | 340/539.13 |
| 2007/0197236 A1 * | 8/2007 | Ahn et al. | 455/466 |
| 2007/0221741 A1 | 9/2007 | Wagner et al. | |
| 2007/0240173 A1 | 10/2007 | McCoy et al. | |
| 2007/0241203 A1 | 10/2007 | Wagner et al. | |
| 2007/0249319 A1 * | 10/2007 | Faulkner et al. | 455/402 |
| 2007/0273307 A1 | 11/2007 | Westrick et al. | |
| 2007/0274241 A1 | 11/2007 | Brothers | |
| 2007/0282748 A1 | 12/2007 | Saint Clair et al. | |
| 2007/0285510 A1 | 12/2007 | Lipton et al. | |
| 2007/0287410 A1 * | 12/2007 | Bae et al. | 455/404.2 |
| 2007/0287473 A1 | 12/2007 | Dupary | |
| 2007/0288610 A1 | 12/2007 | Saint Clair et al. | |
| 2007/0288975 A1 | 12/2007 | Cashman et al. | |
| 2008/0004904 A1 | 1/2008 | Tran | |
| 2008/0017722 A1 | 1/2008 | Snyder et al. | |
| 2008/0046878 A1 | 2/2008 | Anderson | |
| 2008/0082838 A1 | 4/2008 | Achariyakosol et al. | |
| 2008/0099568 A1 | 5/2008 | Nicodem et al. | |
| 2008/0103610 A1 | 5/2008 | Ebrom et al. | |
| 2008/0104208 A1 | 5/2008 | Ebrom et al. | |
| 2008/0104212 A1 | 5/2008 | Ebrom et al. | |
| 2008/0109830 A1 | 5/2008 | Giozbach et al. | |

(56) References Cited

U.S. PATENT DOCUMENTS

| | | | |
|---|---|---|---|
| 2008/0127325 A1 | 5/2008 | Ebrom et al. | |
| 2008/0137670 A1 | 6/2008 | Ebrom et al. | |
| 2008/0177678 A1 | 7/2008 | Di Martini et al. | |
| 2008/0177994 A1 | 7/2008 | Mayer | |
| 2008/0188963 A1 | 8/2008 | McCoy | |
| 2008/0218307 A1 | 9/2008 | Schoettle | |
| 2008/0219186 A1 | 9/2008 | Bell et al. | |
| 2008/0219227 A1 | 9/2008 | Michaelis | |
| 2008/0219239 A1 | 9/2008 | Bell et al. | |
| 2008/0221737 A1 | 9/2008 | Josephson et al. | |
| 2008/0249642 A1 | 10/2008 | Chen | |
| 2008/0262820 A1 | 10/2008 | Nasle | |
| 2008/0270562 A1 | 10/2008 | Jin et al. | |
| 2008/0271123 A1* | 10/2008 | Ollis et al. | 726/4 |
| 2008/0272934 A1* | 11/2008 | Wang et al. | 340/870.11 |
| 2008/0277486 A1 | 11/2008 | Seem et al. | |
| 2008/0277487 A1 | 11/2008 | Mueller et al. | |
| 2008/0281472 A1 | 11/2008 | Podgorny et al. | |
| 2008/0281666 A1 | 11/2008 | Kessman et al. | |
| 2008/0291855 A1 | 11/2008 | Bata et al. | |
| 2008/0305644 A1 | 12/2008 | Noda et al. | |
| 2008/0313310 A1 | 12/2008 | Vasa et al. | |
| 2009/0001182 A1 | 1/2009 | Siddaramanna et al. | |
| 2009/0005061 A1 | 1/2009 | Ward et al. | |
| 2009/0012704 A1 | 1/2009 | Franco et al. | |
| 2009/0037938 A1 | 2/2009 | Frank | |
| 2009/0062970 A1 | 3/2009 | Forbes, Jr. et al. | |
| 2009/0063122 A1 | 3/2009 | Nasle | |
| 2009/0063228 A1 | 3/2009 | Forbes, Jr. et al. | |
| 2009/0065596 A1 | 3/2009 | Seem et al. | |
| 2009/0076749 A1 | 3/2009 | Nasle | |
| 2009/0082888 A1 | 3/2009 | Johansen | |
| 2009/0083167 A1 | 3/2009 | Subbloie | |
| 2009/0093688 A1 | 4/2009 | Mathur | |
| 2009/0098857 A1* | 4/2009 | De Atley | 455/411 |
| 2009/0098880 A1 | 4/2009 | Lindquist | |
| 2009/0100492 A1 | 4/2009 | Hicks, III et al. | |
| 2009/0103535 A1 | 4/2009 | McCoy et al. | |
| 2009/0112522 A1 | 4/2009 | Rasmussen | |
| 2009/0113037 A1 | 4/2009 | Pouchak | |
| 2009/0129301 A1* | 5/2009 | Belimpasakis | 370/310 |
| 2009/0132070 A1 | 5/2009 | Ebrom et al. | |
| 2009/0135836 A1 | 5/2009 | Veillette | |
| 2009/0138099 A1* | 5/2009 | Veillette | 700/22 |
| 2009/0157529 A1* | 6/2009 | Ehlers et al. | 705/26 |
| 2009/0160626 A1* | 6/2009 | Jeon et al. | 340/310.11 |
| 2009/0164049 A1 | 6/2009 | Nibler et al. | |
| 2009/0187499 A1 | 7/2009 | Mulder et al. | |
| 2009/0193217 A1 | 7/2009 | Korecki et al. | |
| 2009/0195349 A1* | 8/2009 | Frader-Thompson et al. | 340/3.1 |
| 2009/0204837 A1 | 8/2009 | Raval et al. | |
| 2009/0240381 A1 | 9/2009 | Lane | |
| 2009/0248702 A1 | 10/2009 | Schwartz et al. | |
| 2009/0267787 A1 | 10/2009 | Pryor et al. | |
| 2009/0270138 A1 | 10/2009 | Raveendran | |
| 2009/0302994 A1 | 12/2009 | Rhee et al. | |
| 2009/0305644 A1 | 12/2009 | Rhee et al. | |
| 2009/0312968 A1 | 12/2009 | Phillips et al. | |
| 2009/0316671 A1 | 12/2009 | Rolf et al. | |
| 2010/0017126 A1 | 1/2010 | Holcman et al. | |
| 2010/0034386 A1* | 2/2010 | Choong et al. | 380/270 |
| 2010/0035587 A1 | 2/2010 | Bennett | |
| 2010/0035613 A1* | 2/2010 | Schroter | 455/435.1 |
| 2010/0063867 A1 | 3/2010 | Proctor, Jr. et al. | |
| 2010/0066507 A1* | 3/2010 | Myllymaki | 340/10.4 |
| 2010/0069035 A1 | 3/2010 | Johnson | |
| 2010/0069087 A1* | 3/2010 | Chow et al. | 455/456.1 |
| 2010/0070100 A1 | 3/2010 | Finlinson et al. | |
| 2010/0070101 A1 | 3/2010 | Benes et al. | |
| 2010/0075656 A1* | 3/2010 | Howarter et al. | 455/420 |
| 2010/0081375 A1 | 4/2010 | Rosenblatt et al. | |
| 2010/0081468 A1 | 4/2010 | Brothers | |
| 2010/0082174 A1 | 4/2010 | Weaver | |
| 2010/0082176 A1 | 4/2010 | Chang | |
| 2010/0082431 A1 | 4/2010 | Ramer et al. | |
| 2010/0087932 A1 | 4/2010 | McCoy et al. | |
| 2010/0088261 A1 | 4/2010 | Montalvo | |
| 2010/0094475 A1 | 4/2010 | Masters et al. | |
| 2010/0094737 A1 | 4/2010 | Lambird | |
| 2010/0099410 A1* | 4/2010 | Sweeney et al. | 455/435.1 |
| 2010/0100253 A1 | 4/2010 | Fausak et al. | |
| 2010/0113061 A1 | 5/2010 | Holcman | |
| 2010/0115314 A1 | 5/2010 | Sultenfuss | |
| 2010/0121499 A1 | 5/2010 | Besore et al. | |
| 2010/0123414 A1 | 5/2010 | Antonopoulos | |
| 2010/0127854 A1 | 5/2010 | Helvick et al. | |
| 2010/0127889 A1 | 5/2010 | Vogel et al. | |
| 2010/0130178 A1* | 5/2010 | Bennett et al. | 455/414.1 |
| 2010/0130213 A1 | 5/2010 | Vendrow et al. | |
| 2010/0138764 A1 | 6/2010 | Hatambeiki et al. | |
| 2010/0141437 A1* | 6/2010 | Karam et al. | 340/539.23 |
| 2010/0145534 A1 | 6/2010 | Forbes, Jr. et al. | |
| 2010/0152997 A1 | 6/2010 | De Silva et al. | |
| 2010/0156665 A1* | 6/2010 | Krzyzanowski et al. | 340/870.02 |
| 2010/0159936 A1 | 6/2010 | Brisbois et al. | |
| 2010/0161148 A1 | 6/2010 | Forbes, Jr. et al. | |
| 2010/0161149 A1 | 6/2010 | Nguyen et al. | |
| 2010/0164713 A1 | 7/2010 | Wedig et al. | |
| 2010/0165861 A1 | 7/2010 | Rrdland et al. | |
| 2010/0169030 A1 | 7/2010 | Parlos et al. | |
| 2010/0174643 A1 | 7/2010 | Schaefer et al. | |
| 2010/0179670 A1 | 7/2010 | Forbes, Jr. et al. | |
| 2010/0179672 A1 | 7/2010 | Beckmann et al. | |
| 2010/0179708 A1 | 7/2010 | Watson et al. | |
| 2010/0187219 A1 | 7/2010 | Besore et al. | |
| 2010/0188239 A1 | 7/2010 | Rockwell | |
| 2010/0188279 A1 | 7/2010 | Shamilian et al. | |
| 2010/0191352 A1 | 7/2010 | Quail | |
| 2010/0193592 A1 | 8/2010 | Simon et al. | |
| 2010/0198713 A1 | 8/2010 | Forbes, Jr. et al. | |
| 2010/0207728 A1 | 8/2010 | Roscoe et al. | |
| 2010/0217450 A1 | 8/2010 | Beal et al. | |
| 2010/0217451 A1 | 8/2010 | Kouda et al. | |
| 2010/0217452 A1 | 8/2010 | McCord et al. | |
| 2010/0217549 A1 | 8/2010 | Galvin et al. | |
| 2010/0217550 A1 | 8/2010 | Crabtree et al. | |
| 2010/0217642 A1 | 8/2010 | Crabtree et al. | |
| 2010/0217651 A1 | 8/2010 | Crabtree et al. | |
| 2010/0217837 A1 | 8/2010 | Ansari et al. | |
| 2010/0218108 A1 | 8/2010 | Crabtree et al. | |
| 2010/0222935 A1 | 9/2010 | Forbes, Jr. et al. | |
| 2010/0228854 A1 | 9/2010 | Morrison et al. | |
| 2010/0235008 A1 | 9/2010 | Forbes, Jr. et al. | |
| 2010/0241275 A1 | 9/2010 | Crawford et al. | |
| 2010/0249955 A1 | 9/2010 | Sitton | |
| 2010/0250590 A1 | 9/2010 | Galvin | |
| 2010/0256823 A1 | 10/2010 | Cherukuri et al. | |
| 2010/0257539 A1 | 10/2010 | Narayanan et al. | |
| 2010/0261465 A1* | 10/2010 | Rhoads et al. | 455/420 |
| 2010/0262298 A1 | 10/2010 | Johnson et al. | |
| 2010/0262299 A1 | 10/2010 | Cheung et al. | |
| 2010/0262336 A1 | 10/2010 | Rivas et al. | |
| 2010/0272192 A1 | 10/2010 | Varadarajan et al. | |
| 2010/0289643 A1* | 11/2010 | Trundle et al. | 340/545.1 |
| 2010/0299265 A1 | 11/2010 | Walters et al. | |
| 2010/0299517 A1 | 11/2010 | Jukic et al. | |
| 2010/0305773 A1 | 12/2010 | Cohen | |
| 2010/0315235 A1* | 12/2010 | Adegoke et al. | 340/568.1 |
| 2010/0315438 A1 | 12/2010 | Horodezky et al. | |
| 2010/0317332 A1 | 12/2010 | Bathiche et al. | |
| 2010/0317371 A1* | 12/2010 | Westerinen et al. | 455/456.6 |
| 2010/0318198 A1 | 12/2010 | Smith et al. | |
| 2010/0324956 A1 | 12/2010 | Lopez et al. | |
| 2010/0324962 A1 | 12/2010 | Nesler et al. | |
| 2010/0332373 A1 | 12/2010 | Crabtree et al. | |
| 2011/0004350 A1 | 1/2011 | Cheifetz et al. | |
| 2011/0004355 A1 | 1/2011 | Wang et al. | |
| 2011/0004513 A1* | 1/2011 | Hoffberg | 705/14.1 |
| 2011/0015797 A1 | 1/2011 | Gilstrap | |
| 2011/0015802 A1 | 1/2011 | Imes | |
| 2011/0016023 A1 | 1/2011 | Zakas | |
| 2011/0022239 A1 | 1/2011 | Forbes, Jr. et al. | |
| 2011/0022242 A1* | 1/2011 | Bukhin et al. | 700/291 |
| 2011/0028132 A1* | 2/2011 | Bos | 455/414.2 |

(56) References Cited

U.S. PATENT DOCUMENTS

| | | |
|---|---|---|
| 2011/0029655 A1 | 2/2011 | Forbes, Jr. et al. |
| 2011/0039518 A1 | 2/2011 | Maria |
| 2011/0040666 A1 | 2/2011 | Crabtree et al. |
| 2011/0046792 A1 | 2/2011 | Imes et al. |
| 2011/0046798 A1 | 2/2011 | Imes et al. |
| 2011/0046799 A1 | 2/2011 | Imes et al. |
| 2011/0046800 A1 | 2/2011 | Imes et al. |
| 2011/0046801 A1 | 2/2011 | Imes et al. |
| 2011/0047482 A1 | 2/2011 | Arthurs et al. |
| 2011/0051823 A1 | 3/2011 | Imes et al. |
| 2011/0054699 A1 | 3/2011 | Imes et al. |
| 2011/0054710 A1 | 3/2011 | Imes et al. |
| 2011/0061014 A1 | 3/2011 | Frader-Thompson et al. |
| 2011/0063126 A1 | 3/2011 | Kennedy et al. |
| 2011/0063999 A1 | 3/2011 | Erdmann et al. |
| 2011/0069719 A1 | 3/2011 | Fries, IV et al. |
| 2011/0077789 A1 | 3/2011 | Sun |
| 2011/0098869 A1 | 4/2011 | Seo et al. |
| 2011/0106326 A1 | 5/2011 | Anunobi et al. |
| 2011/0106327 A1 | 5/2011 | Zhou et al. |
| 2011/0106681 A1 | 5/2011 | Cockerell et al. |
| 2011/0113090 A1 | 5/2011 | Peeri |
| 2011/0115875 A1 | 5/2011 | Sadwick et al. |
| 2011/0117878 A1 | 5/2011 | Barash et al. |
| 2011/0117927 A1* | 5/2011 | Doyle .................. 455/456.1 |
| 2011/0138024 A1 | 6/2011 | Chen et al. |
| 2011/0148626 A1 | 6/2011 | Acevedo |
| 2011/0153525 A1 | 6/2011 | Benco et al. |
| 2011/0160881 A1 | 6/2011 | Grey |
| 2011/0172837 A1 | 7/2011 | Forbes, Jr. |
| 2011/0173542 A1 | 7/2011 | Imes et al. |
| 2011/0202185 A1 | 8/2011 | Imes et al. |
| 2011/0202195 A1 | 8/2011 | Finch et al. |
| 2011/0202293 A1 | 8/2011 | Kobraei et al. |
| 2011/0211584 A1 | 9/2011 | Mahmoud |
| 2011/0214060 A1 | 9/2011 | Imes et al. |
| 2011/0224838 A1 | 9/2011 | Imes et al. |
| 2011/0227704 A1 | 9/2011 | Padmanabhan et al. |
| 2011/0231020 A1* | 9/2011 | Ramachandran et al. .... 700/278 |
| 2011/0246606 A1 | 10/2011 | Barbeau et al. |
| 2011/0246898 A1 | 10/2011 | Imes et al. |
| 2011/0251725 A1 | 10/2011 | Chan |
| 2011/0257809 A1 | 10/2011 | Forbes, Jr. et al. |
| 2011/0258022 A1 | 10/2011 | Forbes, Jr. et al. |
| 2011/0264290 A1 | 10/2011 | Drew |
| 2011/0264296 A1 | 10/2011 | Drake et al. |
| 2011/0282497 A1 | 11/2011 | Josephson et al. |
| 2011/0295393 A1 | 12/2011 | Lindahl |
| 2011/0296169 A1 | 12/2011 | Palmer |
| 2011/0302431 A1 | 12/2011 | Diab et al. |
| 2011/0307101 A1 | 12/2011 | Imes et al. |
| 2011/0316664 A1 | 12/2011 | Olcott et al. |
| 2012/0022709 A1 | 1/2012 | Taylor |
| 2012/0061480 A1 | 3/2012 | Deligiannis et al. |
| 2012/0126020 A1 | 5/2012 | Filson et al. |
| 2012/0169249 A1 | 7/2012 | Loveland et al. |
| 2012/0179547 A1 | 7/2012 | Besore et al. |
| 2012/0189140 A1 | 7/2012 | Hughes et al. |
| 2012/0312874 A1 | 12/2012 | Jonsson |
| 2013/0087629 A1 | 4/2013 | Stefanski et al. |
| 2013/0099010 A1 | 4/2013 | Filson et al. |

FOREIGN PATENT DOCUMENTS

| | | | |
|---|---|---|---|
| JP | 2006092035 | A | 4/2006 |
| WO | 0227639 | A1 | 4/2002 |
| WO | 2007109557 | A2 | 9/2007 |
| WO | 2008134460 | A1 | 11/2008 |
| WO | 2009034720 | A1 | 3/2009 |
| WO | 2009036764 | A2 | 3/2009 |
| WO | 2009067251 | A1 | 5/2009 |
| WO | 2009097400 | A1 | 8/2009 |

OTHER PUBLICATIONS

Peffer, T., et al. "A Tale of Two Houses: The Human Dimension of Demand Response Enabling Technology from a Case Study of an Adaptive Wireless Thermostat," ACEEE Summer Study on Energy Efficiency in Buildings, 2008.

Stigge, B. "Informed Home Energy Behavior: Developing a tool for homeowners to monitor, plan and learn about energy conservation," Massachusetts Institute of Technology, 2001.

Mozer, M., et al. The Neurothermostat: Predictive Optimal Control of Residential Heating Systems. "Advances in Neural Information Processing Systems 9." MIT Press, 1997.

Seligman, C., et al. Behavior Approaches to Residential Energy Conservation. "Saving Energy in the Home." Ballinger Publishing Co., 1978.

Slavin, Alison Jane and Trundle, Stephen Scott, Remote Thermostat Control/Energy Monitoring, U.S. Appl. No. 61/179,224, filed May 18, 2009; 14 pages.

Gupta, Manu, A Persuasive GPS-Controlled Thermostat System, Royal Institute of Technology, Stockholm, Sweden, Jun. 2006; Pune Institute of Computer Technology, University of Pune, India, Jun. 2003 and Massachusetts Institute of Technology, Sep. 2008; 89 pages.

"A step-by-step guide to installing the 1st generation Nest Learning Thermostat," Article #1161, 2013 Nest Labs. pp. 1-6. http://http://support.nest.com/article/A-step-by-step-guide-to-installing-the-1st-generation-Nest-Learning-Thermostat, last accessed Feb. 1, 2013.

Klym et al., The Evolution of RFID Networks: The Potential for Disruptive Innovation, Mar. 2006, MIT Communication Futures Program, pp. 1-20.

Pering et al., Spontaneous Marriages of Mobile Devices and Interactive Space, Communication of the ACM, Sep. 2005, pp. 53-59.

Jaring et al., Improving Mobile Solution Workflows and Usability Using Near Field Communication Technology, 2007, Springer-Verlag Berlin Heidelberg, pp. 358-373.

"Wi-Fi", Wikipedia, printed Jul. 8, 2013.

Request Response, Wikipedia, printed Jul. 25, 2013.

BAYweb Thermostat Owner's Manual, Bay Controls, LLC, published Nov. 11, 2009.

Gupta, Manu, Intille, Stephen S. and Larson, Kent, Adding GPS-Control to Traditional Thermostats: An Exploration of Potential Energy Savings and Design Challenges. House_n. Massachusetts Institute of Technology, Cambridge, MA 02142 USA. May 11-14, 2009, Springer-Verlag Berlin, Heideberg.

e4 Smart Digital Thermostat—E529, Inncom by Honeywell, published Aug. 2012.

* cited by examiner

METHOD OF MANAGING A SITE USING A PROXIMITY DETECTION MODULE

CROSS REFERENCE TO RELATED APPLICATIONS

The present application is a continuation U.S. application Ser. No. 13/662,663, entitled "Proximity Detection Module on Thermostat", filed on Oct. 29, 2012, which is a continuation of U.S. Pat. No. 8,442,695, entitled "Auto-Adaptable Energy Management Apparatus", filed on Nov. 22, 2011, which is continuation of U.S. Pat. No. 8,082,065 entitled "A Communication Interface for Wireless Energy Networks," filed on Nov. 18, 2010, and a continuation of U.S. Pat. No. 8,024,073 entitled an "Energy Management System and Method," filed on Nov. 17, 2010, and a continuation of U.S. Pat. No. 8,108,076 entitled an "Energy Management System and Method," filed on Nov. 18, 2010, and a continuation of U.S. Pat. No. 8,174,381 entitled a "Mobile Energy Management System", filed on Mar. 30, 2011, and a continuation of U.S. Pat. No. 8,396,602 entitled an "Energy Management System and Method", filed on Apr. 19, 2011, and a continuation of U.S. application Ser. No. 13/217,632 entitled an "Energy Management System and Method", filed on Aug. 25, 2011, and a continuation of U.S. application Ser. No. 12/840, 142 entitled an "Energy Management System and Method," filed on Jul. 20, 2010, and a continuation U.S. application Ser. No. 12/840,169 entitled an "Energy Management System and Method," filed on Jul. 20, 2010, and a continuation of U.S. Pat. No. 8,509,954 entitled an "Energy Management System and Method," filed on Jul. 20, 2010, and a continuation U.S. Pat. No. 8,457,797 entitled an "Energy Management System and Method," filed on Sep. 29, 2010, and a continuation of U.S. Pat. No. 8,099,195 entitled an "Energy Management System and Method," filed on Sep. 29, 2010, which all claim the benefit of U.S. Provisional Patent Application Ser. No. 61/255,678, entitled a "Proximity Based Home Energy Management System and Method" and filed on Oct. 28, 2009, as well as U.S. Provisional Patent Application Ser. No. 61/235, 798 entitled an "Alternative Energy Asset Management System with Intelligent Data Framework Capabilities", filed on Aug. 21, 2009.

FIELD OF THE DISCLOSURE

This disclosure relates generally to home systems, and more particularly to an energy management system and method.

BACKGROUND

Current energy management systems take a passive role to residential energy management. For example, consumers lack energy awareness and are typically left with having to evaluate a monthly bill to determine how much energy was consumed. Additionally, consumers lack transparency into what the leading causes of energy consumption are at their residences. Some utility companies are providing energy display only technologies that will allow consumers to see what the current price of energy may be. However, such displays take a passive role to conservation, and leaving it up to the consumer to manually curtail their use.

In certain regions, information infrastructure is lacking to enable utility companies and customers to access real-time energy consumption. For example, some regions have smart meters that are capable measuring and reporting consumption data. However, there is a lack of communication and analytical infrastructure to allow utility companies to analyze future demand and schedule energy production. For example, some utilities are providing demand response systems that react to load levels, and force curtailment on residential, industrial, and commercial customers. Such programs have not been well received as they typically inconvenience the end user.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
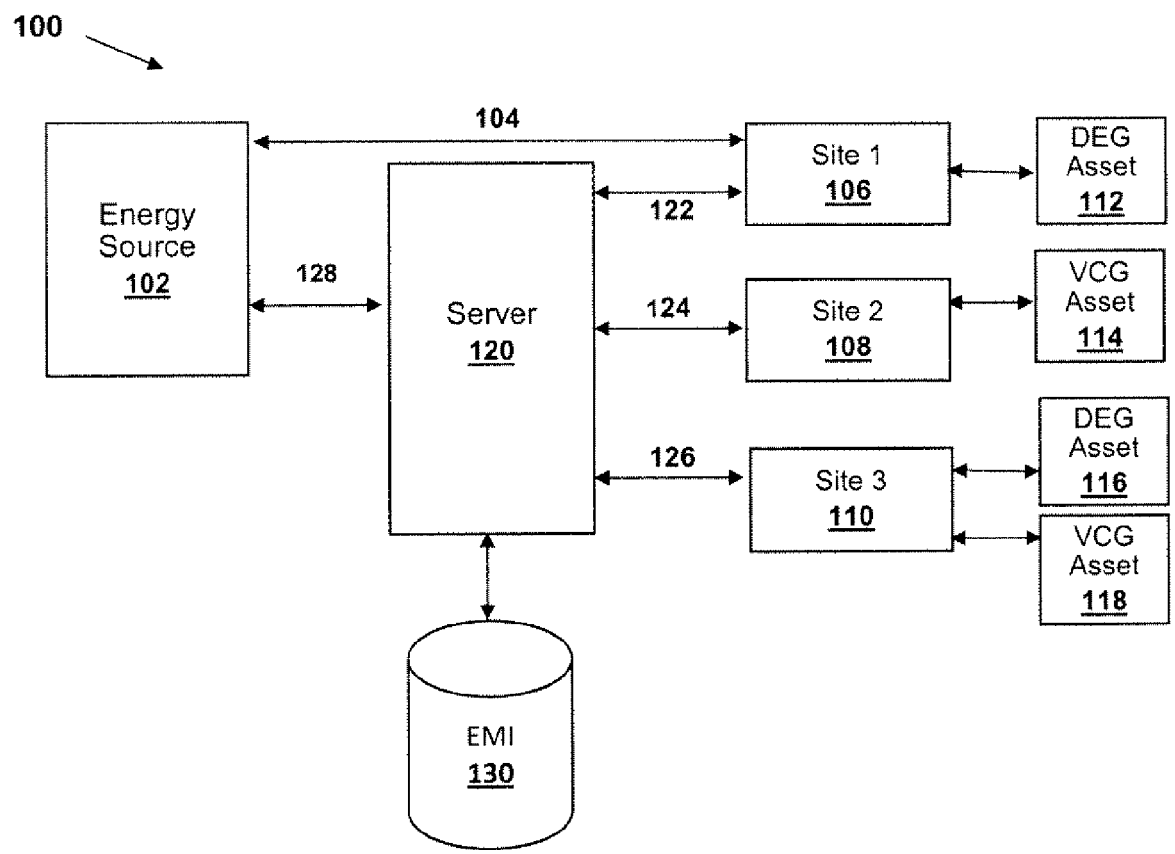
FIG. 1 illustrates a block diagram of an energy management system and energy transmission system according to an aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

For purposes of this disclosure, an energy management system, network device, or any combination thereof can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an energy management system, network device, or any combination thereof can include any combination of a personal computer, a PDA, a consumer electronic device, a media device, a smart phone, a cellular or mobile phone, a smart utility meter, an advanced metering infrastructure, a smart energy device, an energy display device, a home automation controller, an energy hub, a smart energy gateway, a set-top box, a digital media subscriber system, a cable modem, a fiber optic enabled communications device, a media gateway, a home media management system, a network server or storage device, an energy substation, a vehicle charging station, a renewable energy production device, a renewable energy control device, an energy storage management system, a smart appliance, an HVAC system, a water pump, a heat pump, a hot water heater, a thermostat, an energy controller, an irrigation system, a lighting system, an alarm system, a smart power outlet, an energy detection device, a power measurement device, a power measurement unit (PMU), an air handler, a wireless air damper, a humidity control system, a heat and motion sensing device, a smart power outlet, a switch router, wireless router, or other network communication device, or any other suitable device or system, and can vary in size, shape, performance, functionality, and price.

According to an aspect, an energy management system can include memory, one or more processing resources or controllers such as a central processing unit (CPU) or hardware or software control logic. Additional components of the energy management system can include one or more storage devices, one or more wireless, wired or any combination thereof of communications ports to communicate with external devices as well as various input and output (I/O) devices, such as a keyboard, a mouse, pointers, controllers, and display devices. The energy management system can also include one or more buses operable to transmit communications between the various hardware components, and can communicate using wireline communication data buses, wireless network communication, or any combination thereof.

As used herein, a wireless energy network can include various types and variants of wireless communication configurable to manage energy at a site, including associated protocols or enhancements thereto including, but not limited to, any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

As described herein, a flow charted technique, method, or algorithm may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, system, or apparatus that comprises a list of features is not necessarily limited only to those features but may include other features not expressly listed or inherent to such process, method, article, system, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

In accordance with an aspect of the disclosure, an energy management system is disclosed. The energy management system can include a database configured to store site report data received from a plurality of residential sites using a wireless home energy network at each site. According to an aspect, each residential site can include a thermostat accessible to the wireless home energy network. The energy management system can also include a processor operably coupled to the database and configured to access the site report data, detect a current temperature set-point of the thermostat at a first residential site, and detect a first seasonal profile of the thermostat. The processor can also detect a current operating mode of a HVAC system operably coupled to the thermostat, and determine a thermostat schedule of the thermostat using the first seasonal profile and the current operating mode of the HVAC system.

FIG. 1 illustrates a block diagram of an energy management system, illustrated generally at 100, according to an aspect of the disclosure. Energy management system 100 can include an energy source 102 configured to generate energy that can be coupled to an energy transmission system 104 to satisfy a load or demand at a first site 106, second site 108, third site 110, or any combination thereof. Energy transmission system 104 can be configured to be coupled to one or more of first site 106, second site 108, third site 110, or any combination thereof.

According to an aspect, first site 106 can include a distributed energy generation (DEG) asset 112. DEG asset 112 can include various types of energy producing assets such as a natural gas generator, fuel cell generator, solar array, solar concentrator, wind turbine generator, battery array, electric vehicle, hyrdo-power generator, any type of generator, or any combination thereof capable of outputting energy to energy transmission system 104.

According to a further aspect, second site 108 can include a virtual capacity generation (VCG) asset 114. VCG 114 can include an energy consumption device configured to reduce energy consumption or load placed on energy transmission system 104 during various periods. For example, VCG asset 108 can include equipment located a commercial facility, industrial facility and the like. According to another aspect, second site 102 can include a retail center having energy consuming devices that can be managed to reduce energy consumption. In other forms, second site 108 can include a residential site having VCG assets that include energy consuming devices such as an HVAC system, heat pump, hot water heater, lighting systems, entertainments systems, refrigerators, or any type of electricity consuming device or system, or any combination thereof. According to a further aspect, third site 110 can include a combination of a assets such as DEG asset 116 and a VCG asset 118.

According to another aspect, first site 106 can be coupled to server 120 using an Internet or broadband connection 122. Second site 108 can be coupled to server 120 using a second Internet or broadband connection 124. Third site 110 can be coupled to server 120 using a third Internet or broadband connection 126. Various other types of connections can also be deployed by energy management system 100 as needed or desired.

According to another aspect, portions or combinations of energy transmission system 104 can be used within one or more markets such as ERCOT, Southwest Power Pool (SPP), California Independent system operator (CAISO), Western Electric Coordinating Council (WECC), other grids or markets, future national or regional grids, operators, councils, or any combination or portions thereof can be accessed using energy management system 100.

According to a further aspect, energy management system 100 can utilize energy management information (EMI) 130 to manage energy production, consumption, curtailment, load shedding, purchase decisions, demand response decisions, or any combination thereof. For example, EMI 130 can include any combination of data sources such as real-time congestion data, energy transmission line operating conditions, synchrophasor data, firm owned alternative energy generator operating status, non-firm owned alternative energy generator operating status, locational marginal pricing data, congestion revenue rights data, energy storage capacity, stored energy output capacity, real time energy pricing data, historical energy pricing data, real time nodal demand data, historical nodal demand data, real time zonal demand data, historical zonal demand data, external market demand data, historical external market demand data, nodal price data, real time energy price data, real time energy demand data, historical energy demand data, historical energy price data, firm owned alternative energy generator data, non-firm owned alternative energy generator data, est. firm owned alternative energy generator output schedule, estimated non-firm owned alternative energy generator output schedule, macro environmental data, micro environmental data, real-time grid congestion data, historical grid congestion data, renewable energy credit information, carbon credit cap and trade pricing information, fixed and variable costs for operating alternative energy generators, production tax credit (PTC) pricing information, investment tax credit (ITC) information, federal grant information, credit-to-grant comparison analysis data, PTC to ITC analysis data, interest/finance data for alternative energy generators, asset depreciation schedules, available solar and wind output capacity, distributed energy production scheduling data, feed-in tariff data, baseline energy generator data, load utilization data, transmission efficiency data, congestion right revenue data, priority dispatch data, federal renewable portfolio standard (RPS) data, state renewable portfolio standard (RPS) data, net-metering data, current or forecasted % coal production data, current or forecasted % natural gas production data, current or forecasted % green house gas production data, current or future coal pricing data, current or future natural gas pricing data, current or future oil pricing data, current or future energy transmission pricing data, forecasted transmission price setting events, virtual capacity data, historical site performance data, seasonal weather and performance data, aggregate scheduling demand data, collaborative demand response data, historical device consumption data, forecasted device consumption data, or any combination thereof.

Figure 2:
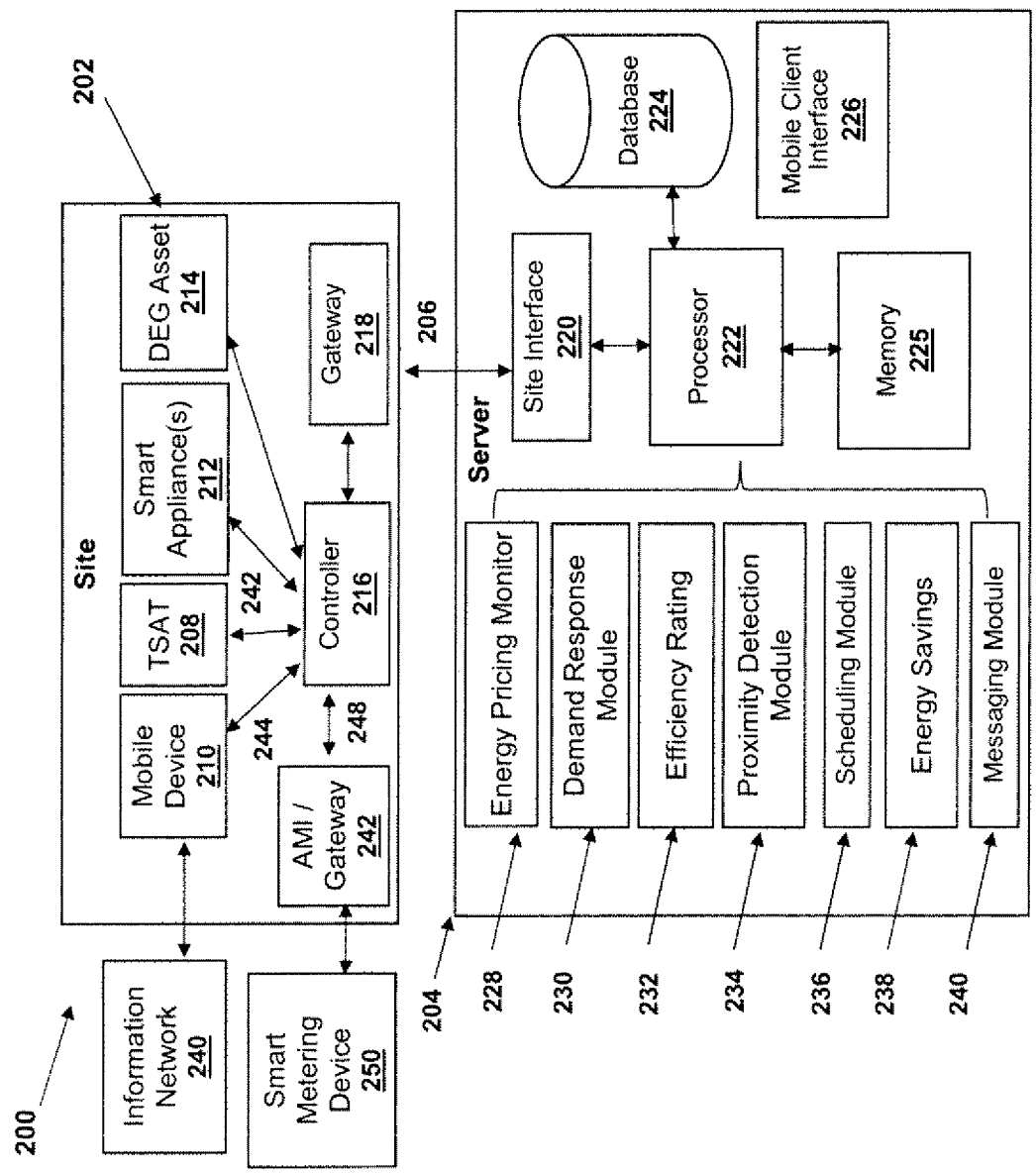
FIG. 2 illustrates a energy management system operable to manage energy at a site according to an aspect of the disclosure.

FIG. 2 illustrates an energy management system, illustrated generally at 200 and configured to be used at a site 202 according to an aspect of the disclosure. Site 202 can include a residential site, and industrial site, a manufacturing site, a commercial site, or any combination thereof. According to an aspect, energy management system 200 can include a server 204 located at a remote location that can be communicatively coupled to a network 206. According to a further aspect, site 202 can include a controller 216 capable of connecting to a wireless thermostat (TSTAT) 208, an associated mobile device 210, one or more smart appliances 212, a distributed energy generating asset 214, or any combination thereof. In a form, controller 216 can establish a wireless energy network 242 using a wireless communication described herein. Various combinations of networks and variants thereof can also be deployed by controller 216 to establish wireless energy network 242.

According to a further aspect, mobile device 210 can communicate with controller 216 using a WIFI or 802.11 based communication, Bluetooth communication, Zigbee communication, or various other wireless communication, or any combination thereof. According to a further aspect, mobile device 210 an communicate with an information network 240 using a subscriber based wireless data communication network such as a 3G network, 4G network, EDGE network, a cellular network, WiMAX, other wireless data communication, or any combination thereof. According to a further aspect, site 202 can include a gateway 218 configured as a broadband gateway such as a DSL gateway, cable system gateway, fiber optic gateway, or any combination thereof.

According to another aspect, energy management system 200 can include an advanced metering infrastructure (AMI) gateway 242 configured to communicate with a smart metering device 250. Smart metering device 250 can include a utility or power company owned metering device and can be configured to communicate using a wireless network such as a cellular network, a mesh network, WiMAX network, or any combination thereof. According to an aspect, controller 216 can communicate with AMI gateway 242 using an AMI network 248 communicated by AMI gateway 242.

According to a further aspect, energy management system 200 can include server 204 configurable to include various energy management logic, modules, interfaces, database sources, or various combinations thereof to manage energy use at site 200. Server 204 can also include a processor 222 that can be configured as multiple processors having one or more processing cores as needed or desired, one or more databases 224 that can be internal or external to server 204, and memory 225 configurable to store data. According to an aspect, server 204 can be located in a single location however multiple locations, and server configurations including cloud computing, distributed computing, dedicated computing, or any combination thereof can be deployed. According to an aspect, controller 216 can include portions or all of server 204 and can deploy some or all of the capabilities of server 204.

According to another aspect, server 204 can include a site interface 220 operable to be coupled to network 206 and gateway 218 to communicate data between site 202 and server 204. Server 204 can also include a mobile client interface 226 that can be coupled to a wireless telecommunications communication gateway such as a WAP gateway and the like. According to an aspect, mobile client interface 226 can communicate with one or more mobile devices 210, using information network 240 or another data network provided by a wireless telecommunications provider. Mobile client interface 226, mobile device 210, an information network 240, or various combinations thereof can include secure connection capabilities such as SSL connections or other carrier supported secure connection capabilities. Server 204 can also include an energy price monitor 228, a demand response module 230, an efficiency rating module 232, a proximity detection module 234, a scheduling module 236, an energy savings module 238, a messaging module 240, or any combination thereof.

According to an aspect, energy price monitor 228 can be deployed by processor 222 and can access EMI stored within database 224 or a remote data source to monitor energy pricing of site 202.

According to an aspect, demand response module 230 can be deployed by processor 222 and can access EMI stored within database 224 or a remote data source to manage demand response preferences and capabilities of site 202.

According to an aspect, efficiency rating module 232 can be deployed by processor 222 and can access EMI stored within database 224 or a remote data source to determine an efficiency rating, thermal response, virtual capacity capabilities, performance data, or various other of site 202.

According to an aspect, proximity detection module 234 can be deployed by processor 222 and can access EMI stored within database 224 or a remote data source to detect a location of mobile device 210 relative to site 202, and modify operating conditions of site 202 based on a proximity of mobile device 210 to site 202.

According to an aspect, scheduling module 236 can be deployed by processor 222 and can access EMI stored within database 224 or a remote data source to schedule energy use or operations of one or more energy consuming devices at site 202.

According to an aspect, energy savings module 238 can be deployed by processor 222 and can access EMI stored within database 224 or a remote data source to determine a past or forecasted energy savings of site 202. In a form, server 204 can include user account login information at a utility company or energy provider that can enable a user to gain access to meter data. As such, energy savings module 238 can pull EMI data stored at a third party website, and output past or forecasted energy savings of site 202.

According to an aspect, messaging module 240 can be deployed by processor 222 and can access EMI stored within database 224 or a remote data source to communicate messages. For example, messaging module 240 can use an email address, mobile device identifier, SMS gateway data, network device identifier data, IP address of controller 216, IP address of gateway 218, IP address of AMI gateway 242, or any combination thereof to communicate messages or other energy management information.

According to a further aspect, energy management system 200 and controller 216 can access consumption data at site 202 using AMI gateway 242. For example, controller 216 can include a wireless communication module (not expressly illustrated in FIG. 2) such as a Zigbee communication module (e.g. 802.15.4), WIFI module, Bluetooth module or various other wireless modules, or any combination thereof. Controller 216 can include one or more profiles stored within a memory device (not expressly illustrated in FIG. 2) configured to include data that will enable controller 216 to join AMI gateway 242. For example, a profile can include various attributes to initiate or establish communication using one or more security levels as needed or desired.

According to a further aspect, energy management system 200 can be used with an energy management application accessible or deployed by mobile device 210 or other computing device. For example, the energy management application can be used to control TSTAT 208, one or more smart appliances 212 or various other devices at site 202. A user can access the energy management application using mobile device 210 or other computing device and read the current settings, operating conditions, or various other types of energy management information associated with site 202. For example, a user can view if TSTAT 208 and an associated HVAC system (not expressly illustrated in FIG. 2) is on or off, a mode such as heat, A/C, or fan, or any combination thereof. In other forms, the user can use the energy management application to access multiple thermostats or zones at site 202. Although the energy management application has been described in the context of accessing TSTAT 208, it should be understood that other network devices, smart appliances, lighting systems, or any other energy consuming or network accessible device or any combination thereof can be accessed using the energy management application.

According to a further aspect, mobile device 210 can include a mobile device application that can upload location data to server 204, controller 216, TSTAT 210, smart appliances 212, various other devices capable of receiving location data, or any combination thereof. For example, in a particular form mobile device 210 can report a current location using a location application program interface (API) of mobile device 210, and can upload location data to server 204 using mobile client interface 226. Server 204 can then deploy proximity detection module 234 to determine whether one or more operating conditions should be altered at site 202. For example, proximity detection module 234 can include rules based logic to determine if an operating condition of a resource at site 202 should be altered. For example, if a user is greater than two miles away from site 202, and is moving away from site 202, server 204 can generate a control action report to be communicated to site 202. For example, a control action report can include adjusting TSTAT 208 up a specific number of degrees relative based on the distance and direction a user may be from site 202.

According to a particular aspect, a user may have previously established an upper setting limit a user would like an internal temperature to reach at site 202 without having an associated HVAC unit turning on. The upper setting limit can be sent to TSTAT 208 based on how far a user may be from site 202. A lower limit can be established for a heating unit as well. These limits can be entered using mobile device 210, a web-based user interface, or any combination thereof.

According to another aspect, server 204 can characterize site 202 to determine operating characteristics and performance data of site 202 and associated energy consuming devices at site 202. For example, server 204 can use efficiency rating module 232 to monitor performance data at site 202. Performance data can include measured performance data detected by controller 216, performance specifications of an energy consuming device that can be based on a model number or other identification data of the device, the size or square footage of site 202, efficiency improvements or specifications of site 202, various other EMI data, or any combination thereof. As performance of an energy consuming device may be detected, an energy alert can be sent using messaging module 240. In another form, an energy alert can be sent to a third party to initiate a service call at site 202. For example, one or more third parties may subscribe to a service to buy leads based on an energy consuming devices performance eroding. Server 204 can include a lead generation module (not expressly illustrated in FIG. 2) that can be communicated using messaging module 240 to a subscriber such as a service company, appliance provider, and the like.

In another form, performance data can be used to determine when to adjust an operating condition of an energy consuming device based on a schedule, proximal location of the user and mobile device, in response to a demand response event, in response to a consumer setting of a desired operating condition based on an energy savings mode (e.g. low, med, high), or any combination thereof.

According to a particular aspect, controller 216 can be configured as a plug-device that can be plugged directly to a wall socket or other power receptacle and can include various components (not expressly shown in FIG. 2). Controller 216 can also include a network interface or Ethernet port, one or more USB interfaces or mini-USB interfaces, an SDIO slot, additional data or plug interfaces, or any combination thereof. Controller 216 can include an internal or external AC, DC, AC to DC converter power module, or any combination thereof to power controller 216. According to an aspect, controller 216 can be provided as a small form factor unit to allow for easy installation, use, and discretionary placement. For example, controller 216 can include a plug computer based on Marvell Corporation's Kirkwood® microprocessor, Part Number 6281 and associated components. In another form, controller 216 can include a plug computer including specifications described in "Sheeva Plug Development Kit Reference Design", version 1.1, and previous versions which are herein incorporated by reference. Other processors having various other speeds and supporting components can also be used. According to an aspect, controller 216 can include various buses that can be used to install one or more wireless modules. For example, controller 216 can include a UART bus interface that can be used to interface a Zigbee module, WIFI module, Bluetooth Module, various other modules or combinations thereof. Various other buses can also be used including but not limited to a USB bus, a SPI bus, an SDIO bus, a mini-USB bus, or any combination thereof. Controller 216 can include buses that can be located internal or external to a housing of controller 216.

According to an aspect, energy management system 200 can include one or more network devices, such as TSTAT 208, smart appliances 212, or various other network devices installed at a residential site such as a home or residence. Controller 216 can establish a wireless energy network 242 capable of communicating with a network device at site 202. Energy management system 200 can also include server 204 disposed remotely from site 202 and capable of generating a control action report to control the network device. Controller 216 can also be located at site 202 including a residential site. Controller 202 can be in communication with server 204. According to an aspect, controller 202 can establish initiate a plurality of operating status requests of the network device, and receive device data in response to at least one of the operating status requests. Controller 202 can further generate a site report including the device data, and initiate a communication of the site report to server 204. During the communication of the site report from controller 202 to server 204, controller 202 can detect an availability of a control action report at server 202 in conjunction with the communication of the site report. As such, a secure connection can be initiated from site 202 to communicate site reports and receive control action reports without having to have server 204 initiate a communication with site 202.

According to another aspect, server 202 can generate control action report prior to a site report upload, in association with a site report upload, or any combinations thereof. For example, one or more control action reports can be generated and queued in advance of a site report upload. In other forms, a control action report can be generated during a site report upload. In yet another form, a control action report can be generated in response to information uploaded within the site report. As such, various combinations of control action report generation techniques can be deployed as needed or desired.

According to an aspect, energy management system 200 can be used to generate a control action report in response to a distance mobile client 210 may be from site 202. For example, site 202 can include a network device, such as TSTAT 208, joined to wireless energy network 242. According to an aspect, controller 216 can be configured to establish wireless energy network 242 using a wireless mesh network and initiate a plurality of operating status requests. For example, controller 216 can access TSTAT 208 using wireless energy network 242 at a first operating status request interval. Controller 216 can be used to generate a site report that can include device data of TSTAT 208 at a site report interval. According to an aspect, a site report interval can be the same interval as the first operating status request interval. In other forms, each interval can be different. For example, the first operating status report request interval can be set to thirty seconds and the site report interval can be set to sixty seconds. As such, two cycles of data can be acquired. Various combinations of intervals can be used as desired.

According to a further aspect, controller 216 can initiate a communication of site report to a remote server such as server 204 using gateway 218. For example, gateway 218 can include a residential broadband connection 206 capable of establishing a secure gateway connection between site 202 and server 204 using a public communication network. According to an aspect, residential broadband connection 206 does not include a cellular communications based network.

In another form, control data can be provided in response to a detection of a travel direction and a distance between mobile device 210 having location reporting device, and site 202. For example, as a user of mobile device 210 is moving away from site 202, server 204 can detect a direction and distance mobile device 210 may be from residential site 202. Server 204 can then determine if a control action should be generated. For example, as mobile device 210 moves away from residential site 202, TSTAT 208 setting can be adjusted up during a warm or summer season (or down during a cold or winter season) to reduce energy consumption. Other network devices can also be adjusted as needed or desired.

According to a further aspect, energy management system 200 can use energy pricing monitor 228 to generate a control action report. For example, energy pricing monitor 228 can be configured to detect energy pricing within an energy market, and initiate curtailing use of a network device, such as TSTAT 208, smart appliance 212, other network devices at site 202, or any combination thereof. For example, energy pricing monitor 228 can output a control action report in response to an unfavorable pricing condition, and further upon the detection of a travel direction and a distance between mobile device 210 and site 202. In another form, energy pricing monitor 228 can also initiate use of one or more network devices at site 202 in response to a favorable pricing condition, and a detection of a travel direction and a distance between mobile device 210 and residential site 202. In this manner, a user's travel direction, distance, and current energy pricing within a market can be used to determine how energy consumption can occur at site 202.

According to a further aspect, energy management system 200 can also use demand response module 230 to detect a demand response condition and respond accordingly. For example, demand response module 230 can be used to detect a grid condition favorable to a demand response event and detect a profile preference setting of an user or site manager of site 202. For example, a user or site manager can set a profile to always participate, not participate, or have a request sent to collaborate on whether to participate. Other profile settings can also be used such as determining an economic or monetary value to a user or site manager if participating in a demand response event. For example, a favorable grid condition can include an increase in the price of energy due to an undersupply of energy within an energy transmission system or market (not expressly illustrated in FIG. 2). In another form, a favorable condition can include an oversupply of energy purchased by an energy provider of site 202. Additionally, a high demand period can be detected and the oversupply of energy can be increased using a demand response event. In another form, a favorable grid condition can include a time interval when transmission pricing to use an energy transmission system may be determined. As such, an energy provider would receive an economic benefit from reducing load when the transmission rate or rate for using transmission lines would be determined. Various combinations of favorable grid conditions can be detected as needed or desired in association with determining a demand response event to curtail energy use at site 202.

According to an aspect, energy management system 200 can use demand response module 230 configured to detect an energy capacity of site 202 having a residence. For example, demand response module 230 can detect a grid condition favorable to a demand response event, and can also detect a preference of an resident or owner of the residence to participate in demand response events. Demand response module 230 can also determine an energy capacity of site 202 using historical device consumption data received in a site report, and forecasted device consumption data. Control data can then be generated to alter an operating condition of the network device in response to the grid condition and the preference of the owner and the energy capacity of site 202.

According to a further aspect, server 204 can determine an energy capacity of site 202 using device data received in association with site reports received from site 202. For example, site report data can be used with efficiency rating module 232 to determine a virtual generation capacity or energy reduction capacity of site 202. Upon detecting an available capacity, demand response module 230 can output a curtailment action to be used within a control action report to be communicated to site 202. For example, a curtailment action can include an updated control data to alter a current operating condition of one or more network devices connected to wireless energy network 242 at site 202.

According to a further aspect, controller 216 can be configured to detect a new set-point value within a control action report, and identify TSTAT 208 to be adjusted to the new set-point value. In some forms, multiple wireless thermostats can be accessed via wireless energy network 242 and adjusted as desired. Controller 216 can communicate a different set-point values to each of the wireless thermostats. Controller 216 can initiate an outputting of new set-point values to TSTAT 208 and others using wireless energy network 242.

According to an aspect, energy management system 200 can use proximity detection module 234 to detect a distance mobile device 210 may be from site 202 including a residential site. For example, proximity detection module 234 can access location data stored within database 224 and provided by mobile device 210 using mobile client interface 226. Proximity detection module 234 can further detect mobile device 210 within a first zone (e.g. less than one (1) mile from the site, less than three (3) miles from site, greater than five (5) miles from site, etc.). Proximity detection module can further detect a current thermostat setting of TSTAT 208, and an indoor temperature detected at site 202 and communicated within a site data report communicated from site 202. Proximity detection module 234 can then determine a percentage adjustment to adjust a current setting of TSTAT 208, and output the percentage adjustment as a new set-point value to be used within a control action report. For example, if mobile device 210 can be detect as being greater than three (3) miles from site 202, TSTAT 208 can be adjusted to within 75% of the maximum setting in a summer season, or minimum setting in a winter season. As such, a site 202 can be managed based on a user's proximity to a site, which zone a user may be located in, and current seasonal schedule or setting being used at a site 202.

According to another aspect, energy management system 200 can include TSTAT 208 configured as a wireless thermostat capable of joining wireless energy network 242 operable as a wireless home energy network. According to an aspect, TSTAT 208 can be configured to not include an enabled local programming schedule configured to control an HVAC system of site 202. For example, TSTAT 208 can include sufficient memory to store a set-point value, but may be not include scheduling capabilities at TSTAT 208. As such, a simplified user interface of TSTAT 208 can be deployed. For example, if TSTAT 208 includes a scheduling feature, energy management system 200 can be used to disable the scheduling feature located at TSTAT 208. As such, TSTAT 208 can be considered a non-programmable thermostat capable of connecting to wireless energy network 242, and set-point values or other control actions can be received using wireless energy network 242. In this manner, scheduling use of TSTAT 208 can be provided using on-line or web application based scheduling tool.

According to a further aspect, controller 216 can be further configured to initiate joining TSTAT 208 to wireless energy network 242 using a unique identifier of TSTAT 208. A unique identifier of TSTAT 208 can be received from server 204 and a local schedule and or scheduling capabilities of TSTAT 208 can be disabled. In this manner, an overall design complexity of a thermostat can be reduced and scheduling capabilities can be provided using a schedule created within a network environment and output by controller 216, server 204, mobile device 210, or any combination of sources capable of providing schedule information or control action data to TSTAT 208.

According to another aspect, energy management system 200 can also use scheduling module 236 to schedule use of a network device located at site 202 and capable of connecting to wireless energy network 242. Additionally, multiple user schedules can be stored within database 224 and used by site 202. For example, scheduling module 236 can be used to detect a first user schedule accessible to controller 216. The first user schedule can include a first schedule event configured to alter an operating condition of a network device such as TSTAT 208, smart appliance 212, or other energy consuming network devices. According to an aspect, the first user schedule can be operably linked to mobile device 210 having a location detection device. The first user schedule can be used or not used based on a distance mobile device 210 may be from residence 202. In this manner, as user returns to residential site 202, a user schedule can be activated and used.

According to another aspect, energy management system 200 can include a second user schedule accessible to controller 216. For example, a second user schedule can include scheduling data to schedule a second schedule event configured to alter an operating condition of a network device at site 202. The second user schedule can be operably linked to a second mobile device having a location reporting device (not expressly illustrated in FIG. 2). For example, the second user schedule can be used or not used based on a distance a second mobile device may be from site 202. In another form, mobile device 210 may not be located at site 202, but a second mobile device may located be at site 202. In this form, a second user schedule may be based on detecting the second mobile device located at site 202. According to an aspect, the second user schedule can be disabled when the second user leaves the site 202 and a proximity mode can be enabled. According to a further aspect, a second user schedule may not be operably linked to any mobile device. As such, controller 216 can use a second user's schedule to schedule events in response to a detection of mobile device 210 being a distance away from residential site 202. In this manner, multiple user schedules and proximity control of energy use can be deployed at a common site.

According to an aspect, energy management system 200 can also include controller 242 capable of detecting advanced metering infrastructure (AMI) wireless network 248 output by smart metering device 250. For example, smart metering device 250 can include, or can be coupled to, AMI/Gateway 242 capable of outputting AMI wireless network 248. In other forms, smart metering device 250 can be configured to output AMI wireless network 248 directly.

According to another aspect, controller 216 can be configured with a communication interface (not expressly illustrated in FIG. 2) to enable joining AMI wireless network 248. In this manner, controller 216 can gain access to AMI wireless network 248 to receive AMI data. In a further aspect, controller 216 can use the AMI data to alter an operating condition of a network device at site 202, output AMI data using a display of a network device, communicate AMI data to server 204, or any combination thereof. According to a further aspect, controller 216 can communicate the AMI data with site report data as a site report to server 204. As such, AMI data and site report data can be used at server 204.

According to a further aspect, controller 216 can connect to AMI wireless network 248 at a first security level, and alter an operating condition of a network device connected to wireless energy network 242 at a second security level. According to an aspect, wireless energy network 242 can be deployed at the same security level as AMI wireless network 248, can be deployed at a different security level than AMI wireless network 248, or any combination thereof.

According to a further aspect, a user or site profile can be used to enable use of control actions initiated or received by AMI wireless network 248. For example, a site manager or user can establish a profile setting to enable or disable a utility company to alter an operating condition of a network device at a residence. As such, controller 216 can access a profile setting prior to connecting to AMI wireless network 248, enabling use of a control action received using the AMI wireless network 248, or any combination thereof. In other forms, controller 216 can access server 204 to detect profile settings.

According to another aspect, energy management system 200 can also include controller 216 configured to communicate using a Zigbee network and a WIFI network. For example, controller 216 can include a ZigBee enabled communication device (not expressly illustrated in FIG. 2) capable of initiating wireless energy network 242 at site 202 that includes a residential site. Controller 242 can also include a WIFI enabled communication device (not expressly illustrated in FIG. 2) capable of initiating WIFI network 244 operable to be coupled to mobile device 210 that may be WIFI enabled, or other WIFI enabled devices, systems, or any combination thereof.

According to a further aspect, controller 216 using WIFI network 244 can be used to alter an operating condition at site 202 in response to detecting mobile device establishing or losing a WIFI connection to WIFI network 244. For example, a user schedule can be enabled when a WIFI connection of mobile device 210 can be detected, and an operating condition of one or more network devices connected to wireless energy network 242. As mobile device 210 leaves site 202, an operating condition of one or more network devices can be altered upon a detection of a WIFI connection of mobile device 210 to WIFI network 244 being lost.

According to an aspect, mobile device 210 can communicate with controller 216 to access site data, site reports, control action data, AMI data, or various other types of EMI data available using WIFI network 244. According to an aspect, mobile device 210 can initiate control actions, control action reports, or combinations thereof that can alter an operating condition of a network device coupled to wireless energy network 242.

According to another aspect, controller 216 configured with a WIFI communication device can enable a connection to a home computer system, laptop computer, Netbook, home server, IPAD®, home automation system, router, or other WIFI enabled system or devices (not expressly illustrated in FIG. 2), or any combination thereof. For example, a user can use an IPAD to access controller 216. Using WIFI network 244 and wireless energy network 242, a user can receive operating status information, initiate control actions of network devices, schedule energy use, or various other energy management activities. In some forms, controller 216 may not have access to network 206. Controller 216 can include portions or all of the capabilities of server 204 to schedule energy use, generate scheduling data, access site data, generate control action data, or any combination thereof. As such, in some instances network 206 may not be established (e.g. in a new construction site, etc.), or if a network failure or an absence of network availability occurs, a user can access network devices at site 202 and manage energy use.

According to another aspect, controller 216 can detect when mobile device 210 connects to WIFI network 244 and alter an operating condition of a network device coupled to wireless energy network 242. For example, as mobile device 210 moves or transitions away from site 202, controller 216 can detect a signal loss and alter an operating condition at site 202. According to an aspect, controller 216 can include control action data to be used upon detecting a signal loss. In other forms, controller 216 can report the signal loss to server 204 within, or external to a site report. Server 204 can then determine a control action (if any) in response to a reporting of the WIFI signal being lost.

According to a further aspect, server 204 can initiate a text message using messaging module 240 to be sent to mobile device 210. User of mobile device 210 can then view the text message and respond to alter an operating condition at site 202. For example, a user can place site 202 in proximity mode which will enable an energy efficiency schedule associated with the user. In other forms, a user can access an energy management application accessible to mobile device 210 and alter an operating condition at site 202. Various combinations of messaging communications (e.g. SMS text, email, social network messaging, social network postings, etc.), message content, and various combinations thereof can be used to inform a user of mobile device 210 that an operating condition can be altered in response to mobile device 210 not being connected to a WIFI signal at site 202, a detection of mobile device 210 being a distance from site 202 using location detection, or any combination thereof.

According to another aspect, controller 216 can also connect to mobile device 210 using WIFI network 244 and communicate information using mobile device 210 and information network 240. For example, mobile device 210 can connect to information network 240 which can be a wireless subscriber based information network. Mobile device 210 can receive energy management information from an information source accessible to information network 240. According to an aspect, mobile device 210 can include a mobile energy management application that can be used to access server 204 or other information source(s). Mobile device 210 can be used to upload information such as a site report, network device data, operating statuses, or various other types of information that can be obtained at site 202 using wireless energy network 242. According to a further aspect, mobile device 210 can receive information such as control action reports, control data, environmental data, scheduling data, user profile data, network device profile data, Zigbee based profile data, WIFI data, configuration data, network device data updates or firmware updates, controller data updates or firmware updates, or various other types of EMI data or any combination thereof that can be communicated to mobile device 210 using information network 240. Mobile device 210 can then communicate received information to controller 216 using WIFI network 244. Controller 216 can use the received information to manage energy use at site 202.

According to a further aspect, controller 216 can be configured to request profile data, profile updates, network device updates, or any combination thereof of a network device using WIFI network 244, wireless AMI network 248, network 206, or any combination thereof. For example, controller 216 can detect a Zigbee enabled network device at site 202. Controller 216 can identify unique identifier of the Zigbee enabled network device, and request a profile of the Zigbee enabled network using WIFI network 244. For example, mobile device 210 can request a Zigbee profile using information network 240. In another form, a home computer, laptop computer, IPAD® etc. can request the Zigbee profile using network 206. In another form, controller 216 can access wireless AMI network 248 to request a Zigbee profile. As such, controller 216 can be configured to request profile data, profile updates, network device updates, various other types of information to manage network device, or any combination thereof of a network device using one or more networks accessible to controller 216.

According to a further aspect, controller 216 can be incorporated into a network device. For example, controller 216 and TSTAT 208 can be combined into the same unit. Controller 216 can also include an 802.15.4 based wireless communication device (not expressly shown in FIG. 2) operable to establish wireless energy network 242. Controller 216 can also include an 802.11 based wireless communication device (not expressly shown in FIG. 2) operable to communicate with mobile device 210. Using the 802.11 based wireless communication device, controller 216 can communicate with gateway 218 having a residential broadband wireless router capable of establishing an 802.11 based wireless communication network at site 202. In this manner, combining controller 216 and TSTAT 208 can lead to a reduction in the number of separate devices deployed at site 202.

According to a further aspect, controller 216 can include a processor (not expressly illustrated in FIG. 2) configured to deploy a web server capable of enabling web services. For example, controller 216 can connect to WIFI network 244 and a computer system at site 202. The computer system can include a browser configured to access an IP address of the web server of controller 216 to manage one or more network devices coupled to wireless energy network 242. In a particular form, controller 216 can include a scheduling tool configured to be output by the web server and accessible using WIFI network 244. According to a further aspect, controller 216 can be coupled to mobile device 210 and controller 216 can be configured to enable access to a subscriber based wireless information network 240 using a connection to the 802.11 based wireless communication device of controller 216.

Figure 3:
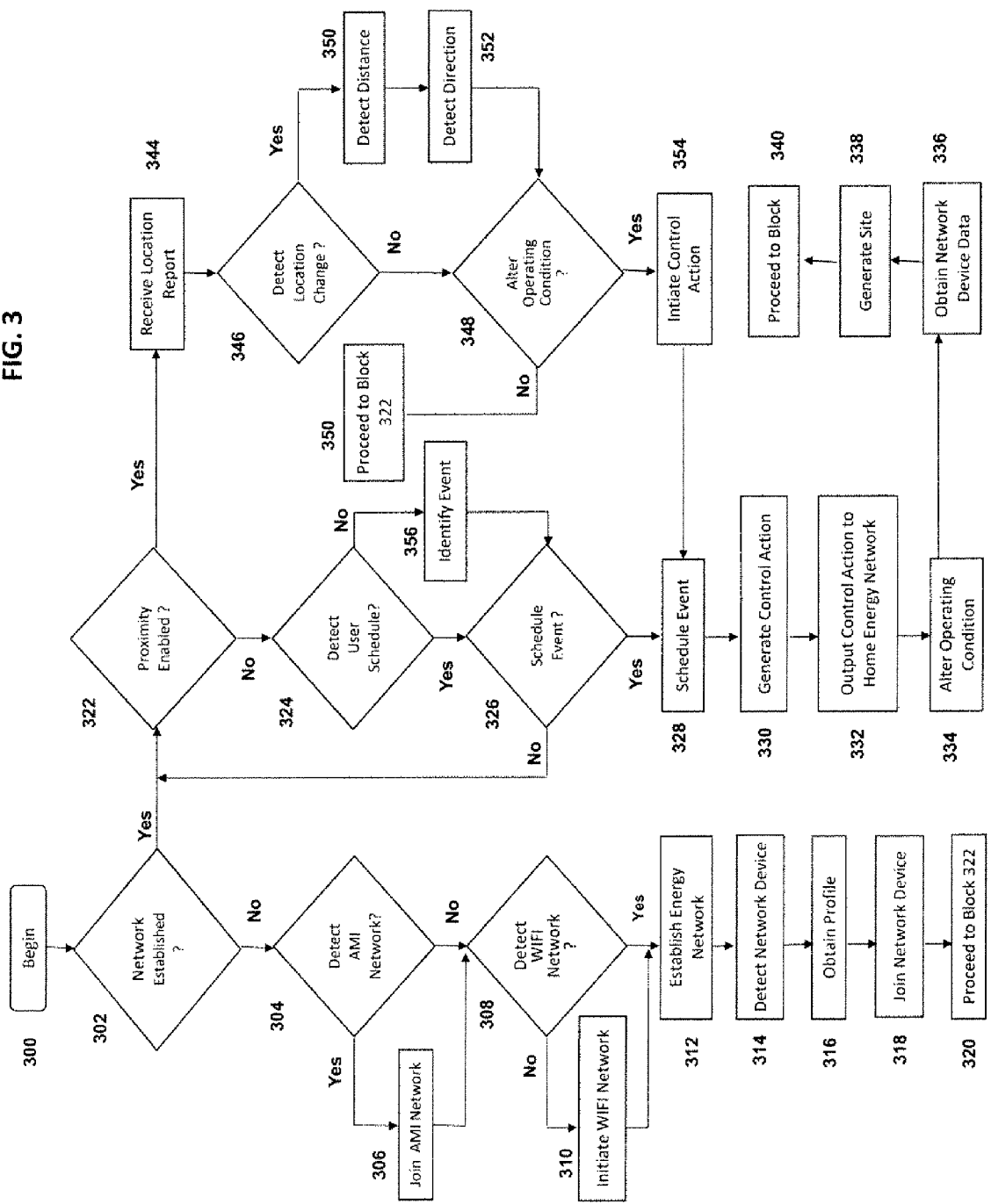
FIG. 3 illustrates a flow diagram of a method of managing energy at a site according to an aspect of the disclosure.

FIG. 3 illustrates a method of managing energy at a site according to an aspect of the disclosure. Portions or all of the method of FIG. 3 can be used with portions or all of the energy management systems, devices, or apparatuses disclosed herein, or any other type of system, controller, device, module, processor, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at block 300. At decision block 302, the method detects whether an energy network has been established. For example, a wireless energy network can be established and can include one or more networks that can be used to manage energy use at a site. According to an aspect, a wireless energy network can be established using a wireless enabled controller located at a residence. At decision block 302, a detection of an energy network, AMI enabled network, WIFI enabled network, Zigbee enabled network, WiMAX network, or any other type of energy network, or any combination thereof can be detected. If at decision block 302, one or more networks may not be detected, the method can proceed to decision block 304. At decision block 304, the method can detect if there is an AMI network available. If at decision block 304 there is an AMI network available, the network can proceed to block 306 and the AMI network can be joined. For example, the AMI network can include a specific protocol and security level to establish communication or allow a joining of the network. For example, the AMI network may require an encryption key-based security that can require specific keys, certificates, etc. to enable access. According to another aspect, the AMI network may include a smart grid based security described in Smart Grid standards. As such, various combinations of joining the AMI network can be deployed. Upon joining the AMI network, the method can proceed to decision block 308.

In some forms, an AMI network may be available and the method can be modified to determine whether to join the AMI network. If at decision block 304, an AMI network may not be detected (or may not be joined), the method can proceed to decision block 308. At decision block 308, the method can detect if a WIFI network (e.g. 802.11 based network) may be available. If a WIFI network is not detected or is not available, the method can proceed to block 310 and a WIFI network can be established. For example, a controller, network device, smart appliance, or various other types of energy consuming devices can include a WIFI communication device capable of initiating a WIFI network. As such, at block 310 a WIFI network can be established and the method can proceed to block 312. If at decision block 308 a WIFI network exists, or if a WIFI network should not be established, the method can proceed to block 312. In some forms, an additional WIFI network can be established at block 310 and the method can be modified to allow a bridging between the two WIFI networks.

According to an aspect, at block 312 an energy network can be established to manage one or more network devices. For example, an energy network can include a wireless energy network that is based on a Smart Grid standards and protocols such as a Zigbee based protocol. Various other types of communication can also be used to establish an energy network. An energy network can be established by outputting a wireless network at a site to enable a network device to join the energy network.

Upon establishing an energy network, the method can proceed to block 314 a network device capable of connecting to the energy network can be detected. For example, a network device can include a Zigbee enabled communication device capable of joining a Zigbee enabled energy network. A unique identifier of the network device can be detected and a profile can be obtained at block 316. In some forms, a unique identifier can be previously obtained by a controller deploying the energy network. For example, a unique identifier can be obtained from a server accessible to a controller, via a WIFI or other network accessible to a controller, or any combination thereof. In other forms, an external information source can be capable of providing a unique identifier, or a list of unique identifiers to identify a valid network device that can be joined to the energy network. A controller can then use the unique identifier, and the profile, to establish or join the network device to the energy network.

In another form, a profile of a network device may not be immediately available, or may have been revised. As such, a profile can be obtained using a WIFI network, an AMI network, an Internet or broadband network, or any combination thereof. For example, a unique identifier, a model number, a serial number, a device class identifier, or any combination thereof that can be communicated to an external source or information network to obtain a profile can be used. A profile can then be identified and used to join the network device to the energy network.

According to a further aspect, obtaining a profile at block 316 can include initiating a request using a controller and an information network accessible to a mobile device capable of communicating with a WIFI network at a site. For example, a profile can be provided by connecting a mobile device to a wireless information network such as a 3G data network, 4G data network, or other subscriber based wireless information network. The mobile device and then communicate the profile to the controller using the WIFI network at the site. The controller can then receive the profile and use at least a portion of the profile within the energy network.

According to an aspect, upon obtaining a profile, the method can proceed to block 318 and the network device can be joined to the energy network. For example, the network device can be joined at a security level that is different than required by an AMI network, or other secure network. In some forms, the network device can be joined to multiple networks or combination of networks while joined to the energy network. In other forms, the network device can be joined to only the energy network. In still other forms, an AMI network connection can be established to enable an AMI network to access the network device, and the network device can unjoin or disconnect the AMI network and join the energy network. In another form, information received from the AMI network can be used to alter an operating condition of the network device using the energy network. Various other permutations of joining a network device to an energy network or other networks can also be realized as needed or desired.

According to a further aspect, a network device can join the energy network using a standardized profile, such as a Zigbee profile. In addition, a network device can be joined using a profile modifier that can extend the functionality of the Zigbee profile associated with a specific network device. For example, a controller establishing the energy network can access profile modifiers to enhance use of a specific network device.

According to a further aspect, an AMI network can be joined during a period of time, and then the energy network can be joined during a separate time period. As such, various combinations of joining a network device to one or more networks can be used as needed or desired to manage energy use of a network device. Additionally, the method can be modified to join additional network devices to one or more networks as needed or desired. Upon joining one or more network devices, the method can proceed to block 320 and then to decision block 322.

At decision block 322, the method can detect whether a proximity mode associated with a site and energy network is enabled or disabled. For example, proximity mode can include associating a mobile device with a residential site, and automatically controlling a network device based on detecting a location the mobile device may be from the residential site. One or more mobile devices associated with a site can include a location reporting device capable of outputting a location report. The location reporting device can use various technologies to report location including GPS, GPRS, cell tower triangulation, or various other location reporting technologies. In another form, a location reporting device of a mobile device can also include a WIFI radio capable of being connected to a WIFI network. As such, a mobile device can be connected to a WIFI network at the site using a WIFI connection, and as a WIFI connection is established or lost, a proximity mode can be enabled and disabled accordingly.

According to an aspect, at block 322 if proximity mode is enabled, the method can proceed to block 344 as described below. If at decision block 322 proximity mode may not be enabled, the method can proceed to decision block 324 to detect if a user schedule is available. For example, a user schedule can include an event schedule to control one or more network devices. According to an aspect, one or more user's can create a schedule that can be accessed by a controller, and used to control one or more wireless thermostats or other network devices that can be joined to the energy network. According to a further aspect, a user schedule can be linked to a mobile device of the user. In some forms, the mobile device can include a location detection device configured to report locations of the mobile device.

According to an aspect, if a user schedule may not be detected, the method can proceed to block 356 and an event can be identified. For example, an event can include one or more programmed events that can be created and accessed at a specific time, date, period, or other to alter an operating condition of a network device. For example, a user may not have provided a user schedule to schedule energy use of a hot water system at a residence. As such, a default schedule can be accessed to identify an event and schedule or manage use of the hot water heater. For example, an event can include decreasing a hot water heater ten (10) degrees at midnight. Another event can include increasing a hot water heater fifteen (15) degrees at five (5) A.M. In another form, a network device can include a wireless thermostat that can be used to control an HVAC system based on a time of day or other attribute. For example, a weather forecast can be determined, and an event can be scheduled to adjust a wireless thermostat accessible to the energy network. Various other environmental conditions, grid conditions, user profiles, device profiles, energy pricing, or any combination of energy management information can be used to schedule or create an event.

Upon identifying an event, the method can proceed to decision block 326 and detect whether to schedule the event. For example, if an event is configured to be scheduled at a specific time of day, the method can detect the event at decision block 326. If an event may not be detected, the method can proceed to decision block 322 and repeats.

According to an aspect, if at decision block 326 an event should be scheduled, the method can proceed to block 328 and the event can be scheduled. For example, a network device can be identified, an operating condition to be altered can be identified, a time of day to alter the operating condition can be identified, a period of time to alter an operating condition can be identified, a device profile can be used, or any combination of data that can be used to schedule an event can be used. According to another aspect, the method can include initiating a scheduled event at block 328 using a portion of a programming schedule stored within a memory of the controller associated with the energy network. For example, portions of event data can be communicated from a remote server to the controller, and used with a programming schedule stored within the controller to schedule an event. In this manner, one or more sources can be used alone or in combination to schedule events.

According to a further aspect, upon scheduling the event, the method can proceed to block 330 and a control action can to be communicated to a network device. For example, a control action can include control action data or device data sufficient to alter an operating condition of a network device. In some forms, data formatted according to a standard profile, such as a Zigbee Home Automation profile, Zigbee Energy Profile, and the like. In other forms, control action data can include a device identifier, a message format to output a message, a parameter or feature of a network device to alter, an updated set-point or operating condition of the network device, a network or security key, a date and time, or any combination thereof.

According to an aspect, the method can proceed to block 332 and the control action can be output to the energy network as an outgoing message and received by the network device as an incoming message. For example, the network device can detect the outgoing message communicated within the energy network using a unique identifier of the network device.

At block 334, upon the network device receiving the incoming message, a control action can be extracted from the incoming message and the operating condition at the network device can be altered using the control action data. For example, an dishwasher may be turned on, a clothes washer or dryer turned on, lights within a home can altered, a thermostat can be adjusted, a hot water hear can be adjusted, or various other types of control actions can be initiated as needed or desired.

At block 336, network device data can be obtained from the network device using the energy network. For example, a network device can receive a request to output operating status information as network device data to the energy network. In other forms, the network device can be enabled to periodically publish status information to the energy network and received by the controller. Upon outputting the network device data, the method can then proceed to block 338 and a site report can be generated. For example, a site report can include network device data received from one or more network devices accessible to the home energy network. Site report data can be stored locally to the controller, and processed to confirm an updating of the control action. The site report data can be stored within a site report and communicated to a remote server configurable to receive and process the site report data within a site report. According to an aspect, a site report can be communicated to a remote server configurable to receive site reports from the controller using a broadband connection initiated by the controller. Other forms of communication can also be used to communicate a site report as needed or desired. Upon generating a site report, the method can proceed to decision block 302.

According to an aspect, if at decision block 322 proximity detection may be enabled, the method can proceed to block 344 and a location report can be received. For example, a location report can include location data output from a location reporting device such as a mobile device. In other forms, a location report can be generated in response to a detection that a mobile device having a WIFI radio may be within range, or out of range, of the WIFI network at the site. As such, the method can be used to alter an operating condition of the network device using the energy network in response to detecting the location reporting device establishing or losing a WIFI connection to the WIFI network.

According to an aspect, the method can proceed to decision block 346 and can detect if a location change has occurred. If a location change has not occurred, the method can proceed to block 348 and detects whether to alter an operating condition. If an operating condition of one or more network devices may not be altered, the method can proceed to block 350, and to block 322.

According to another aspect, if at decision block 346 a location change may be detected, the method can proceed to block 350 and detects a distance a location reporting device may be from an associated site. The method can then proceed to block 352 and detects the direction of the mobile device. For example, if the distance has increased from a previous location reported, the method can detect that a user may be moving away from a site. In other forms, a detected direction can include moving toward a site, moving away from a site, or not moving at all.

Upon detecting a direction, the method can proceed to decision block 348 and detects whether to alter an operating condition of a network device. For example, in addition to detecting a distance and direction a user may be from a residence, various other types of information can also be used to alter an operating condition. For example, data such as real time velocity data, average velocity data, estimated length of time a user may take to return to a site, thermostat scheduling data, network device scheduling data, site report data, real-time weather condition data, traffic condition data, user driving pattern data, daily driving pattern data, GPS mapping data, home energy efficiency ratings, demand response data, curtailment data, energy pricing data, grid condition data, various other types of EMI, or any combination thereof.

Upon detecting an operating condition to alter, the method can proceed to block 354 and initiates a control action. For example, a server remote to a site can be used to generate a control action that can be included within a control action report and communicated to the controller at the site. In a form, the control action report can be communicated in association with an upload of a site report. According to another aspect, a control action can be generated by the controller. For example, a location and direction of a mobile device can be identified and communicated to the controller. The controller can then determine whether to generate a control action using the location data and direction data, and possible other data as needed or desired. The method can then proceed to block 328 as generally described above. If at decision block 348 an operating condition of a network device should not be altered, the method can proceed to block 350 and to block 322.

According to an aspect, the method can be provided to detect a distance between the location reporting device and the site using a previously stored location of the residence and a new location of the location reporting device. At decision block 354 altering an operating condition can include altering an operating condition of the network device in response to detecting the location reporting device is traveling away from the residence. Further, altering an operating condition of the network device in response to detecting the location reporting device is traveling toward the residence.

According to another aspect, the method can be provided to detect a location reporting device at a first distance at block 350, and at decision block 348 initiate a control action. As the location reporting device may be detected at a second distance, a second control action can be initiated. For example, a control action can include setting a first temperature set-point of a thermostat in response to detecting the first distance. The method can further be provided to detect the location reporting device at a second distance different from the first distance, and set the temperature set-point to a second value.

According to a further aspect, the method can be modified to detect an upper and lower thermostat set-point limits of a network device. For example, an upper set-point limit can include a maximum a temperature that should be reached within a site during a warm season. A set-point of a thermostat can then be determined by determining the difference between a previous set-point and the maximum set-point. In some forms, a percentage adjustment, such as 30%, 50%, 75%, etc. of the resulting difference between a maximum set-point and a base set point can be used to determine a new set-point. For example, if a thermostat is set to seventy (70) degrees and has a maximum set-point of eighty (80) degrees, the delta between the two being ten (10) degrees. A new set-point can then be generated by multiplying this delta by a percentage, such as 50%, and adding it to the current set point. In this example, a new setting of seventy five (75) degrees would be the resulting set-point. In other forms, the method can use the maximum and minimum set-points, resulting or current set-points, in association with a time of day, a distance or distances a user may be from a site, or various other data that can be used to determine a set-point using maximum and minimum set-point values.

Figure 4:
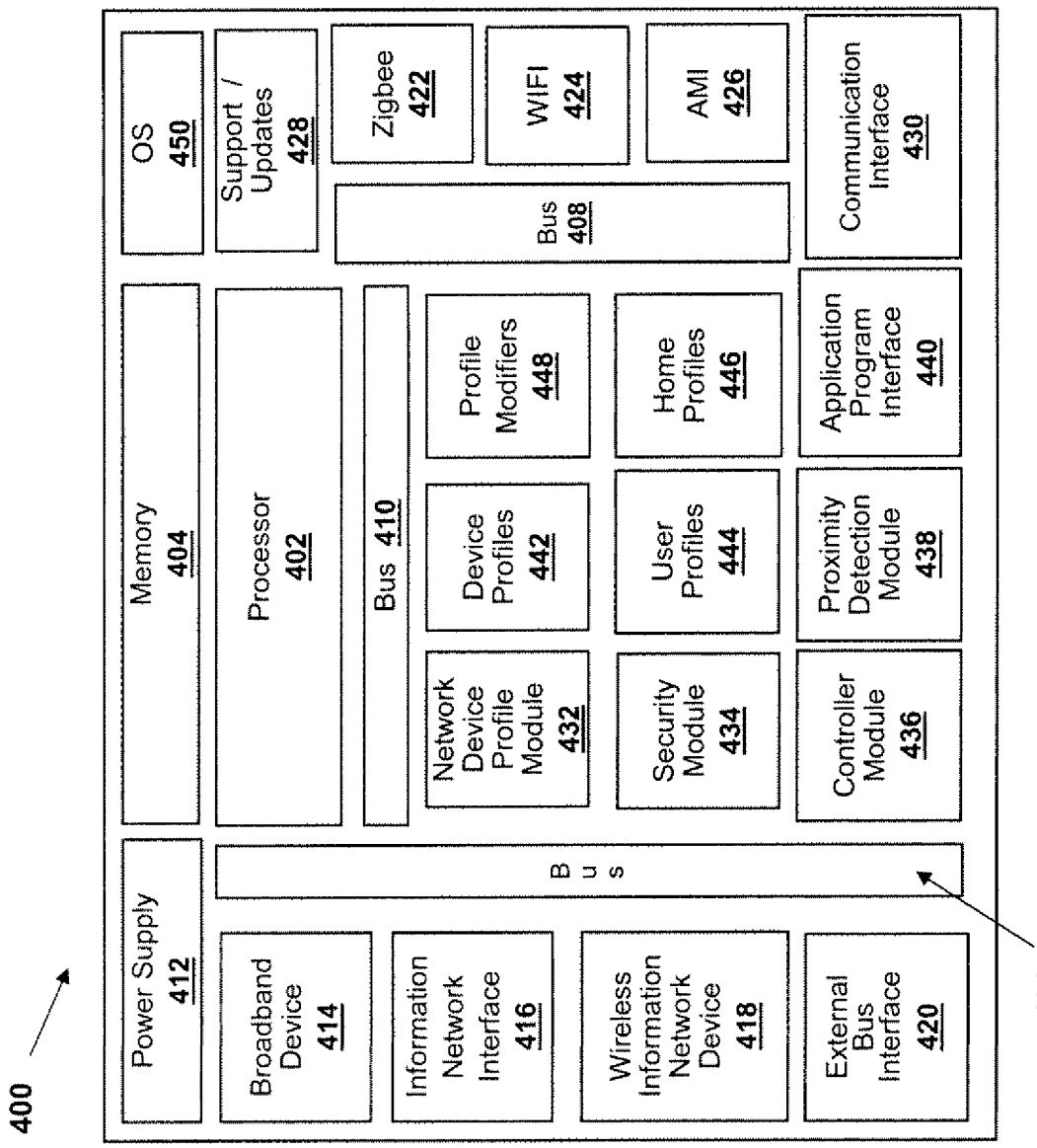
FIG. 4 illustrates a block diagram of a controller according to an aspect of the disclosure.

FIG. 4 illustrates a block diagram of an energy management apparatus, illustrated generally as controller 400, according to an aspect of the disclosure. Controller 400 can include a processor 402 and memory 404 configurable to store data. Memory 404 can be configured as on-board memory of processor 402, or in other forms can also include expandable memory such as DDR memory, Flash Memory, EPROM, ROM, or various other forms, or any combination thereof generally illustrated as memory 404.

According to an aspect, controller 400 can include buses 406, 408, 410 configured to couple data and signals to various components within controller 400. Although illustrated as multiple buses 406, 408, 410, controller 400 can include a single bus, multiple buses, or any combination thereof. Various types of bus configurations can be used as needed or desired including, but not limited to, any combination or portion of a serial bus, a parallel bus, a serial-parallel bus, a universal serial bus, industry standard bus, controller area network bus, a serial peripheral bus, a universal asynchronous receiver transmitter bus, a control bus, standard digital input output bus, or any combination thereof.

According to an aspect, controller 400 can also include a communication interface 430, an information network interface 416, an external bus interface 420, an application program interface 440, or any combination thereof configurable to be coupled to one or more of buses 406, 408, 410 or any combination thereof. According to an aspect, any combination of interfaces 430, 416, 420, 440 can be configured in any combination of hardware, software, or firmware, and can include any combination or portion of a serial bus interface, a parallel bus interface, a serial-parallel bus interface, a universal serial bus interface, industry standard bus interface, controller area network bus interface, a serial peripheral interface, a universal asynchronous receiver transmitter interface, a control bus interface, standard digital input output interface, or any combination thereof.

According to a further aspect, controller 400 can also include a power supply 412 capable of providing power to controller 400. Power supply 412 can be an internal power supply and in other forms can be provided external to controller 400. Controller 400 can also include a broadband device 414 configured to be coupled to a broadband network. For example, broadband device can include an Ethernet communication module, a Cable or coaxial-based communication module, and can include communication logic to receive and transmit data between controller 400 and an information network such as a LAN, WAN, local network, the Internet, and the like. Broadband device 414 can include TCP/IP communication capabilities and can also be security enabled to transmit SSL data between controller 400 and an information network.

According to a further aspect, controller 400 can also include an information network interface 416, a wireless information network device 418, and an external bus interface 420. Controller 400 can also include a Zigbee enabled communication device 422, a WIFI device 424, an Advanced Metering Infrastructure device 426, a support and updates module 428, and a communication interface 430. Controller 400 can also include an operating system 450 that can be executed by processor 402.

According to an aspect, controller 400 can be configured to use any type or combination of wireline or wireless communication to manage energy use at a site, including, but not limited to, power-line communication, wire line communication, wireless communication, Zigbee based communication, INSETEON based communication, X10 based communication, Z-Wave based communication, WiMAX based communication, Bluetooth based communication, WIFI based communication, 802.11-based communication, 802.15-based communication, 802.16-based communication, proprietary communication, other communications described herein, or any combination thereof.

According to a further aspect, controller 400 can include a network device profile module 432, a security module 434, a controller module 436, and a proximity detection module 438. Controller 400 can also include device profiles 442, user profiles 444, home profiles 446, and profile modifiers 448. One or more of the modules, profiles, or any combination thereof can be provided as encoded logic such as a ROM, PROM, EPROM, EEPROM, or various combinations thereof and accessible to processor 402 as needed or desired. In other forms, one or more of the modules, profiles, or any combination thereof can be stored within a memory device such as memory 404, within a removable flash drive (not expressly illustrated in FIG. 4), an external data storage device (not expressly illustrated in FIG. 4), or any combination thereof.

According to further aspect, controller 400 can include processor 402 operable to manage energy use at a site. Processor 400 can be configured to convert an incoming message received from a wireless energy network (not expressly illustrated in FIG. 4) into XML enabled output data. Processor 400 can also format an outgoing message to be output to a wireless energy network using XML enabled input data. According to an aspect, XML enabled input data includes a network device identifier of a network device accessible using a wireless energy network. Controller 400 can also include communication interface 430 configurable to enable access to communication device, such as Zigbee device 422, WIFI device 424, AMI device 426, or any other device accessible to controller 400 and having access to a wireless energy network. According to an aspect, communication interface 430 can be configured to detect an outgoing message formatted by processor 402 and configure the outgoing message to a message bus format that can be coupled to bus 408 and a communication device such as Zigbee device 422. For example, outgoing message can include network device data configured to be output to a wireless energy network, but processed into a message bus format prior to outputting to a communication device. Communication interface 430 can then convert the outgoing message from a message bus format to a format that can be output by a specific communication device. For example, if the outgoing message was intended to be output using WIFI device 424, communication interface can detect that the message was to be sent on a WIFI network and can convert the outgoing message from a message bus format to a WIFI device format. Communication interface 430 can then output the WIFI device formatted message to WIFI device 424.

According to a further aspect, communication interface 430 can be configured to detect an incoming message received from a wireless energy network using a communication device such as Zigbee device 422, WIFI device 424, AMI device 426, or any other device accessible to controller 400 and having access to a wireless energy network. Incoming message can include incoming network device data received from a network device. Communication interface 430 can convert an incoming message from a communication device format to access an incoming network device data received from a network device, and output the incoming network device data using a message bus format that can be used by processor 402.

According to another aspect, controller 400 can include a wireless data module, such as Zigbee device 422, WIFI device 424, AMI device 426, or any other device accessible to controller 400 and having access to a wireless energy network. A wireless data module can be accessible to processor 402 and configured to generate profile data to be used with an outgoing message. For example, processor 402 can access network device profile module 434 and use a network device profile of a network device accessible to the wireless energy network to output a message receivable by a specific network device. Network device data can be formatted using a network device profile of a specific network type of the wireless energy network. In some forms, a network device profile may not include information sufficient to output network device data. As such, profile modifiers 448 can be provided and can include profile modification data of the network device not available within the network device profiles 442 that can be used to communicate with a network device coupled to an energy network accessible to controller 400.

For example, device profiles 442 can include a Zigbee thermostat device profile having home automation profile data and smart energy profile data. Profile modification data 448 can be used to access additional profile information to format an outgoing Zigbee message and access a Zigbee enabled thermostat coupled to a wireless energy network accessible to controller 400. In this manner, additional features and functionality that may not exist within Zigbee profile standards can be accessed by using profile modifier data 448. As such, functionality of a Zigbee enabled device can be expanded beyond a standard Zigbee profile.

According to another aspect, controller 400 can include a first user profile stored within user profiles 444 and accessible to processor 402. For example, a first user profile can include a first time schedule to operate a network device and a control setting to control the network device. User profiles 444 can also include a first user identifier to identify a first user and can also be include a network device identifier to identify the network device to control or alter.

According to another aspect, controller 400 can include a second user profile within user profiles 444 and accessible to processor 402 that is different than the first user profile. A second user profile can include a second time schedule to operate a network device and at least one control setting to control the network device. The second user profile can also include a second user identifier to identify the second user and a network device identifier to identify the network device.

According to a further aspect, processor 402 can determine when to use a first user profile or a second user profile. For example, processor 402 can access user profiles 444 to detecting the user profiles, and initiate outputting an outgoing message using the first user schedule or the second user schedule. Processor 402 can then be used to monitor when to alter the operating condition provided by the first user schedule, to an operating condition of a second user schedule. In this manner, multiple user schedules can be used by controller 400 to control a network device.

According to a further aspect, processor 402 can be used to detect an input to a network device as a user schedule is being used, and store a new setting of the network device in association with the deployed user schedule. For example, processor 402 can detect a current user profile being used, and further detect an interaction with a network device during use of a first user schedule. Upon detecting an interaction, processor 402 can initiate an update to the first user profile in response to detecting the interaction.

According to an aspect, processor 402 can be used to convert data received using broadband device 414 to a format that can be output to a wireless energy network. Also, processor 402 can also be configured to convert data received from the wireless energy network to a format that can be used by broadband device 414. For example, processor 402 can include a Linux enabled processor configured to convert an incoming message received from Zigbee device 422 to an XML enabled output data. Additionally, processor 402 can format XML enabled input data received from broadband device 414 to an outgoing Zigbee message that can be output using Zigbee device 422.

According to a further aspect, controller 400 can be configured as a server and can deploy several processes of applications that can be used, including, but not limited to Ubuntu Version 9.04, Java SE Version 6, "lighttpd HTTP Server", Servlets, FastCGI, Apache log 4j, Eclipse, Apache Ant, or any equivalent operating environments or software, or any combination thereof.

According to an aspect, processor 402 using a Java operating environment can initiate generation of a Java output object using XML enabled input data received from broadband device 414. The Java output object can include network device data of a ZigBee enabled network device accessible to a wireless energy network and Zigbee device 422. Processor 402 can further initiate generation of XML enabled output data from an incoming message received from Zigbee device 422 using a Java input object configured to accesses network device data using a network device profile stored within device profiles 422, and a profile modifiers 448 as needed or desired.

According to an aspect, controller 400 can use communication interface 430 and API 440 to enable access to ZigBee device 422 operably coupled to bus 408 and accessible to API 440. As such API 440 can be used by processor 402 during use of one or more modules to access Zigbee device 422, WIFI device 424, AMI device, 426 or any combination thereof to communicate network data using a wireless energy network.

As such, processor 402 can make API calls to API 440 to access various functions of one or more communication devices 422, 424, 426.

According to another aspect, controller 400, can be used to coordinate a wireless energy network, and use data within the wireless energy network that was received from an external information source accessible to controller 400. For example, broadband device 414 can be coupled to an information network. Broadband device 414 can further be coupled to information network interface 416 operable to access external data sources that can be communicatively coupled to broadband device 414. Controller 400 can initiate coordinating a wireless energy network, and initiate outputting XML enabled output data as site report data to information network interface 416 to be communicated to an external data source using broadband device 414. Site report data can include a portion or representation of network device data received by Zigbee device 422, or other device accessing the wireless energy network. According to an aspect, controller 400 can also receive control action report data using broadband device 414. For example, control action report data can include XML enabled input data that can be output as network device data using the wireless energy network.

According to a further aspect, controller 400 can be configured to access a wireless energy network at more than one security level. For example, processor 402 can use security module 434 configured to initiate supporting coordinating a wireless energy network at a first security level and enable access to a network device at a first security level. For example, processor 402 can initiate receipt of an incoming message using Zigbee device 422 at the first security level. Upon gaining access and communicating device data, processor 402 can disconnect the network device. In another form, security module 434 and processor 402 can then initiate access to a second network device at a second security level using Zigbee device 422, and enable access to the second network device using the second security level. Processor 402 can initiate receipt of a second incoming message at the second security level, and upon receipt of device data disable access to the second network device. As such, controller 400 can use a single Zigbee device 422 to access multiple network devices using more than one security level.

According to an aspect, controller 400 can be used to access more than one wireless energy network. For example, processor 402 can initiate using a first wireless communication device, such as Zigbee device 422, to coordinate a first wireless energy network. Processor 402 can also initiate using a second wireless communication device, such as a second Zigbee device (not expressly illustrated in FIG. 4), or other wireless device, to coordinate a second wireless energy network. As such, processor 402 can access one or more network devices coupled to one or more wireless energy networks. According to another aspect, a second Zigbee device, or other wireless device can be used to join a second wireless energy network instead of coordinating the second wireless energy network. For example, the second wireless energy network can include an advanced metering infrastructure (AMI) enabled network operably associated with an AMI enabled smart meter. AMI device 426 can include a second ZigBee device, or other wireless communication device, capable of joining an AMI enabled network of an AMI enabled smart meter (not expressly illustrated in FIG. 4). As such, smart meter data can be accessed by controller 400 as needed or desired. For example, AMI data or smart meter data can be obtained on a periodic basis and communicated in association with a site report having network device data. As such, broadband device 414, wireless information network device 418, or other information network devices can be used to site report data that can include AMI data acquired using controller 400.

According to another aspect, controller 400 can use AMI device 426 to access an AMI enabled smart meter to alter an operating condition of a network device accessible to controller 400 using Zigbee device 422. For example, AMI device 426 can include an advanced metering infrastructure (AMI) enabled interface capable of initiating access to an AMI enabled smart meter. Controller 400 can use AMI device 426 to receive AMI data from an AMI enabled smart meter. Processor 402 can be used to initiate altering an operating condition of a network device in response to detecting AMI data received from the AMI enabled smart meter. Processor 402 can further be used to detect a smart energy control request output by an AMI enabled smart meter, and initiate using the smart energy control request at the network device.

In some forms, a control request may be obviated by controller 400 by not allowing an AMI initiated control request to be enabled. For example, processor 402 can access home profiles 446 and determine whether a control action initiated by an AMI enabled smart meter should be enabled or disabled. As such, controller 400 can be used to monitor control actions being output by an AMI enabled smart meter or other utility provided system, and alter the request as desired. For example, a user may create a home profile 446 that would not allow for a curtailment action of a network device. In other forms, home profile 446 may enable a curtailment action over a period or schedule, and disable a curtailment action over another period or schedule. As such, controller 400 can determine a valid period or schedule to enable and disable a curtailment action initiated by an AMI enabled smart meter.

According to a further aspect, controller 400 can reset an operating condition in the event an AMI enabled smart meter alters an operating condition of a network device. For example, an AMI enabled smart meter may be able to control a network device. Controller 400 can monitor an operating condition of the network device, and in the event an operating condition has been altered to a setting that is not scheduled by controller 400, controller 400 can respond to the operating condition by notifying a user, or automatically altering the operating condition to a preferred setting.

According to another aspect, controller 400 can be used to access an information network outside of the wireless home energy network. For example, information network interface 416 can be configured to access an information network using broadband device 414, wireless information network device 418, external bus interface 420, or any combination thereof. According to an aspect, wireless information network device 418 can include a subscriber based network device, or in other forms can include a WIFI network access device, or various combinations thereof. According to an aspect, wireless information network device 418 can include WIFI device 424 that can be used to access an information network. As such, WIFI device 424 can be used to access an information network, an wireless energy network, a local wireless information network, or any combination thereof.

According to an aspect, controller 400 can use WIFI device 424 to be coupled to a WIFI enabled communication device such as a mobile device, smart phone, home computer, laptop computer, Netbook, or any other WIFI enabled device capable of connecting to a WIFI network. Communication interface 430 and processor 402 can be used to enable a WIFI enabled communication device to access network device data, site data, or any combination of data accessible using the wireless energy network. Control actions can also be requested using the WIFI enabled communication device and connection to control a network device coupled to the wireless energy network accessible by controller 400. For example, a mobile device access a WIFI network can be used to access a wireless energy network having a network device. In other forms, controller 400 can include a web server capable of communicating web services that can be accessed by a mobile device (or other system or device), via a web based environment. For example, controller 400 can output portions or all of a graphical user interface as described in FIGS. 7-10 herein, or other graphical user interfaces that can be output by a web server. As such, a user having a WIFI enable communication device can be coupled to controller 400 using WIFI device 424 and monitor, create and manage operating conditions, home profiles, user profiles, device profiles, user schedules, proximity detection, demand response preferences, energy savings preferences, other control settings, view site data, or any combination thereof. Other settings and operating conditions can be accessed, monitored, or managed as needed or desired.

According to another aspect, controller 400 can include proximity detection module 438 that can be accessed by processor 402 to enable and disable proximity control at a site. For example, proximity detection module 438 and processor 402 can be used to detect a distance between a mobile device having a location reporting device and the site. Processor 402 can be used to identify a current operating condition of a network device, and identify an updated operating condition of the network device in response to the detected distance. Processor 402 can be used to initiate generation of an outgoing message to include an updated operating condition in response to the distance. According to a further aspect, controller 400 can be configured to receive location data using an information network having a server configured to communicate location data associated with a mobile device having a location reporting device that is associated with a site. Location data can be stored within memory 404 and used to monitor a distance and direction between a site and the mobile device. As such, controller 400 can initiate control actions using the location data, and the location data need not be stored in a server remotely located to a site. Various control actions can be generated using various types of conditions including detecting a distance, determining a control zone having a distance or interval, travel pattern of a mobile device, monitoring current and future weather data, monitoring real-time traffic data, monitoring energy pricing data, monitoring home efficiency data, or using any combination of energy management information in association with providing proximity control of a site.

According to an aspect, controller 400 can include a plug computer employing a Linux based server configured to manage energy use at a site. For example, controller 400 can include a Java enabled processor as processor 402, memory 404 configured to store incoming and outgoing wireless energy network messages, Zigbee device 422 capable of accessing a wireless energy network, and information network interface 416 capable of initiating communication with an information network. Controller 400 can also include communication interface 430 operably coupled to bus 408 and Zigbee device 422 coupled to bus 408. Through utilizing a Java enabled processor and Linux operating system, controller 400 can deploy a web server (not expressly illustrated in FIG. 4) and a Java environment to handle and convert XML data received using a web server into Java objects that can be used to communicate network device data and various other types of data.

For example, processor 400 can be used to convert an incoming message received from a wireless energy network using the Zigbee device 422 into XML enabled output data. Processor 402 can format an outgoing message to be output to a wireless energy network using XML enabled input data that includes a network device identifier of a network device accessible using a wireless energy network. Communication interface 430 can be configured to detect the outgoing message formatted by processor 402 to be output using the wireless energy network, and configure the outgoing message to a message bus format to be output to communication bus 408. In some forms, the outgoing message can include network device data configured to be output to a wireless energy network. Communication interface 430 can further detect an incoming message received from a wireless energy network that includes incoming network device data. Communication interface 430 can be used to convert the incoming message accessed from bus 408 from the message bus format to detect incoming network device data that can be output to processor 402. Processor 402 can then be used to generate site data including the network device data, and a site report that can be communicated using information network interface 416.

Figure 5A:
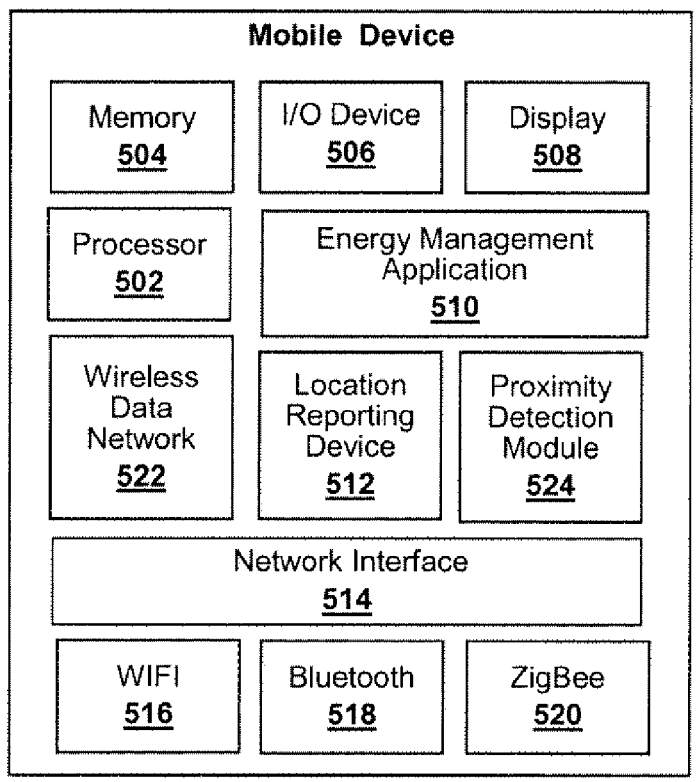
FIG. 5A illustrates a block diagram of a mobile device operable to be used with an energy management system according to another aspect of the disclosure.

FIG. 5A illustrates a block diagram of a mobile device, generally illustrated at 500, according to an aspect of the disclosure. Mobile device 500 can be configured as a smart phone or handheld computer, tablet, and the like such as an I-Phone® device, a Blackberry® device, an Android® device, an IPad® or various other devices or systems. Mobile device 500 can include a processor 502, a memory 504, an I/O device 506 such as a keypad, touch screen, function buttons, a mini qwerty board, or any other type of input device capable providing control of mobile device 500 or any combination thereof. I/O devices 506 can also include a speaker for outputting sound, and a microphone for detecting sound. Mobile device 500 can also include a display 508 such as color LCD display, touch screen display, or any combination thereof. According to a further aspect, one of more of I/O devices 506 can be displayed within display 508 having touch screen capabilities, such as selectable GUI elements that can be used to control features, functions, or various other application of mobile device 500. As such, mobile device 500 can be configured to use numerous applications that output graphical elements configurable to control mobile device 500 and applications accessible by mobile device 500.

According to a further aspect, mobile device 500 can also include an energy management application 510 accessible to processor 502 and configured to enable a user to manage energy use of at a site in a mobile environment. Mobile device 500 can also include a location reporting device 515, such as GPS technology, cell tower location technology, triangulation technology or any combination thereof. Portions of location reporting device 515 can be located within mobile device 500 however in other forms, a wireless network can include functionality that can be selectively accessed to detect a location of mobile device 500.

According to a further aspect, mobile device 500 can also include a network interface 514 configurable to enable access to a WIFI device 516, a Bluetooth device 518, a ZigBee device 520, or any combinations thereof. According to a further aspect, mobile device 500 can also include a wireless data network device 522 that can be configured with one or more RF radios capable of connecting to one or more wireless networks such as a 3G network, 4G network, PCS network, EDGE network, cellular network, or any combination thereof.

Figure 5B:
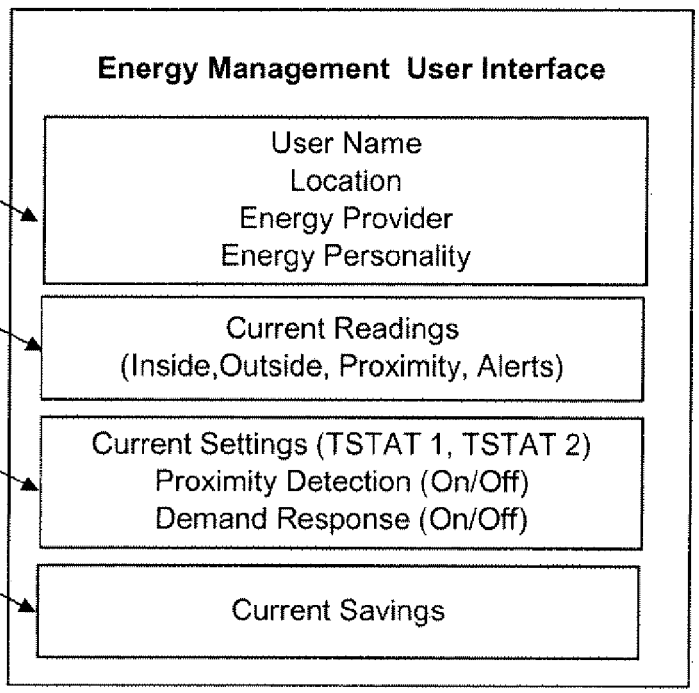
FIG. 5B illustrates a block diagram of an energy management user interface according to another aspect of the disclosure.

As illustrated in FIG. 5B, mobile device 500 can also include an energy management user interface 530 capable of being displayed within display 508. Energy management user interface 530 can include a user information section 532 that can display various types of user data such as a location of a site being managed, an energy provider providing energy to the site being managed, an energy personality of the user based on the user's interaction with energy use at the residential site, or various other types of user profile information.

According to a further aspect, energy management user interface 530 can include a current readings section 534 configured to display a current readings and operating conditions of a site. For example, current readings can include a current inside temperature, outside temperature, proximity setting, energy alert setting, savings rate, status of network devices being managed such as lights, HVAC system, hot water heater system, sprinkler system, refrigerator system, washing machine system, distributed energy generation system such as a solar array, battery storage device, fuel cell, wind turbine generator, or any combination thereof. Other network devices can also be managed as needed or desired. Current readings section 534 can include a selectable graphical element that can be selected to access additional site information. Site information displayed within current readings 534 can be accessed from a remote server capable of managing or storing site reports that include site data and device data. In other forms, site information, current reading, operating conditions, or any combination thereof can be accessed using a WIFI device 516 of mobile device 500.

According to a further aspect, energy management user interface 530 can include a current settings section configured to enable a user to alter an operating condition of a network device being managed. For example, current settings section 536 can include current setting of one or more thermostats at a site, settings of any other network device being managed at a site. Current settings section 536 can also include general settings to manage a site. For example, a general setting can include a proximity detection setting, a demand response setting, an energy alerts settings, a savings setting, schedules, calendars, events, a vacation setting to enable a vacation schedule, or any other type of setting that can be used to manage energy consumption or network devices at a site, or any combination thereof. Current settings section 536 can also include a graphical element that can be selected to access additional settings as needed or desired.

According to a further aspect, energy management user interface 530 can include a current savings section 538 configured to enable a user to access energy savings information and adjust as needed or desired. For example, an energy savings amount obtained at a site can be realized. A user may also be able to access an energy saving selector (not expressly illustrated in FIG. 5B) to modify an energy savings level. For example, a user can change a savings level to low, medium, high, or various other savings metrics. According to another aspect, a user may access a vacation mode (not expressly illustrated in FIG. 5B) and alter an operating condition of a site by selecting a vacation mode using mobile device 500. As such, various energy savings settings can be selected as needed or desired.

According to a further aspect, mobile device 500 can provide proximity updates, site report requests, site control commands, configuration data, settings, scheduling data, text messages such as SMS, MMS and others, and various other types of information or data or any combination thereof that can be used with an energy management system. According to another aspect, mobile device 500 may not have full functionality or capabilities of a smart phone or other device capable of running an application. For example, a mobile device such as a cell phone may not be capable of loading an application such as an energy management application. However, the mobile device may have sufficient functionality to allow an energy management system to contact the mobile device. For example, an adverse operating condition may be detected at a site (e.g. temperature set-point of thermostat is out of range, lights are left on, etc.). As such, the energy management system can identify the mobile device and send a message, such as a text message, an email message, or any combination thereof, capable of being received and displayed by the mobile device. In some forms, a user can receive the message and respond to the message, enabling the user to control the operating condition of the network device at the site. For example, the user can respond to the message via a text message, an email message, or another messaging application accessible to the mobile device. As such, a mobile device that may not be able to run energy management application 510 can be used to control an operating condition at an associated site.

During operation, a user can access operating status and generate control actions to control a network device (not expressly illustrated in FIG. 5A or 5B) at a site. For example, mobile device can receive and send messages, such as text messages, HTTP enabled messages, XML enabled messages, email messages, data, or any combination thereof. For example, if an outside temperature at a site is increasing or forecasted to increase, and the price of energy is increasing or scheduled to increase, mobile device 500 can receive a message to inform the user of the condition. The user can respond to the message as desired. In other forms, a suggestion can be sent to the user. For example, a suggestion to increase a thermostat or indoor temperature by three degrees can be received by mobile device 500. Upon receiving the message, the user can respond to the message using a text or other messaging technology. In other forms, a user can access energy management application 510 and initiate a control action to adjust the thermostat to different set-point. In this manner, a user can become aware of a current operating or forecasted condition in a mobile environment, and respond as needed or desired.

According to another aspect, mobile device 500 can include a portion or all of energy management application 510 running in the background, in the foreground, or any combination thereof. According to an aspect, energy management application 510 can be launched automatically when a message or energy alert may be received by mobile device 500.

According to a further aspect, energy management application 510 can be operable to work with an energy management system to update a control action field within a database. For example, mobile device 500 and energy management application 510 can initiate updating a control field within a database to identify a control action. Energy management application 510 can further update a new set-point within the database. As such, an energy management system can generate a control action report or data during a site upload. In this manner, a user of mobile device 500 can update control setting using a remote server or energy management system, and control actions can be generated to alter an operating condition at a site.

According to another aspect, energy management application 510 can output recommendation settings of a network device to the user. For example, a user can select a low savings, medium savings, or a high savings at a residential site using current settings 536. A user can select a savings level, and mobile device 500 can communicate a message to an energy management system associated with the site and mobile device 500 to generate a control action to alter an operating condition at a site based on a savings level setting. For example, an energy management system can calculate new settings of one or more network devices, intervals to set the network devices, start and stop times, and the like. In some instances, settings can be determined based on a forecasted weather, forecasted energy pricing, forecasted energy availability, proximity of mobile device 500 from a site, or various other types of data. Settings can be stored within a database and control actions can be initiated as needed or desired.

According to a further aspect, an energy alert message received by mobile device 500 can be used to alter or display an energy status icon, alter an application icon, alter a status within a social network, or various combinations thereof. For example, a user can then select the energy status icon using mobile device 500 and an associated application can be presented to a user to allow a user to alter an operating condition as desired. In some forms, a user's election to reduce energy consumption during peak times or other times can be fed into their social network as an energy savings message or update. A user's energy personality can also be output from mobile device or associated web service to be updated within a social network as needed or desired.

According to a further aspect, mobile device 500 can include proximity detection module 524 operably associated with energy management application 510 and location reporting device 512. Proximity detection module 524 can be provided as a part of energy management application 510, location reporting device 512, may be provided as a separate module, or any combination thereof. According to an aspect, proximity detection module 524 can be used with location reporting device 512 to detect a distance mobile device 500 may be from an associated site. For example, proximity detection module 524 can be operated as a background process that periodically requests a location from location reporting device 512. Location reporting device 512 can use various location reporting methods (e.g. GPS, triangulation, etc.) to detect a current location, and an associated API of location reporting device 512. According to an aspect, proximity detection module 524 can request an accuracy of a location to be provided by location reporting device 512, and a response time. For example, if a GPS signal may not be available to mobile device 500, location reporting device 512 can be requested by proximity detection module 524 to detect a location using a triangulation technique or other technique within 500 milliseconds. In another form, proximity detection module 524 can alter reporting parameters of location reporting device 512 in response to a relative location mobile device 500 may be from an associated site. For example, mobile device 500 may be greater than five (5) miles from an associated site, and location reporting device 524 can alter a distance accuracy, response time, method used, or various other location reporting parameters that can be selected.

According to another aspect, proximity detection module 524 can be used to initiate altering an operating condition of an associated site in response to a location of mobile device 500. For example, proximity detection module 524 can be used to detect mobile device 500 being greater than two miles away from an associated site, and a direction that is moving away from an associated site. Proximity detection module 524 can output a location and direction to energy management application 510, and energy management application 510 can detect whether to initiate a control action at an associated site.

According to a further aspect, proximity detection module 524 can be used to detect a location at a modifiable interval (e.g. one (1) minute, five (5) minutes, etc.) to reduce the amount battery drain or power consumption of mobile device 500. For example, as mobile device 500 may be moving away from an associated site, and an interval to access location data using location reporting device 512 can be increased (e.g. set from one (1) minute to three (3) minutes). In another form, as mobile device 500 moves closer to an associated site, proximity detection module 524 request at location from location reporting device 512 at a shorter interval (e.g. set from five (5) minutes to (1) minute). Various combinations of intervals can be deployed as needed or desired. In other forms, energy pricing at a period of time can also be used to alter reporting of a location reporting device 512. Various other combinations of using data to alter reporting of a location can also be used as needed or desired to reduce battery consumption or other operating conditions of mobile device 500.

According to a further aspect, proximity detection module 524, energy management application 510, or another portion of mobile device 500, or any combination thereof can be used as an energy management system. For example, an energy management system, such as energy management system 200 illustrated in FIG. 2, energy management system 600 illustrated in FIG. 6, an energy management system located at a site, hosted within a network, a apparatus or device capable of energy management, or any combination thereof can be used. According to an aspect, an energy management system can receive location data reported by location reporting device 512, and alter an operating condition of mobile device 500 based on a relative location mobile device 500 may be from an associated site. As such, an energy management system can be used to alter an operating condition of mobile device 500.

According to another aspect, sampling of location reporting device 512 can be updated using energy management application 510, an energy server operably associated with mobile device 500, or any combination thereof. For example, mobile device 500 can be detected by an energy management system as being between three and five miles from a site. An energy management system or application can further detect mobile device 500 traveling away from an associated site. As such, access to location reporting device 512 can be reduced thereby reducing energy consumption of mobile device 500.

According to a further aspect, a user of mobile device 500 may enter a building where a location based signal, such as a GPS signal, may not be able to be accessed or have limited access. As such, a sampling interval of location reporting device 512 may be altered to conserve energy. Upon a user exiting a building and a location of mobile device 500 being detected, a sampling interval can be returned to a previous value or a new value as needed or desired. According to a further aspect, a sampling interval can be sent to mobile device 500 from another source such as an energy management system. In other forms, updated sampling intervals can be stored within mobile device 500 and accessed as needed or desired. In other forms, a distance from a site, a sampling interval, direction, or various combinations of data can be communicated to mobile device 500 to be used to alter access to location reporting device 512.

According to another aspect, mobile device 500 can include software trap routines to be used when a location may go undetected. For example, energy management application 510 can use proximity detection module 524 that accesses location reporting device 512 to obtain a location. However, if a location is not obtained, or invalid, or any combination thereof, a software trap routine can be used to keep the proximity module, or background process from exiting. In this manner, energy management application 510 and various modules, associated processes, or any combination thereof can be continuously run without having to receive valid location data, and terminating the background process.

According to a further aspect, mobile device 500 can incorporate various portions or functionality of energy management system 200, controller 300, energy management system 600, wireless thermostat 1200, or various other systems, apparatuses, modules, GUI's or any combination thereof described herein as needed or desired to manage energy use in a mobile environment using mobile device 500. Additionally, mobile device 500 can use various types of data accessible to mobile device 500 including, but not limited to EMI data disclosed herein. According to an aspect, an application icon (not expressly illustrated in FIG. 5B) can be provided in a association with energy management application 510. For example, an icon can be used to access energy management application 510 can in some forms, can be altered to display energy consumption information, settings information or various other types of information without a user having to launch energy management application 510. For example, energy management application 510 can alter text information (e.g. device settings, current readings, lights on/off, etc.). An example can include displaying a current thermostat setting of a thermostat at a site, altering a color of an icon based on an energy savings or consumption level, alter a color based on proximity information, display a current temperature within a site, or various combinations thereof. As such, a user need not launch an energy management application 510 to EMI data associated with a site.

Figure 6:
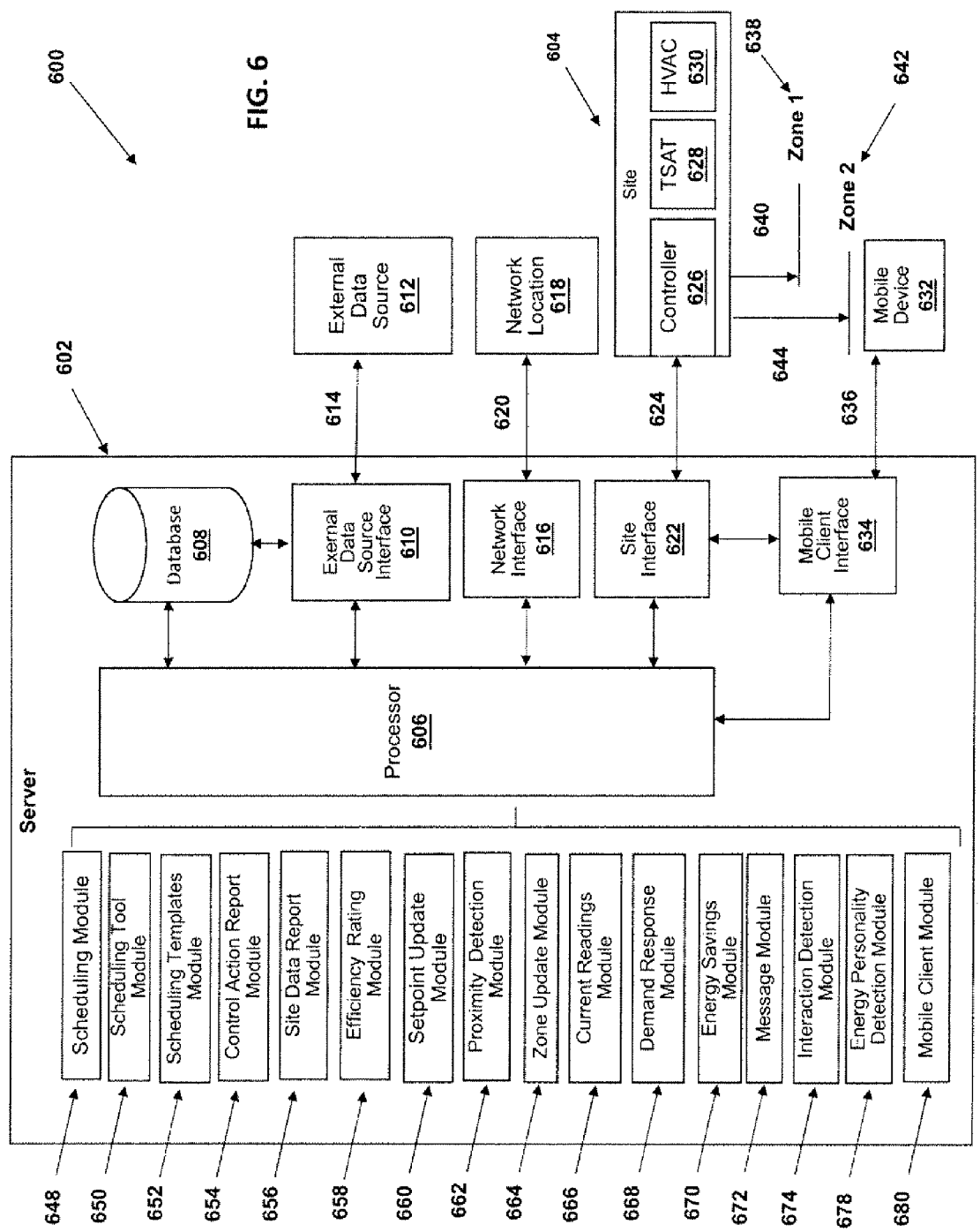
FIG. 6 illustrates a block diagram of an energy management system according to another aspect of the disclosure.

FIG. 6 illustrates a block diagram of an energy management system, generally illustrated at 600, according to another aspect of the disclosure. Energy management system 600 can include a server 602 operable to be coupled a site 604. Server 602 can include a processor 606 and a database 608. Server 602 can include an external data source interface 610 that can be coupled to an external data source 612 using a network connection 614. External data source 612 can include one or more data sources capable of providing access to EMI data, various other types of data, or any combination thereof. According to a further aspect, external data source 612 can also include third party sources. For example, an external data source 612 can include subscription based, non-subscription based, or any combination thereof of data having weather conditions, traffic conditions, grid operating conditions, wholesale energy prices, real-time energy pricing, dynamic pricing information, fixed pricing information, forecasted energy pricing, forecasted energy consumption, forecasted energy production, alternative energy production, distributed alternative energy production, zonal demand or operating conditions, nodal demand or operating conditions, or other EMI data that can be accessed using a third party.

According to a further aspect, server 602 can also include a network interface 616 that can be coupled to a network location 618 using a network connection 620. Network location 618 can be used to access to EMI data, various other types of data, or any combination thereof. Server 602 can also use network interface 620 to access a public network, a private network, a semi-private network or any combination thereof. According to an aspect, network interface 616 can include a network communication device (not expressly illustrated in FIG. 6) and a web server operable to enable access to the Internet or other communication network. Server 602 can also include a site interface 622 that can be coupled to site 604 using a network connection 624 operable to be coupled to a home controller 626. According to an aspect, site interface 622 can be realized as a web services based application configured to receive information initiated by site 604.

According to an aspect, site 604 can also include a wireless thermostat, TSTAT 628, operably coupled to NVAC system, HVAC 630. Site 604 can further include a mobile device 632 associated with site 604. Mobile device 632 can be coupled to a mobile client interface 634, such as a WAP or other mobile device gateway capable of communicating using a mobile information network 636. According to an aspect, energy management system 600 can be operably to provide a first zone 638 having a first distance 640, and a second zone 642 having a second distance 642. First zone 638 and second zone 642 can be used to control TSTAT 628 and HVAC 630. For example, first zone 638 and second zone 642 can be provided as a boundary that can be determined in various ways to control one or more energy consuming devices at site 604.

According to another aspect, server 602 and processor 606 can include one or more processors having one or more core processors. Server 602 can also use any combination of software modules, firmware, encoded logic, or any combination thereof to manage energy use. For example, server 602 can use a scheduling module 648, a scheduling tool module 650, a scheduling templates module 652, a control action report module 654, a site data report module 656, an efficiency rating module 658, a set-point update module 660, a proximity detection module 662, a zone update module 664, a current readings module 666, a demand response module 668, an energy savings module 670, a message module 672, an interaction detection module 674, an energy personality module 678, a mobile client module 680 or any combination thereof.

According to an aspect, database 608 can be configured to store EMI data, control action data, site report data or any combination thereof. For example, database 608 can store data received from one or more residential sites associated with server 602. For example, site 604 can access TSTAT 628 using a wireless energy network deployed at site 604. Processor 606 can be configured to access site report data stored within database 608. Processor 606 can detect a current temperature set-point within the site data and an associated date and time of TSTAT 628 at site 604. Processor 606 can detect a current temperature reading at site 604, and can further detect seasonal settings stored within database 608. For example, a seasonal profile can include seasonal settings that can include settings of a winter schedule, a summer schedule, or various combinations of seasons and settings. According to an aspect, processor 606 can detect a current operating mode of HVAC 630 operably coupled to TSTAT 628, and determine a thermostat schedule to be used with TSTAT 628. For example, if HVAC 630 may be in an A/C mode, a summer profile, schedule and the like can be deployed which can include temperature settings that can be different than a winter profile. For example, scheduling module 648 can be used to determine a date, a time or time interval, thermostat setting, operating mode, or any combination thereof, and store a schedule within database 608.

According to another aspect, server 602 can also generate control action reports using control action report module 654. For example, processor 606 can initiate generation of a control action report to communicate to site 604. A control action report can be generated in various ways with various types of data and settings to control an operating environment at site 604. For example, a control action report can be generated by setting a control action field within database 608.

According to a further aspect, energy management system 600 can use seasonal settings to control HVAC 630. For example, energy management system 600 can detect an operating mode of HVAV 630 and alter a set-point in using the detected operating mode and an associated seasonal profile. For example, an updated temperature set-point can include a value between a current temperature set-point and a minimum seasonal set-point in response to the current operating mode of HVAC 630 being in a heating mode. An updated temperature set-point can also have a value between a current temperature set-point and a maximum seasonal set-point in response to the current operating mode of HVAC 630 being in a cooling mode. Server 602 can generate a control action report that can also includes settings or data generated in response to an efficiency rating of site 604, an estimated time period to generate an updated temperature reading, an updated temperature set-point, a current energy price, and a future energy price or any combination thereof.

According to another aspect, server 602 can be used to generate a control action report using proximity detection module 662. For example, processor 606 can detect a distance between a location reporting device, such as mobile device 632 and site 604. Processor 606 can further detect a zone, such as first zone 638, second zone 642 or additional zones as desired. Using a detected zone, processor 606 can initiate generation of a control action report to be communicated to site 604 in response to a current zone. In this manner, various network devices (not expressly illustrated in FIG. 6) at site 604 can be automatically controlled on a zone by zone basis as mobile device 632 moves away from, or towards, site 604.

According to another aspect, one or more of the zones 638, 642, additional zones (not expressly illustrated in FIG. 6), or any combination thereof can be updated automatically using updated conditions. For example, processor 606 can use a zone update module 664 on a periodic basis to update zones using various types of data. For example, processor 606 can detect an efficiency rating of site 604, detect an external temperature at site 604 from an external data source 612 or other sources, determine a real-time travel time between mobile device 632 having location reporting capabilities and site 604. Processor 606 can modify distance 640, 644, or any combination thereof. For example, an efficiency rating of site 604, external temperature at site 604, estimated real-time travel time to or from site 604, various other EMI, or any combination thereof can be used. Although illustrated as being sequential, zones 638, 642 can be modified independently, together, or any combination thereof.

According to another aspect, server 602 can use proximity detection module 662 to detect when mobile device 632 may be moving away from site 604, and adjust HVAC 630 using thermostat 628. For example, processor 606 can detect mobile device 632 moving away from site 604. Processor 606 can further detect a percentage change value associated with a current zone, and further detect a base set-point of TSTAT 628. Processor 606 can further determine a difference between the base set-point, and a minimum seasonal set-point in response to a current operating mode of the HVAC 630. For example, if the HVAC 630 is in a heating mode a percentage change can be determined to adjust use of a heating unit.

According to a further aspect, server 602 can determine a difference between a base set-point and a maximum seasonal set-point in response to a current operating mode of the HVAC being in a cooling mode. As such, processor 606 can determine an updated thermostat set-point as a percent change based on the determined difference. Processor 606 can initiate generation of a control action report including an updated thermostat set-point to be used at site 604.

According to another aspect, server 602 can be used to generate an aggregated demand schedule. For example, processor 606 can determine energy demand of a plurality of residences in a region using scheduling module 648. For example, processor 606 can identify a group of residential sites within a specified region (not expressly illustrated in FIG. 6) and access thermostat schedules of each of the residential sites within the group. Processor 606 can also aggregate scheduling data using thermostat schedules, and initiate an outputting of the aggregated scheduling data. Aggregated scheduling data can include time intervals, settings, etc. and in some forms can also include an estimate of energy consumption based on an efficiency rating of residential sites, consumption profiles, location data, or various other site attributes that can be used to calculate an aggregated demand. According to an aspect, aggregated data can be used to forecast load, energy production, virtual capacity, demand response capacity, grid congestion, or any combination of grid attributes that can use aggregated scheduling data.

According to another aspect, energy management system 600 can also include a web services enabled scheduling tool to schedule energy use at a residential site. For example, processor 606 can use scheduling tool module 650 to generate a web based or network based graphical user interface that includes a scheduling tool. FIG. 8A-D illustrate examples of a web services enabled scheduling tool and user interfaces that can be output using scheduling tool module 650. For example, processor 606 can output a thermostat selector configurable to enable selection of one or more wireless thermostats located at site 604. An event scheduler operably associated with the thermostat selector and configurable to enable a user to graphically select a utilization schedule of the one or more wireless thermostats can also be output by processor 606. Processor 606 can also be used to update a utilization schedule to include a time of day and temperature setting. Scheduling tool module 650 can be used to control the one or more network devices that can include wireless thermostats, smart appliances and the like. Scheduling tool module 650 can be used to output an energy savings preference selector configured to graphically modify the utilization schedule, and display a resulting energy savings, a weather forecasting tool, and various other types of tools or scheduling features to assist in managing or scheduling use of a network device.

According to another aspect, server 602 can also use interaction detection module 674 to detect when a user may alter an operating mode of a network device. For example, interaction detection module 674 can detect when a user may adjust a thermostat at a specific time of the day, and suggest a modification of a utilization schedule to a user during a user access to scheduling tool output using scheduling tool module 650. A user can then elect to have the utilization schedule updated to include the suggestion as needed or desired.

According to another aspect, server 602 and scheduling tool module 650 can be used to enable additional features and functions. For example, a scheduling tool can be used to display a proximity control selector configured to enable and disable proximity control of a residential site, a demand response selector configured to enable and disable participation in demand response event, a vacation mode selector to enable and disable a vacation schedule, an auto update selector configured to enable an automatic update of the utilization schedule in response to a detection of a user interaction with the one or more network device, or various other controls that can be used to manage energy use at a site, or any combination thereof.

According to another aspect, server 602 and scheduling tool module 650 can be used to enable and disable demand response capabilities. For example, a scheduling tool can used to provide a demand response selector (not expressly illustrated in FIG. 6) operable to be displayed with a scheduling tool. A demand response selector can include several settings such as an always participate selection configured to always enable a curtailment of an HVAC system in response to a demand response event, a never participate selection configured to not allow a curtailment of the HVAC system in response to a demand response event, a request participation selection configured to initiate a communication, such as an email, text message, instant message, social network message, or various combinations thereof to the user to request participation in a demand response event. A demand response selector can be operably associated with demand response module 668 to initiate demand response inquiries, analyses, and deployments.

According to another aspect, server 602 can also use scheduling template module 652 to generate utilization templates that a user can access and modify to schedule energy use. For example, a plurality of energy templates can be accessed by a scheduling tool. Templates can include a predetermined utilization schedule selectable by the user based on a user's scheduling profile. A selected predetermined utilization schedule can be modifiable by a user using a scheduling tool module 650, and saved as needed or desired. According to an aspect, server 602 can output an on-line questionnaire or survey that a user can participate in to determine an energy template to use.

According to a further aspect, server 602 can also use energy personality detection module 678 to detect an interaction profile of a user. For example, a user may be an urban professional having a long work commute which may result in a first portion of a utilization schedule. Upon arriving at a residential site, a user may interact with their thermostat to which will result in a different portion of a utilization schedule. For example, a user may like an indoor temperature to be colder when going to bed. As such, a personality of the user while away and while at home can be used to automatically generate a user's schedule. According to another aspect, an energy personality indicia or character can be generated and output with a user's on-line scheduling tool, within a user's social network, or any combination thereof. For example, processor 606 can detect an interaction of a user with a wireless thermostat, and display of an energy personality indicia in response to the interaction. A user can then enable or disable display of the energy personality indicia within a social network such as Facebook®, MySpace®, etc. In other forms, processor 606 can be used to modify the indicia based on an overall energy savings a user has accomplished at their residential site. For example, processor 606 can use energy savings module 670 to determine an energy savings of the individual and alter the energy personality indicia accordingly. In another form, a user can set up a messaging service or account using Twitter® and the like to output energy savings updates to a subscriber base in response to an energy saving initiate, participating in demand response events, alter energy use, or various other forms. According to a further aspect, a Twitter® account or other messaging service can be used on a community basis to inform a group of individuals of energy management events. For example, an "energy action day" or "energy alerts" can be posted using a Twitter® account to subscribers and a subscriber can curtail energy use using energy management system 600 or various other energy management systems as needed or desired. Other forms of messaging or any combination thereof can be used as needed or desired.

According to another aspect, server 602 can be used to determine a sample size of residential sites and corresponding schedules to forecast energy consumption over an interval. For example, processor 606 can be used to determine a random sample size of residential sites in connection with estimating an energy consumption of a specific region such as a zip code, street or series of streets, substations supporting residential sites, node-to-node, or any combination thereof or other methods of determining a region. Upon identifying a sample size of a region, residential sites can be identified within the region. For example, processor 606 can then determine associated thermostat schedules of residential sites within the specified region using scheduling module 648. Server 602 can output thermostat scheduling data of the plurality of sites in connection with scheduling or forecasting energy use.

According to another aspect, server 602 can also be used to enable a demand response initiated at site 604. For example, processor 606 can use demand response module 668 to detect an enabled demand response setting of site 604. Processor 606 can further detect a demand response event condition and enable a curtailment action of HVAC 630 if a user of site 604 has selected participation in a demand response event. An energy reduction capacity of site 604 can be determined using efficiency rating module 658, scheduling module 648, proximity detection module 662, or various other modules, data sources, or any combination thereof.

According to another aspect, server 602 can also use demand response module 668 to contact individuals prior to curtailing energy use at site 604. For example, processor 606 can initiate a demand response event request communication to communicate to the users of a plurality of sites. Processor 606 can detect a user response level to participate in a demand response event, and enable a curtailment of a corresponding HVAC system or other energy consuming devices at a site of a user electing to participate in the demand response event. In this manner, user's may not be forced to participate in demand response events but can have real-time election capabilities to participate as needed or desired.

According to an aspect, server 602 can send a text message that includes a request to participate in a demand response event. In some forms, a text message can include an agreement to pay the user to participate in a demand response event. Payment can take various forms such as credits, cash, rewards, points, contribution to education funds, discounts on energy rates, or any combination thereof. Server 602 can receive a response from using mobile client interface 634 and process the response using message module 672 to determine a desire to participate or not.

According to another aspect, server 602 can be used with scheduling module 648 to determine an aggregate capacity to reduce energy consumption. For example, processor 606 can be used to identify a group of residences within the plurality of residences and determine an energy reduction capacity of each of the residences within the group using an efficiency rating of each of the residences within the group. Upon determining an efficiency rating of each residence, processor 606 can detect other data to be used to determine an available capacity. For example, current weather conditions at each residential site can be detected, a user's energy schedule or thermostat schedule can be used, a response to text messages or emails electing to participate can be determined, grid conditions can be used, or any combination thereof. Upon estimating an available capacity, an aggregate energy reduction capacity based on the energy reduction capacity of each of the residences within the group can be determined.

According to another aspect, server 602 can use an aggregate energy reduction capacity in association with an auction. For example, processor 606 can initiate an auction of virtual energy capacity to retail energy providers electing to bid an available energy capacity. In other forms, a third party can host an auction and energy management system 600 can output an available capacity in association with an upcoming auction event, peak demand period, transmission rate determination period, or any combination thereof. For example, processor 606 can initiate an auction process to sell the aggregate energy reduction capacity to a third party, and detect a sale of the aggregate energy reduction capacity in connection with the auction process. Upon a sale occurring, processor 606 can initiate a curtailment of an HVAC system, other energy consuming devices, or any combination thereof, at each of the residences within the group.

According to another aspect, energy management system 600 can include mobile client interface 634 operable to be coupled to mobile device 632 associated with site 604. For example, mobile client interface 634 can include a WAP gateway or other mobile client gateway to enable server 602 access to mobile device 632. Mobile client interface 634 can be provided as a part of server 602, however in other forms, portions or all of mobile client interface 634 can be provided by a specific wireless network provider. As such, mobile client interface 634 can be configured to communicate with a specific carrier having a WAP gateway. Mobile client interface 634 can be used to communicate EMI or control data between WAP gateway and server 602 using any combination wireless or terrestrial communication technologies. Additionally, WAP gateway can also include logic or modules that can provide mobile device users access to EMI data or control data generated by mobile device 632, server 602, energy management system 600, or any portions and combinations thereof.

According to an aspect, mobile client interface 632 can receive a site readings request of site 604 from mobile device 632. For example, processor 606 can detect the site reading request and initiate access to database 608 to retrieve site report data of site 604. Processor 606 can format the site report data as mobile device data, and output the mobile device data to mobile device 632 using mobile device network 636.

According to another aspect, mobile client interface 634 can receive a request from mobile device 632 to modify a current temperature set-point of HVAC system 630. For example, processor 606 can process a received request from mobile device 632 and initiate generation of a control report using control action report module 654. The control action report can include a reference to an updated temperature set-point communicated from mobile device 632 to mobile client interface 634. Processor 606 can set a variable or field within database 608 to alter a set-point. Upon site 604 initiating access to server 602, processor 606 can access a variable or field associated with site 604, and generate a control action report or control data to be communicated to site 604 using site interface 622. As such, upon a temperature set-point being updated at site 604, home controller 626 can communicate a control action confirmation data, site report, status information, or various combinations thereof to confirm the updated temperature set-point. Processor 606 can output a confirmation of the updated temperature set-point to the mobile client interface 634 upon receiving a confirmation, and can output an updated temperature set-point to mobile device 632.

According to another aspect, mobile device 632 can be used to enable and disable operating modes of one or more network devices located at site 604. For example, mobile device 632 can include a mobile application loaded on mobile device 632 that can be used to control settings at site 604. FIGS. 5A and B illustrate examples of energy management application and functionality that can be used by mobile device 632 although other applications and functions can also be deployed using mobile device 632 as needed or desire. According to another aspect, mobile device 632 can access a web based application associated with server 602 using a web browser of mobile device 632 to enable and disable operating modes or conditions at site 602. For example, mobile device 632 can alter a proximity setting, alter one or more environmental control zones, access current readings, modify a vacation setting, modify energy use schedules, or various other operating modes or data associated with controlling or maintaining operating modes of network devices located at site 604 as needed or desired.

According to another aspect, energy management system 600, can be used to send messages to mobile device 632 in connection with an altered operating condition at site 634. For example, processor 606 can access site data received from site 604, and further detect a manual input condition provided at TSTAT 628. For example, a user may have decreased a temperature set-point of TSTAT 628. Processor 606 can detect whether a user is at home using location data received from mobile device 632 and proximity detection module 660. Upon detecting the condition, processor 606 can determine if it should initiate a text message indicating the manual input condition. For example, processor 606 can use message module 672 to format and output a text message indicating the condition change of TSTAT 628, and output the text message using mobile client interface 634. A user can then alter the condition using mobile device 632 as desired. In other forms, an email message or other electronic message can also be sent to a user. For example, a message can be displayed within a window of a computer system associated with the user. In other forms, a text message can be sent to multiple mobile devices associated with site 604. Various other combinations of alerting a user of site 604 of a manual change to an operating condition can be used as needed or desired.

Figure 7:
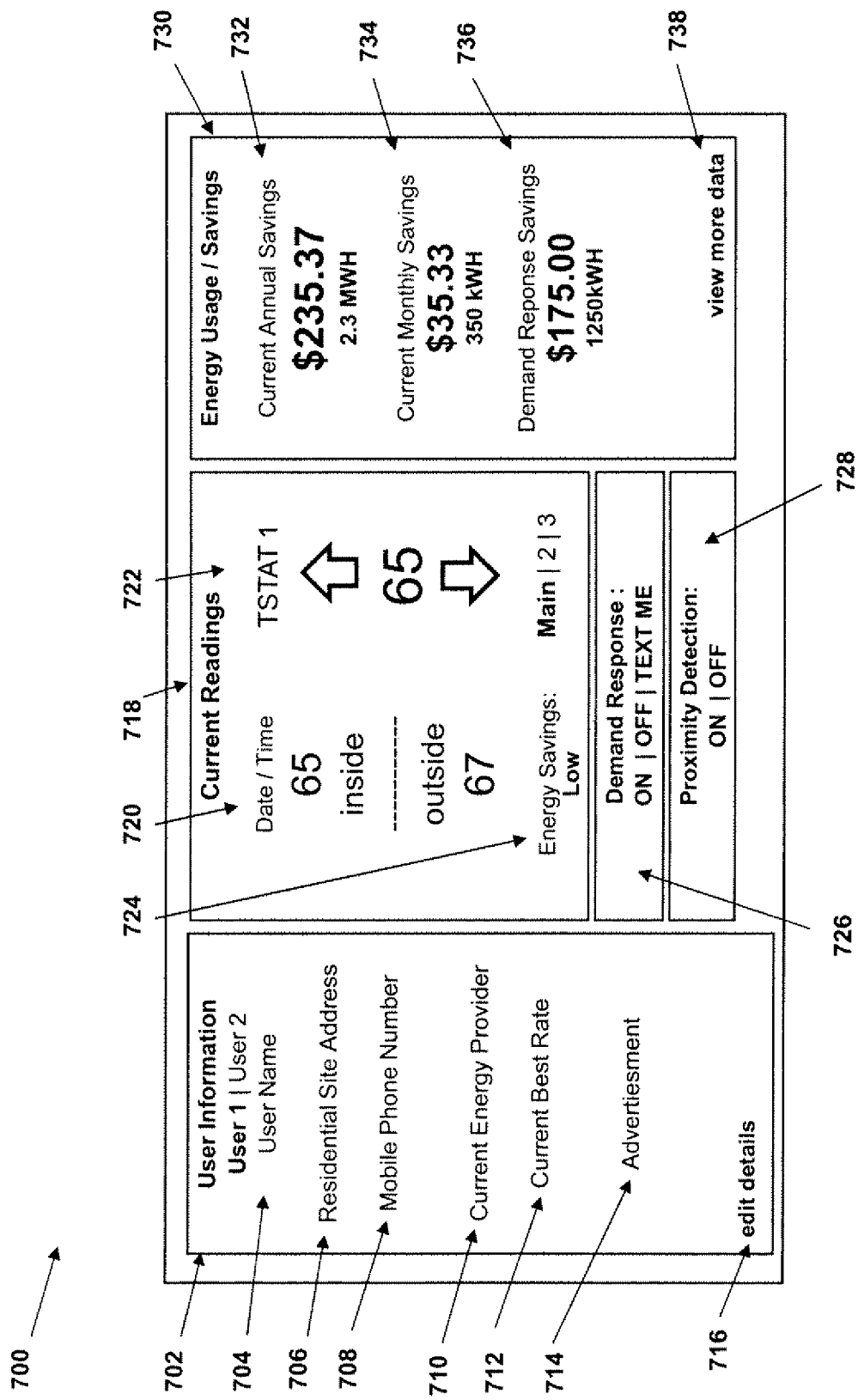
FIG. 7 illustrates an energy management user interface according to an aspect of the disclosure.

FIG. 7 illustrates an energy management user interface (EMUI), illustrated generally at 700, according to an aspect of the disclosure. In some forms, EMUI 700 can be accessed using a mobile device, desktop computer, Netbook, laptop computer, smart phone, a energy display device, a smart thermostat, a home automation control terminal, and IPad® or any combination of devices capable of displaying energy management user interfaces.

Figure 9:
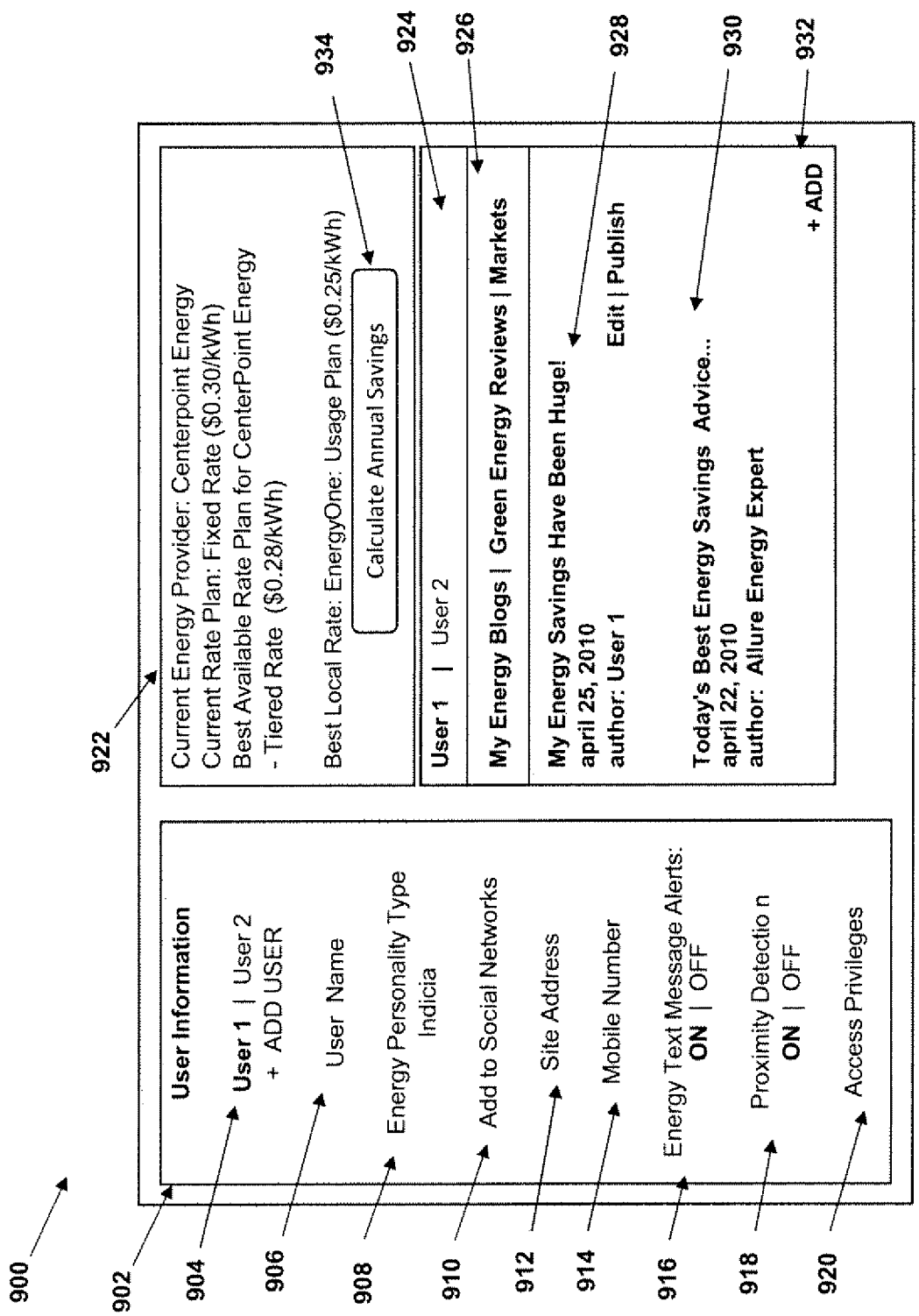
FIG. 9 illustrates an energy management system interface operable to access and edit user and site information according to a further aspect of the disclosure.

According to an aspect, EMUI 700 can include a user information section 702 configured to display one or more user names 704, a residential site address 706, a mobile phone number 708 associated with residential site address 706. User information section 702 can further display a current energy provider 710 associated with residential site address 705, and a current best rate 712 of a third party energy provider available at residential site address 706. An advertisement 714 section can also be displayed, and an edit details link 716 can be displayed to enable a user to access, edit, modify, delete, manage, etc. information displayed within user information section 702. FIG. 9 described herein includes an example of a user interface that can be used to edit user information displayed within user information section 702. User information section 702 can also display an energy personality 740 associated with hers name 704. Energy personality 740 can also be linked to one or more social networks as needed or desired.

According to a further aspect, a current readings section 718 can be displayed within EMUI 700. Current readings section 718 can include, for example, a current date and time section 720 with a current inside temperature and outside temperature at a residential site. Current readings section 718 can further include a current thermostat set-point 722 of a thermostat located at a residential site. More than one thermostat can be deployed at a residential site and current thermostat set-point 722 can include references such as "Main", "2", "3" or some other indicia configured to enable access to current thermostat readings of multiple thermostats at a residential site. A user can also modify the name or number of a thermostat, zone, etc. using an edit feature of thermostat set-point 722.

According to a further aspect, a current readings section 718 can also include an energy savings level 724 configured to indicate a savings level that relates to current thermostat set-point 722. For example, as current thermostat set-point 722 is set to a low set-point, an air conditioner unit may run more frequently and cause a low energy savings. As such, a visual indication of an energy savings can be displayed in association with a current set-point giving a user feedback on energy consumption based on a thermostat set point. In some forms, a user can adjust a thermostat set-point up or down, and an energy savings level can be altered in near real-time based on the users selection. For example, various programming languages such as DHTML, AJAX, Flash, HTML 5, and the like can be used to show a near real-time update of one or more fields within EMUI 700.

According to a further aspect, EMUI 700 can also include a demand response notification selector 726 configured to enable participation in demand response events, disable participation in demand response events, and enable a text message (or other messages) to be sent to a user to request participation in a demand response event. According to a further aspect, EMUI 700 can also include a proximity detection selector 728 configured to enable proximity detection of one or more mobile devices associated with a residential site.

According to another aspect, EMUI 700 can also include an energy usage/savings section 730 that can display a current annual savings 732, a current monthly savings 734, a demand response savings 736, and a view more data link 738. According to an aspect, view more data link 738 can be operably associated with accessing portions or all of EMUI 800 described in FIG. 8.

Figure 8:
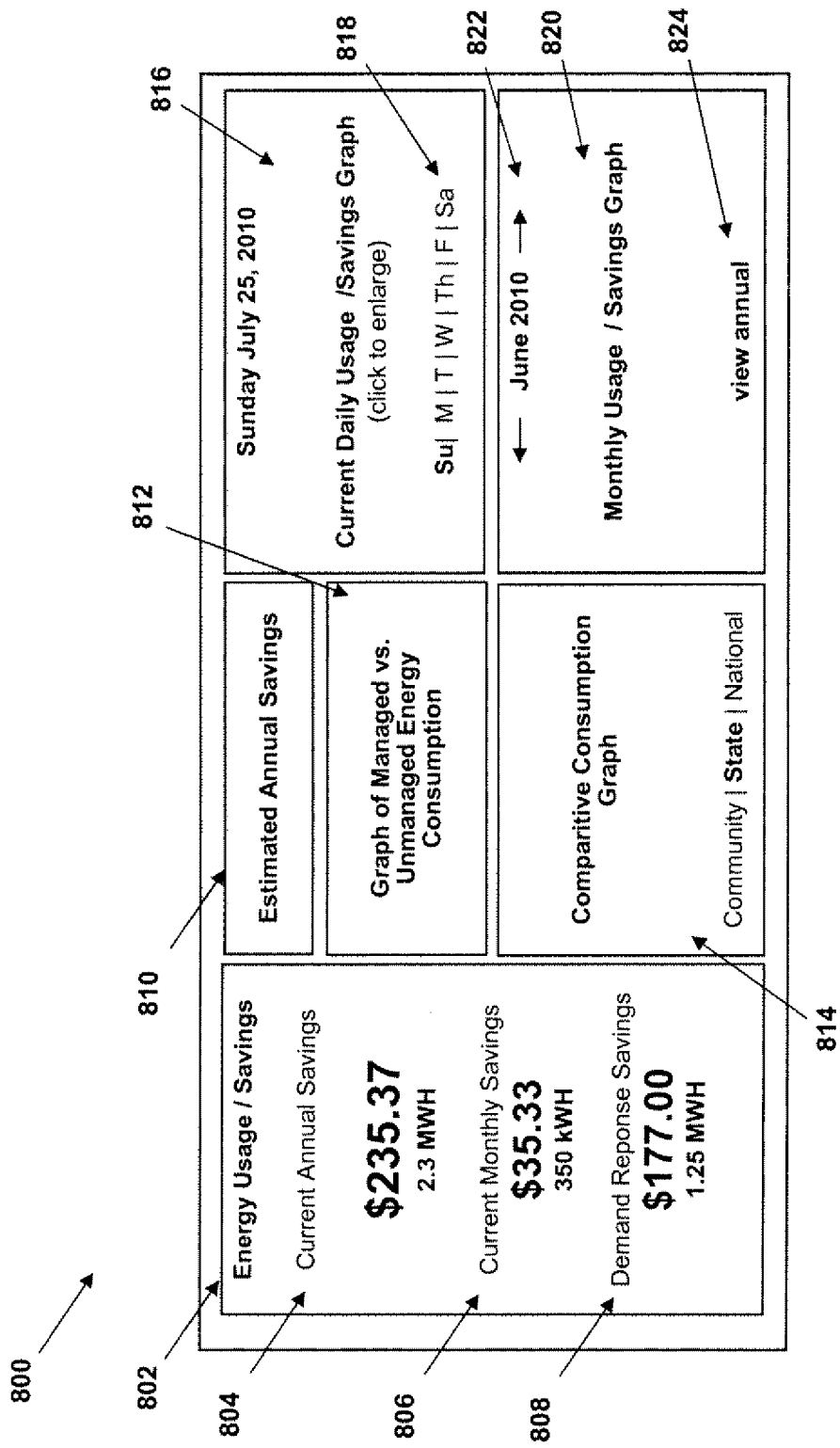
FIG. 8 illustrates an energy management system interface operable to report energy usage and savings information according to a further aspect of the disclosure.

FIG. 8 illustrates an energy management user interface operable to report energy usage and savings information, illustrated generally as EMUI 800, according to a further aspect of the disclosure. According to an aspect, EMUI 800 can include an energy usage/savings section 802, operable to display a current annual savings 804, a current monthly savings 806, and a current demand response savings 808 realized by a user participating in demand response events. EMUI 800 can also include an estimated annual savings section 810, a managed vs. unmanaged energy consumption graph 812, and a comparative consumption graph 814. According to an aspect, a user can select a comparison graph that includes a community graph configured to compare a user's energy consumption to others in a residential community, a state comparison graph configured to compare a user's energy consumption to others within a state, and a national graph configured to compare a user's energy consumption to a current national average.

According to a further aspect, EMUI 800 can also include a daily usage graph 816 configured to indicate energy consumption and savings on an hour-by-hour basis. For example, if a user selects a medium energy savings settings, daily usage graph can display a daily savings in dollars, KWh or any combination thereof. Daily usage graph 816 can further include a graph indicated what the consumption would have been if energy use was left unmanaged. According to a further aspect, daily usage graph 816 can also include a day selector 818 configured to enable a user to select a day of the week to view energy consumption and savings.

According to another aspect, EMUI 800 can also include a monthly usage and savings graph section 820 configurable to output monthly energy usage and savings information of each day of the month. For example, a monthly graph can include a daily, weekly, or other pairing bar graph configured to display a monthly energy usage and savings at a residential site. A user can navigate between a month using month selector 822 and a specific month's consumption and savings graph can be displayed. In some instances, only a portion of a specific month's data may be available to be displayed. As such, only a portion of a graph may be displayed as desired. According to a further aspect, monthly usage and savings graph section 820 can also include a link 824 to access annual savings as needed or desired.

According to another aspect, EMUI 800 can further be used to access and display performance data of an adjacent home, a similar sized home, one or more of the same or similar energy consuming devices (e.g. HVAC, hot water heater, other smart appliances), or any combination thereof. EMUI 800 can compare performance of each of the other residences and devices, and provide feedback to a user about the user's relative performance. For example, EMUI 800 can output a visual indication of power consumed, such as a graph, chart, etc. In other forms, a comparable residential site can also be displayed using EMUI 800. For example, a same or similar sized home can be used as a baseline comparison.

In other forms, EMUI 800 can be used to enable a user access to energy efficient devices and systems, and a user can forecast energy reduction and savings through use of an energy efficient system. As such, energy consuming devices that may be introduced and have a greater efficiency rating can be identified and communicated to a consumer. According to another form, EMUI 800 can display a click-through or micro-site to allow a user to access third party product energy efficient offerings. In other forms, EMUI 800 can enable access to a "green energy" marketplace that will enable a user to review energy efficient products and services. Such products and services can be selected by a user and associated XML data, meta data, and the like can be fed into EMUI 800. EMUI 800 can be configured to use the third party data and refresh data displayed within EMUI 800 to display an estimated saving if used at the user's residential site. As such, EMUI 800 can determine an estimate of what energy savings may be for their residential site, allowing a user to make an informed purchase decision. For example, a user may wish to add a solar array or other type of energy producing system to their residential site. EMUI 800 can be used to estimate the amount of energy that may be saved based on a user's actual historical energy use. As such, a payback period associated with purchasing can be displayed to a consumer.

FIG. 9 illustrates an energy management user interface (EMUI) operable to access and edit user and site information, illustrated generally at 900, according to a further aspect of the disclosure. EMUI 900 can include a user profile 902 configured to display and enable a user to edit changes to user information. User profile 902 can include a user selector 904 configurable to add and remove user's associate with a site, a user name field 906, an energy personality type field and/or indicia 908, a social network selector 910, a residential site address 912, and a mobile number 914 associated with a residential site address 912. According to a further aspect, user profile 902 can also include an energy text message alert selector 916, a proximity detection selector 918, and a current HVAC provider information field 920.

According to an aspect, user selector 904 can be configured to enable a user to select a user data to edit. For example, multiple users can be associated with a residential site and a user's information can be accessed by selecting user selector 904. In other forms, a user can log into a web site or other application and may only be able to have limited access to user specific data associated with a residential site. According to another aspect, user information selector 904 can be used to add additional users to be associated with a residential site. As such, a master user or administrator login can form (not expressly illustrated in FIG. 9) can be provided to manage user information. In some aspects, a user profile 902 can include pre-populated information to reduce the amount of information a user may need to input. Additionally, information associated with the residential site can be accessed and used with the additional user as needed or desired.

According to a further aspect, EMUI 900 can also include an energy provider section 922 which can include retail, utility, or third party energy information. For example, a current energy provider can be displayed and a current energy rate and plan currently being used can also be displayed. Energy provider section 922 can also indicate a best rate plan at a current provider, and a best local rate available through another provider. Energy provider section 922 can also include a savings calculator element 934 capable of initiating a savings calculation of the residential site using a best available rate of a current provider, other providers, or any combination thereof. Savings calculator element 934 can also use historical site data, scheduling data of the residential site, forecasted energy consumption, future energy pricing, or various other EMI or any combination thereof to determine annual savings. Site consumption can then be used to determine what an overall cost of energy would be when using a given rate plan. Other intervals (e.g. monthly, weekly, daily, etc.) can also be calculated as needed or desired. As such, a user can identify a plan that would align with usage habits and scheduling data at a residential site.

According to a further aspect of the disclosure, EMUI 900 can also include a user posting and reviews section 924. User posting and reviews section 926 can include a content selector 926 capable of selecting energy blogs, green energy reviews, markets and the like. For example, as a user selects 'My Energy Blogs,' a list of energy blog titles can be displayed including a user energy blog 928 configured to enable a user to edit and publish their own energy blog. A user can publish their energy blog to an energy blog websites, social networks, third party sites, content providers, or any combination thereof. A third party energy blog 930 can also be listed within user posting and reviews section 926 allowing third party bloggers, articles, content providers, RSS feeds, Twitter® Feeds, or any combination thereof, to provide content. According to an aspect, a user can add a blog, news feed, social network, Twitter® account, etc. to user posting and reviews section 926 as desired. User selector within user posting and reviews section 924 can allow a user can to select between user content associated with a site and read/write/access privileges can be enabled and disabled accordingly.

According to a further aspect, user posting and reviews section 926 can also include a 'Green Energy Reviews' section configured to review energy saving products, environmentally friendly products, green energy producing systems, or any combination thereof. User posting and reviews section 926 can also include a 'Markets' section configured to enable a user to access green energy product websites or marketplaces having green energy products. For example, a marketplace can be used to consolidate available green energy products, such as smart appliances, and further identify third party pricing and websites selling green energy products. As such, a user can read reviews of new energy saving products and access the energy products using user posting and reviews section 926. In some instances, EMUI 900 can be used to enable E-commerce between a posting site within markets section, green energy reviews section, retail energy providers, etc. allowing a firm hosting EMUI 900 to be paid a portion of revenue resulting from a sale.

Figure 10:
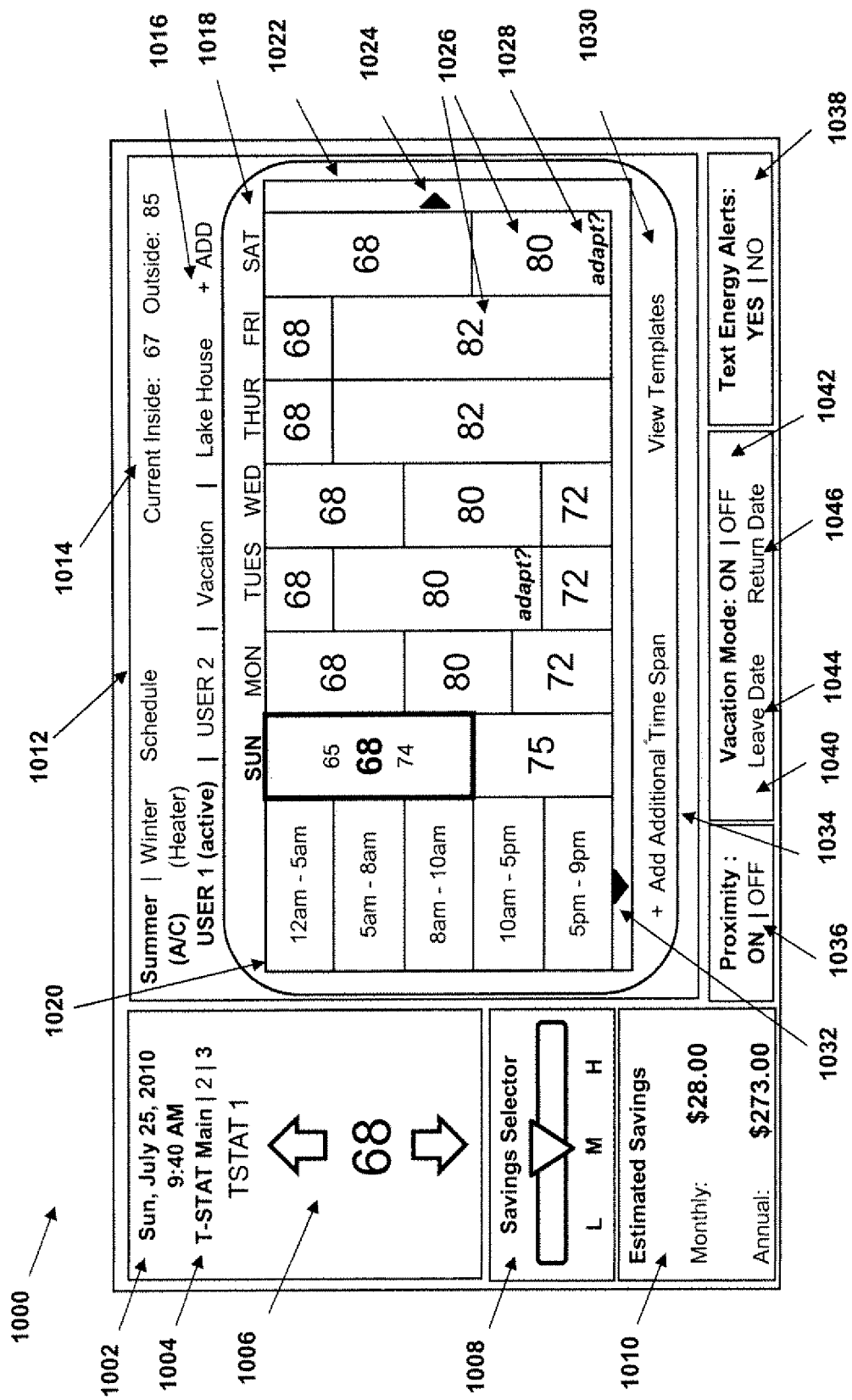
FIG. 10 illustrates an energy management scheduling user interface operable to schedule energy use at a residential site according to a further aspect of the disclosure.

FIG. 10 illustrates an energy management user interface (EMUI) operable to schedule energy use at a residential site, illustrated generally as EMUI 1000 according to a further aspect of the disclosure. EMUI 1000 may be illustrated in association with managing one or more user schedules, thermostats, HVAC systems, zones, sites or any combination thereof. In other forms, EMUI 1000 can be modified to schedule energy use of various energy consumption devices at a site as needed or desired. Additionally, portions or all of EMUI 1000 can be accessed using a computer system capable of accessing the Internet, can be configured as mobile application that can be used with a smart phone or handheld computer, tablet, and the like such as an I-Phone® device, a Blackberry® device, an Android® device, an IPad® or various other devices or systems, or any combination thereof.

According to an aspect, EMUI 1000 includes a thermostat display 1002 configured to enable a user to adjust a temperature of one or more thermostats located at a residential site. Thermostat display 1002 can include a date and time display, a thermostat selector 1004, and a thermostat controller 1006. EMUI 1000 can also include a savings selector 1008 configured to enable a user to select a low savings level, a medium savings level, or a high savings level. Savings selector 1008 can be operably associated with an estimated savings display 1010 and a scheduling tool 1012. For example, a user can select a low savings using savings selector 1008 and an estimated savings can be calculated and displayed within estimated savings display 1010. According to a further aspect, a user can select a savings level using savings selector 1008. As such, resulting thermostat settings can be displayed within scheduling tool 1012 thereby providing a user a visual indication of a resulting temperature setting. According to a further aspect, savings selector 1008 can also be operably associated with scheduling tool 1012 to display more than one temperature setting at a time. For example, a low savings may result in a temperature setting of sixty-five degrees, a medium savings may result in a temperature setting of sixty-eight degrees, and a high savings level may result in a temperature setting of seventy-four degrees. Various combinations of values and display techniques can be used as needed or desired.

According to a further aspect, scheduling tool 1012 can include a seasonal schedule capable of allowing a user to schedule energy use based on a season (e.g. spring, summer, fall, winter). For example, a first site may be located in a hot climate and a second site may be located in a cold climate. As such, an air conditioner may be used more frequently during the summer months in a hot climate and can be associated with a schedule being displayed. A user can select between a seasonal schedule using scheduling tool 1012, and a schedule can be updated accordingly to display a winter schedule. Various other seasonal schedules can be added and removed as needed or desired. In other forms, scheduling tool 1012 can be used to access a current operating mode of an HVAC system and display a seasonal schedule in response to detecting an operating mode. For example, if an HVAC system may be operating in a heat mode, a winter schedule can be displayed. Other seasonal schedules can also be displayed within scheduling tool 1012 as needed or desired.

According to a further aspect, scheduling tool 1012 can include a current inside and outside temperature display 1014, and a schedule selector 1016 capable of displaying a user schedule of a first user, a second user, a vacation schedule, or any combination of schedules. For example, a user may use scheduling tool 1012 to schedule energy use at multiple sites. As such, scheduling tool can display a second site associated with a specific user. Additional schedules can be added as needed or desired, and access privileges also can be set by a current user using user information profile such as user profile 902 illustrated in FIG. 9 or any other privileges or logic capable of setting access privileges.

According to a further aspect, scheduling tool 1012 can also include a weekly schedule display section 1018, and a time span display section 1020 configured within a schedule 1022. Weekly schedule display 1018 can also be configured to show current dates or a series of dates, and can further include forecasted weather conditions of each day. A user can navigate to another week by selecting tab 1024 configurable to enable a subsequent weekly schedule to be displayed as desired. According to further aspect, schedule 1022 includes a plurality of cells generally illustrated at scheduled events 1026 that can be modified as desired to schedule energy use. Schedule events 1026 can include a time interval and setting of a network device, such as a thermostat, being scheduled. A cell can also include an indicator, such as 'adapt?' indicator 1028 to identify an auto-schedule suggestion detected by an energy management system operably associated with EMUI 1000. For example, when a user may be at a site, a user may desire to have a temperature decreased to seventy eight degrees on Saturday prior to nine (9) P.M. As such, an auto-schedule suggestion can be detected and an adapt? indicator 1028 can be displayed to enable a user to have a schedule adapted automatically. Adaption suggestions can be provided to users in other ways and need not be limited to being displaying within schedule 1022.

According to a further aspect, EMUI 1000 can also provide access to view templates selector 1030 that can be used to schedule energy use. For example, view templates selector 1030 can be used to display predetermined schedules within scheduling tool 1012. A user can then modify portions of a selected template to their preference as needed or desired. In other forms, a series of questions can be asked to a user to determine a template to display. For example, scheduling tool 1012 can enable access to a short questionnaire to detect a user's day-to-day schedule. For example, a user can be an urban professional, a housewife, a single parent, a soccer mom, an empty nester, or various other demographics. As such, EMUI 1000 can be adapted to hide scheduling tool 1012 until a survey or series of questions is completed, and then display a resulting schedule within scheduling tool 1012.

According to a further aspect, EMUI 1000 can be adapted to display a list of selectable templates and can allow a user to select and display each template. Upon identifying a template, a user can then save an identified template as a user schedule. In some forms, a user's site location can be determined in advance and templates can be generated based on a location of a site (e.g. warm climate vs. cold climate). As such, view templates can be generated based on a site profile, a user profile, user characteristics, site data, or various other types of data capable of being used to generate a template that can be used by a user.

According to a further aspect, scheduling tool 1012 can also include an add addition time span selector 1034 configured to enable a user to add an additional time span within time span display section 1020. Scheduling tool 1012 can also include a view additional time slot selector 1032 configured to enable a user to scroll to additional time slots that may be output using scheduling tool 1012. For example, a user can select additional time slot selector 1032 and scheduling tool 1012 can be updated to display scheduled events of each day simultaneously. In this manner, a user can scroll additional time slots and days of the week as needed or desired.

According to a further aspect, EMUI 1000 can also include a proximity detection selector 1036. For example, a user may enable proximity detection using proximity detection selector 1036, and energy use at a site may be altered based on a users distance to the site. A user's mobile device number can be associated with a site and can allow a user to enable and disable proximity detection selector 1036. In some forms, proximity detection selector 1036 can be hidden, displayed, selectable, or any combination thereof in response to a user having a mobile device capable of being detected when a user is at or away from a site.

According to another aspect, EMUI 1000 can a energy alert text message selector 1038 configured to enable a text message to be sent to a user's mobile device. For example, during a high energy use day, an energy action day may be identified and a utility company or other entity may publish a warning indicating that a high energy use day may be occurring. As such, a user can receive a text message indicating the situation. In some forms, a can respond to the text message and alter their energy use schedule. For example, a user can respond to a request to alter their energy savings setting from a medium to a high. As such, scheduling tool 1012 can be modified to initiate a high energy savings schedule at a user's site. In other forms, energy alert text message selector 1038 can be used to enable a user to receive demand response requests via a text message. For example, a demand response request can include a requested time interval, new temperature setting, estimated savings, other demand response data, or any combination thereof within a text message. A user can then respond to the text message to participate, not participate, partially participate, or any combination thereof. Upon responding, a user's schedule can be modified as needed or desired.

According to a further aspect, EMUI 1000 can also include a vacation mode settings 1040 to enable a user to initiate use of a vacation mode or schedule. For example, vacation mode settings 1040 can include a vacation mode selector 1042 to turn a vacation mode on or off. Vacation mode settings can also include a schedule leave date selector 1044 and a schedule return date selector 1046. A calendar (not expressly illustrated in FIG. 10) can be displayed to enable a user to select an interval of dates when they will be on vacation. As such, reduced energy use can be realized by altering a temperature setting. For example, a schedule can be increased to a high energy saving mode in association with the vacation mode being selected. In other forms, a user may have input or selected a vacation schedule to be used when vacation mode may be selected. Various combinations can be used as needed or desired.

During use, upon a user accessing EMUI 1000, EMUI 1000 can display a current date and time, and can further highlight a current cell within scheduling tool 1012 that corresponds to a current data and time. A user can select a thermostat to adjust using thermostat selector 1004, and a schedule of a selected thermostat can be displayed within scheduling tool 1012. A user can adjust a current set-point using thermostat controller 1006, and a corresponding temperature within a current cell can be adjusted accordingly. In another form, a user can select a cell to be modified. For example, a user may want to modify a temperature setting or scheduled event set for Tuesday, between eight (8) A.M and five (5) P.M. As such, a user can select the appropriate cell and further adjust a temperature up or down using thermostat controller 1006. A new setting can be displayed within the selected cell. According to a further aspect, a user can use savings selector 1008 to adjust a savings to be realized on a specific day. As such, a resulting temperature setting can be displayed within a selected cell.

In other forms, a user can select a time span cell to adjust. For example, a user can modify a current time span cell by selecting a specific cell. Upon selection of a specific cell, scheduling tool 1012 can highlight which cells may be affected by modifying a time interval. A user can then modify an interval accordingly as needed or desired.

According to a further aspect, a user can select a day of the week to modify. For example, a user can select 'MON' and a background color can be altered to indicated that each of the MON cells can be modified. In a form, a user can update each cell as desired, can alter one or more, or all MON cells using savings selector 1008 as needed or desired.

According to another aspect, EMUI 1000 can be used to activate a one or more schedules. For example, a first user schedule can be activated over a period of time and then a second user schedule can be activated over another period of time. A user can also activate a vacation schedule that include an scheduled events to optimize energy savings when nobody is present at a site. In other forms, a first user schedule can be compared to a second user schedule, and events at a site can be scheduled accordingly. For example, a first user schedule may be active during an evening time and may override a second user schedule. In other forms, a second user schedule may be activated in the morning to accommodate an individual that may remain at home during the day. As such, EMUI 1000 can be used to generate multiple schedules to automatically control energy use at a site as needed or desired.

According to an aspect, portions or all of EMUI 1000 can be provided as a hosted application that can allow a user to access site reports, historical consumption data, real-time consumption data, operating status of energy consuming devices, control interface to control energy consuming devices, a scheduling interface to schedule utilization and consumption of energy, an inventory tool that will show real-time and historic energy consumption of each energy consumption device within the home, or any combination thereof.

According to a further aspect, portions of all of EMUI 1000 can include a user interface that can report a current operating condition, and can further include control logic capable of providing a user access to a smart appliance or control system at a site. For example, if a demand response condition may be detected within an energy transmission system, EMUI 1000 can be used to output the condition to a user. A user can then alter an operating status of one or more energy consuming devices at a site.

According to another aspect, a site can include multiple users that can access and control settings at a site using EMUI 1000. Additionally, a site can include multiple thermostats that can be managed remotely and controlled by a user. For example, a thermostat in the upper portion of a home can be displayed via a web browser or application on an mobile device such as a Blackberry®, I-Phone®, Android®, I-Pad® and the like. A user can select a thermostat using thermostat selector 1004, and adjust the thermostat to a first setting. In some forms, the thermostat settings may have a different effect on the actual temperature within various portions of the home. As such, a user may want to select the desired temperature within at a site, and EMUI 1000 can be used to calculate thermostat settings to achieve the desired temperature. In another form, EMUI 1000 can be used with an energy management system such as energy management system 600 in FIG. 6, or other systems. A thermal response of a zone, room, site, or any portion thereof can be determined and setting of one or more thermostats can be automatically determined to achieve a desired temperature.

In other forms, EMUI 1000 can be used in association with various types of EMI data. For example, various EMI data such as current and forecasted weather data, grid conditions, real-time pricing data, grid congestions conditions, forecasted demand, or any combination thereof of EMI data can be used to determine a setting recommendation that a user can select. In this manner, a user's lifestyle and preferences can be aligned with the real-time and forecasted conditions allowing a user to make informed energy consumption decisions.

Figure 11:
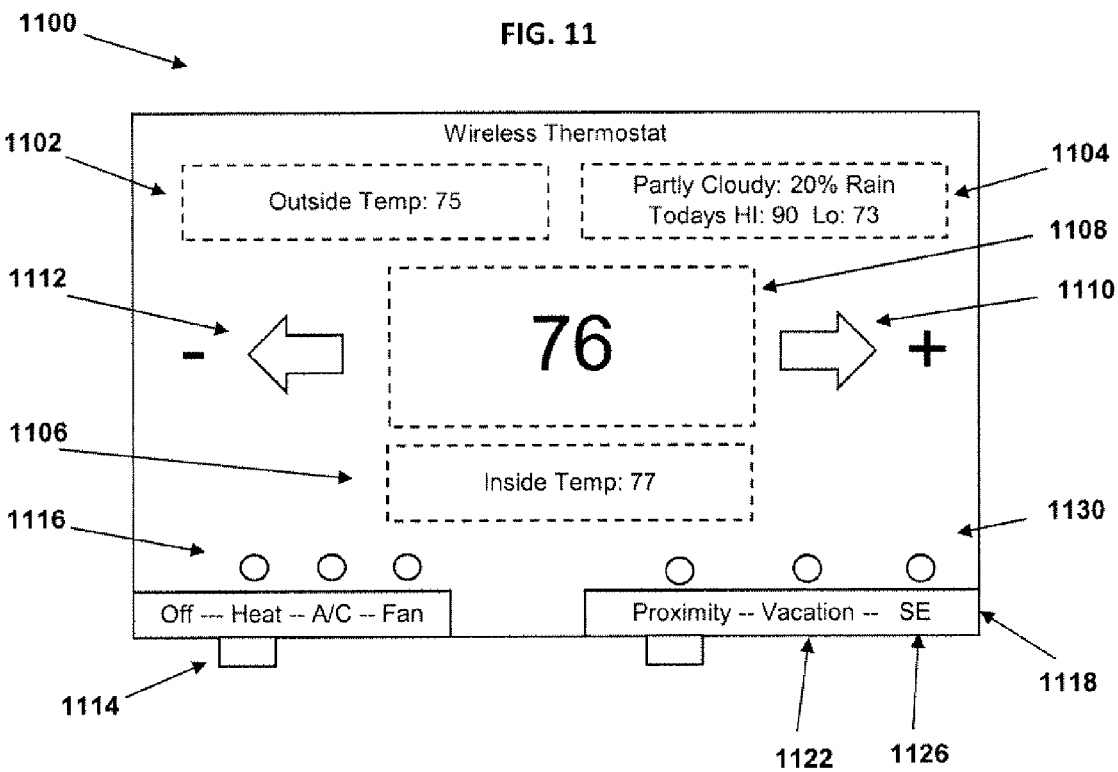
FIG. 11 illustrates an wireless thermostat user interface operable according to an aspect of the disclosure.

FIG. 11 illustrates a diagram of a network device, illustrated generally as wireless thermostat 1100, according to an aspect of the disclosure. Wireless thermostat 1100 can be used in association with an energy management system, mobile device, energy management user interface, or various other devices, systems, or any combination thereof.

Wireless thermostat 1100 can include a outside temperature display 1102, a weather forecast display 1104, and an inside temperature display 1106. Wireless thermostat 1100 can also include a thermostat setting display 1108, a temperature increase input 1110, and a temperature decrease input 1112. Various type of display technology having single color, multicolor, or any combination thereof can be used with wireless thermostat 1100, including, but not limited to LED displays, TFT displays, OLED displays, LCD displays, flexible lighting displays, or any combination thereof.

According to an aspect, wireless thermostat 1100 can also include a mode switch 1114 and indicators 1116 configured to identify a mode. For example, mode switch 1114 can be placed off, heat mode, air condition model, or fan mode. An associated indicator above each mode within setting display 1116 can be illuminated in connection with an operating mode setting. In other forms, indicators 1116 can be placed behind an associated text and illuminated to indicate a current mode. For example, wireless thermostat 1100 can include a thin material that can allow a backlight, such as LED lighting to illuminate and show text. In another form, mode switch 1114 can include a push button or toggle switch to enable a back light to display and select a mode. Various other input and display methods or combinations thereof can be used.

According to a further aspect, wireless thermostat 1100 can also include a smart thermostat settings 1118. Smart thermostat settings 1118 can be programmable settings that can display a proximity mode 1122, a vacation mode 1124, and a smart energy mode 1126. Smart thermostat settings 1118 can be displayed based on a capability of a site, a current operating mode of wireless thermostat 1100, a setting within a energy management user interface such as EMUI 1100 and the like, an operating mode of a mobile device, a location of a mobile device, an operating mode of another network device accessible to an energy network, or various other combinations of operating modes or settings accessible to wireless thermostat 1118. For example, a user may want to activate proximity detection to control wireless thermostat 1100 (and possible other network devices) using proximity mode 1122. As such, a user can activate proximity mode accordingly. In other forms, a user may be going on vacation and can activate vacation mode 1122. In another form, a user may activate a smart energy mode 1126, and an energy schedule provided by EMUI 1100, associated settings, and the like can be deployed.

According to another aspect, wireless thermostat 1100 can include a housing 1130 can having a material that can detect when a user touches wireless thermostat 1100. For example, housing 1130 can be operably coupled to a heat sensor, capacitive sensor, and the like configured to detect when a user touches a portion of housing 1130. Upon detecting a user contacting housing 1130, one or more displays or indicators of wireless thermostat 1100 may illuminate. In this manner, energy consumed by wireless thermostat 1100 can be realized by changing one or more displays from a sleep state to a display state. According to a further aspect, a portion or all of housing 1130 can include a material such as a concealing material that can include characteristics such as transparency, translucency, semi-transparency, semi-translucency, opaqueness, other types of light altering material, or any combination thereof capable of hiding one or more displays or indicators of wireless thermostat 1100. For example, a backlight or LED can illuminate at a surface of wireless thermostat 1100 giving an appearance of having the display at or near a front surface of housing 1130. As such, housing 1130 with a concealing material can be mounted on a wall or other location without having readings or settings persistently being displayed using a display or other indicators.

According to an aspect, temperature control mechanisms 1110 and 1112 can include a mechanism (not expressly illustrated in FIG. 11) that can allow housing 1130 to rock or shift left and right as a user contacts mechanisms 1110 or 1112. Other orientations can also be used. For example, wireless thermostat 1100 can mounted to a wall surface (not expressly illustrated in FIG. 11), and a user can contact a temperature increase mechanism 1110. Housing 1130 would rock slightly to the right. In another form, at least a portion of housing 1130 can include a switch mechanism similar to a mouse of a computer system that provides a clicking sound or a mechanical feedback when temperature control mechanisms 1110 or 1112 are engaged or touched. As such, a user can realize a visual change of display 1108, and can further be provided a mechanical feedback of a switching mechanism upon activation of a switching mechanism. Various other orientations to rotate housing (e.g. up/down, left/right, etc.) can be realized as needed or desired.

Figure 12:
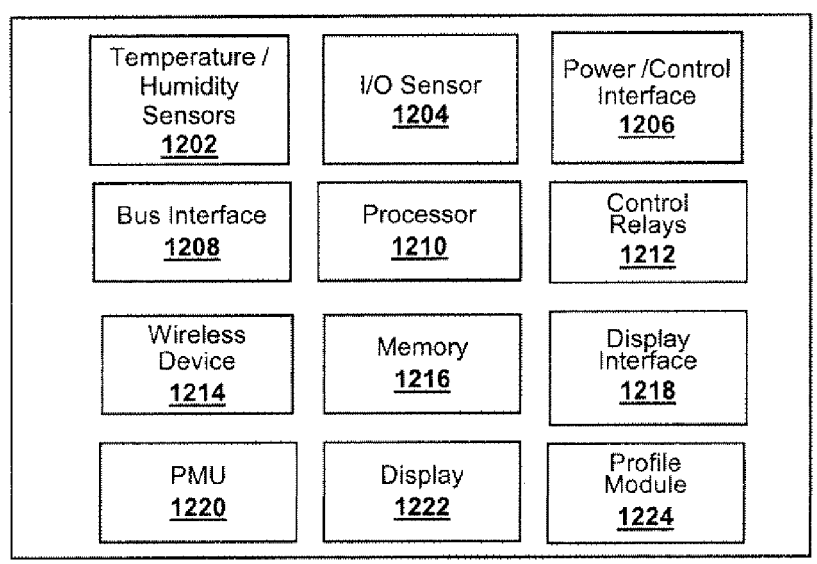
FIG. 12 illustrates a block diagram of a wireless thermostat according to a further aspect of the disclosure.

FIG. 12 illustrates a block diagram of a network device, illustrated generally as a wireless thermostat 1200, according to another aspect of the disclosure. Wireless thermostat 1200 be used with wireless thermostat 1100 illustrated in FIG. 11 above or various other devices, systems, or any combination thereof described herein. Wireless thermostat 1200 can include a temperature and humidity sensors 1202, and one or more I/O devices 1204 to allow a user to provide an input to wireless thermostat 1200. For example, I/O device 1204 can enable a user can to select a mode (e.g. off, A/C, Heat, Fan, etc.), a smart energy mode (e.g. proximity, vacation, smart schedule, etc.), or various other features or combinations of features. Wireless thermostat 1200 can also include a power interface 1206, and a bus interface 1208. Wireless thermostat 1200 can also include a processor or controller 1210, and one or more control relays 1212 to control a remote unit such as an HVAC unit, heat pump, other appliances, or any combination thereof.

According to a further aspect, wireless thermostat 1200 can also include a one or more wireless devices 1214 capable of communicating with one or more associated wireless networks, a memory 1216, and a display interface 1218. Display interface 1218 can be configured to engage one or more LCD displays, touch screens, one or more LEDs, or various other display technologies illustrated generally as display 1222. Wireless thermostat 1200 can also include a precision measurement unit (PMU) 1220 configured to measure consumed by an associated network device, and a profile module 1224 that can include network protocol configuration data, user profile data, device data, seasonal profile data, or various other types of data that can be accessed during use of wireless thermostat 1200. According to an aspect, wireless thermostat 1200 is a non-programmable thermostat that does not include an enabled programmable thermostat scheduling feature accessible by a user engaging wireless thermostat 1200. As such, a limited amount of scheduling functionality is needed or desired within wireless thermostat 1200 and a user can use a scheduling tool such as EMUI 1000 or various other features provided herein to enable and disable use of wireless thermostat 1200.

Figure 13:
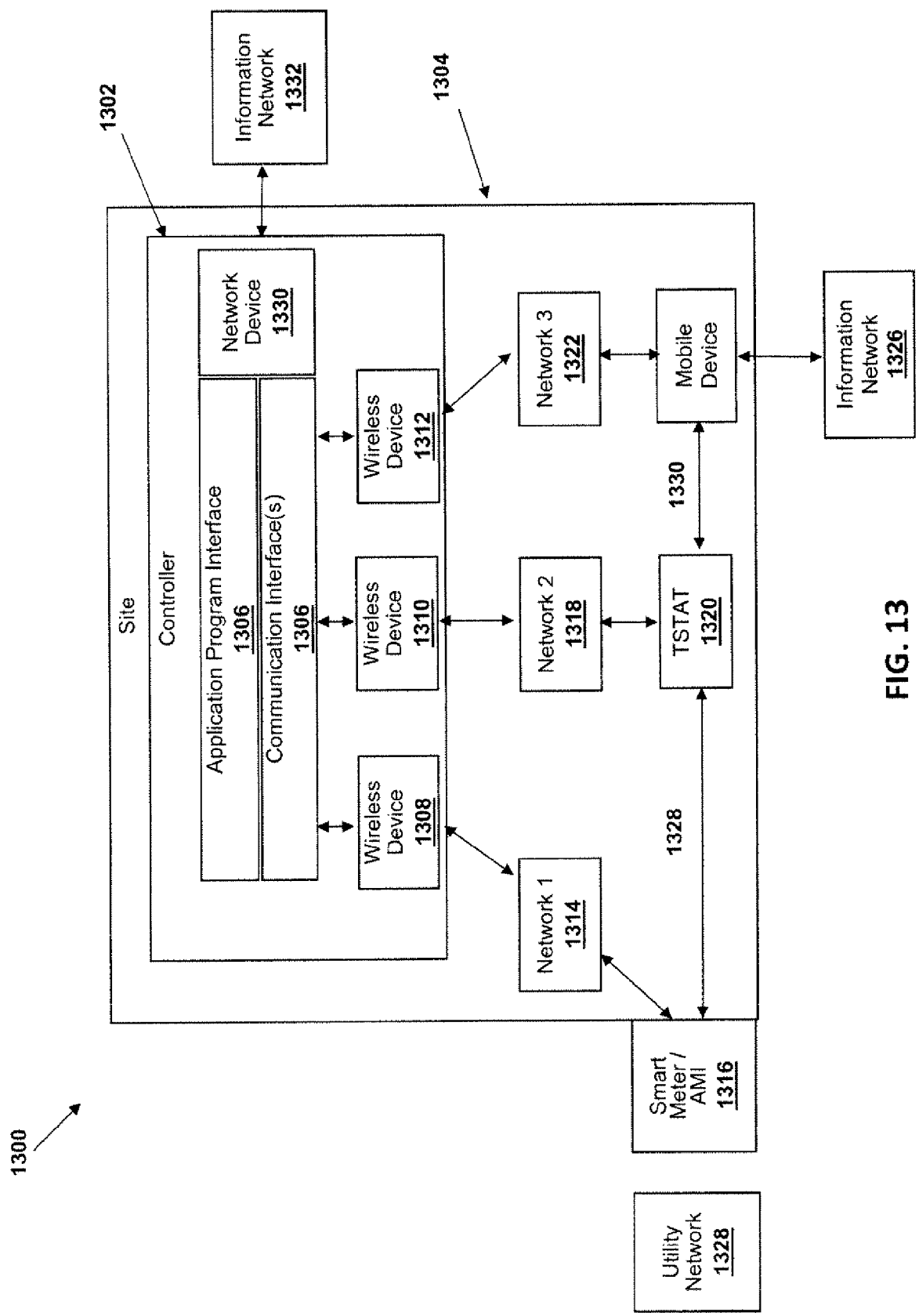
FIG. 13 illustrates a block diagram of an energy network bridge according to a further aspect of the disclosure.

FIG. 13 includes a block diagram of an energy management system, illustrated generally at 1300, according to a further aspect of the disclosure. Energy management system 1300 can be deployed at residential site 1302 and can include an energy management apparatus or controller 1302. Controller 1302 can include portions or all of controller 400 described in FIG. 4 or any other type of system, device, apparatus, or any combination thereof capable of deploying controller 1302.

According to an aspect, controller 1302 can include an application program interface 1306 operably coupled to a processor or logic (not expressly illustrated in FIG. 13) of controller 1302. Controller 1302 can include a communication interface 1306 a wireless device 1308 configured to access a first network 1314, a wireless device 1310 configured to access a second network 1318, and a wireless device 1312 configured to access a third network 1322. Controller 1302 can also include a network device 1330 such as an Ethernet or other wireline communication device capable of access an information network such as a LAN, WAN, the Internet, and the like.

According to a further aspect, first network 1314 can be communicatively coupled to a smart meter/AMI device 1316. According to another aspect, second network 1318 can be communicatively coupled to a wireless thermostat (TSTAT) 1320. According to a further aspect, third network 1322 can be coupled to a mobile device 1324. According to an aspect, mobile device 1324 can include a smart phone device such as a Blackberry®, I-Phone®, Android ® and the like, a laptop computer system, a Netbook, an IPad®, or any other type of mobile device.

During use, controller 1302 can be used to communicate information from various networks to a wireless energy network to manage one or more network device connected to a wireless energy network. For example, second network 1318 can be configured as a wireless energy network capable of enabling communication with a network device such as TSTAT 1320. Information can be received from information network 1332, and processed by controller 1302 and output to TSTAT 1320 using API 1306 and communication interface 1306. In other forms, information can be communicated from mobile device 1324 to controller 1302 using third network 1322 that may be different from second network 1318. Controller 1302 can detect information communicated from mobile device 1324 and output information to TSAT 1320 using second network 1318 to TSTAT 1320. As such, controller 1302 can provide a network bridge to enable information communicated between various different types of networks.

According to an aspect, controller 1302 can include application program interface 1306 configured to use at least a portion of an incoming message communicated from an information network, an information network, a utility network 1328 or any combination thereof. For example, an incoming message can include at least a portion of a user energy management schedule. Controller 1302 can initiate altering use of a resource in response to detecting a portion of the first user energy management schedule. For example, a schedule can include altering a thermostat, lights, smart appliances, etc. Communication interface 1306 can further be operably coupled to application program interface 1306 and configured to communicate information using a wireless device.

For example, communication interface 1306 can communicate with wireless device 1310 capable of accessing a second network 1318 operable as a wireless energy network. Although illustrated as a single communication interface, communication interface can be provided as multiple communication interfaces, a single communication interface, as a multi-network communications interface, or any combination thereof. As such, multiple networks can be accessed and communicated with as needed or desired. For example, wireless device 1312 can be configured to communicate using a WIFI enable communication protocol and wireless device 1310 can be configured to communicate using a Zigbee enabled communication protocol.

According to an aspect, controller 1302 can include wireless device 1312 configured as a WIFI enabled communication device operably coupled communication interface 1306 and third network 1322 operable as a WIFI network. Application program interface 1306 can be configured to receive an energy management schedule communicated using an incoming message received from third network 1322 as an incoming WIFI message. As such, an energy management schedule or other EMI data can be communicated from a WIFI enabled device, such as mobile device 1324 or other devices. Controller 1302 can then use application program interface 1306 to process the energy management schedule and initiate control actions to a network device accessible to an energy network.

According to another aspect, controller 1302 can receive an first energy management schedule using a first network, and receive a second energy management schedule using a second network. For example, a first energy schedule can be received using network device 1330 and can include a first user energy schedule data. A second energy schedule can be received using third network 1322 operable as a WIFI network. For example, a user of mobile device 1324 can provide scheduling data, control data, or various other energy management scheduling data. Controller 1302 can then use portions of each schedule as needed or desired, and initiate control actions using second network 1318 operable as a wireless home energy network. For example, second network 1318 can be configured as a Zigbee enabled network. As such, multiple networks having scheduling information can be accessed and scheduling data of multiple users can be used to control network devices accessible to an energy network.

According to an aspect, controller 1302 can include output control actions that have been received from more than one network to control a network device accessible to an energy network. For example, wireless device 1312 can be configured to receive control action data from third network 1322 operable as a WIFI enabled network. Control action data can be provided in association with a first user schedule using mobile device 1324. Controller 1302 can further receive a second control action data from associated with a second user schedule, such as a utility schedule. Second control action data or a second user energy management schedule can be communicated using first network 1314 configured as an AMI enabled network and smart meter/AMI interface 1316. Controller 1302 can then detect whether to use the second control action prior to the first control action.

According to another aspect, control action data of multiple user schedules can be communicated using communication interface 1306 provided as multiple communication interfaces. For example, wireless device 1312 can include a communication interface accessible to application program interface 1306. Additionally, wireless device 1310 can include a communication interface accessible to application program interface 1306. As such multiple communication interfaces can be deployed to communicate control action data of one or more user energy management schedule.

According to a further aspect, application program interface 1306 can be used to initiate use of a first control action of a first user energy management schedule prior to using a first control action of a second user energy management schedule prior to the first user energy management schedule. For example, a second user energy management schedule can include one or more control action that can have a higher priority that a first user energy management schedule. As such, controller 1302 and application program interface 1306 can initiate a control action as needed or desired based on a priority.

According to a further aspect, controller 1302 can initiate a control action or energy management schedule in response to a distance an associated mobile device 1324 may be from site 1304. For example, a first user energy management schedule may be deployed as a first user having mobile device 1324 may be located at or near site 1302. As mobile device 1324 moves away from site 1302 (e.g. one mile, three miles, etc.), a second user energy management schedule can be initiated and used by controller 1302. In this manner, proximity detection of mobile device 1324 can be used to initiate a second user energy schedule.

According to another aspect, mobile device 1324 can output scheduling data, control action data, energy management data, and the like using third network 1322 configured as a WIFI enabled network. For example, mobile device 1324 can include a application or scheduling logic capable of initiating a user energy management schedule. Mobile device 1324 can encode or output control action data, and communicate the control action data, scheduling data, and the like using a WIFI protocol and messaging format.

According to an aspect, controller 1302 can include detect when mobile device 1324 may be connected to third network 1322 and modify operation of a network device accessible to controller 1302. For example, mobile device 1324 can be coupled to third network 1322 operable as a WIFI network, or other network capable of being deployed at site 1304. As mobile device 1324 moves away from site 1304 and a network connection to third network 1322 may be altered, controller 1302 can detect a change in connectivity (e.g. weak signal, signal is lost, connection switches to another hub, station, controller, and the like) to third network 1322, a connection status of wireless device 1312 can be output to communication interface 1306 and accessed by application program interface 1306. As such, controller 1302 can detect whether to alter use of a resource or network device accessible to controller 1302. For example, mobile device 1324 may be connected to third network 1322 using a WIFI connection. As a WIFI connection is altered, controller 1302 can initiate altering an operating condition of a resources such as TSTAT 1320, one or more wireless devices 1308, 1310, 1312, or various other resources accessible to controller 1302. For example, if a second user may be located at site 1304, a second user energy management schedule that may be different from the first user energy management schedule can be deployed. For example, a first portion of a second energy management schedule of a second user can be enabled in response to the operating status of the resource, According to another aspect, wireless device 1312 that may have been configured to be coupled to third network 1322 can be placed in a reduced operating condition to save power consumed by controller 1302. In another form, proximity detection of mobile device 1324 can be initiated to detect a location of mobile device 1324 when a WIFI connection or other connection is altered. Additionally, mobile device 1324 may also alter an operating condition by disabling a WIFI connection to third network 1322. Mobile device 1324 can also initiate location reporting of mobile device 1324, and controller 1302 can alter an operating condition of a network device or resource in response to mobile device 1324 being at a distance from site 1304.

According to another aspect, mobile device 1324 may be configured to enable access to TSTAT 1320 using a network connection 1330 that can include one or more wireless communication protocols. For example, a network device such as TSAT 1320 can be coupled to mobile device 1324 using a WIFI connection, Bluetooth connection, or various other forms of wireless communication. Upon connecting to TSTAT 1320, mobile device 1324 can be used to alter and operating condition of TSTAT 1320. As such, mobile device 1324 having energy management capabilities can be used to alter an operating condition of TSTAT 1320, various other network devices at site 1304, or any combination thereof. For example, mobile device 1324 can include an energy management scheduling tool, such as portions or all of EMUI 1000 described in FIG. 10, to provide control inputs and scheduling data directly to TSTAT 1320. As such, controller 1302 may not be available to output control actions (e.g. a network connection may be lost, etc.), or mobile device 1324 may have priority over controller 1302 to provide control inputs or energy managing scheduling information to TSTAT 1320.

According to a further aspect, TSTAT 1320 can receive an input and communicate status information, operating conditions, control actions, or any combination thereof to a network resource, controller 1302, mobile device 1423, smart meter/AMI 1316, or any other device, system, or apparatus, or any combination thereof. According to an aspect, TSTAT 1302 can detect is a user altered an operating condition (e.g. change mode, altered smart energy settings, etc.) and can communicate an operating status change. In another form, TSTAT 1320 can alter an operating status of another network device in response to an input to TSTAT 1320. For example, a user may place TSTAT 1320 in a vacation operating mode. As such, TSTAT 1320 can output an updated status to another network device, controller 1302, mobile device 1324, or other network devices. For example, a second TSTAT may be located at site 1304 (not expressly illustrated in FIG. 13), and placed in a vacation operating mode using a signal output by TSTAT 1320. In other forms, controller 1302, mobile device 1324, or any combination thereof can be used to alter the operating condition of the second TSTAT as needed or desired.

Figure 14:
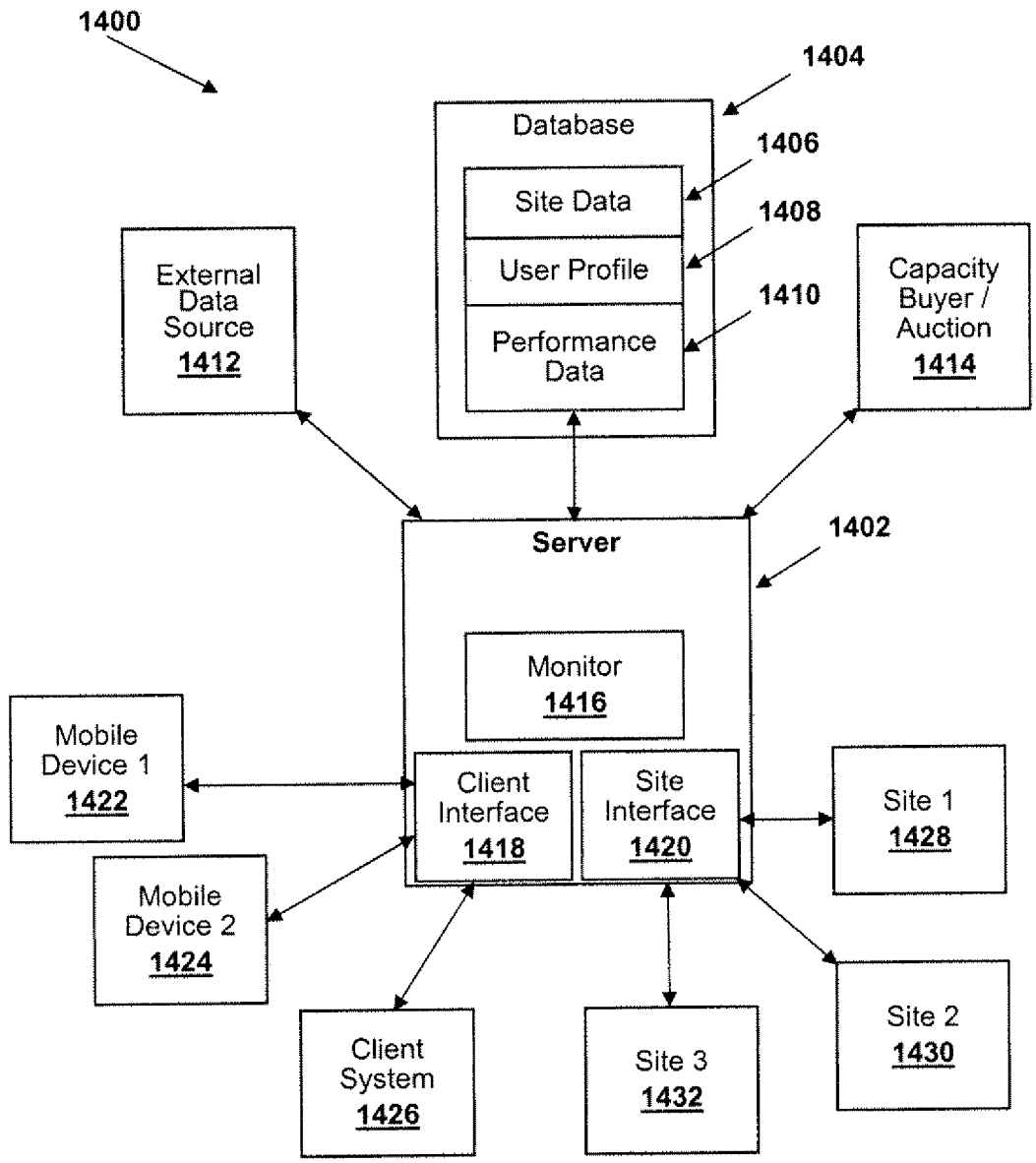
FIG. 14 illustrates a block diagram of a demand response system according to a further aspect of the disclosure.

FIG. 14 illustrates a collaborative demand response system (CDRS), illustrated generally at 1400, according to an aspect of the disclosure. CDRS 1400 can include a server 1402 operably coupled to an information source such as a database 1404. According to a further aspect, server 1402 can include portions or all of server 602 illustrated in FIG. 6, or any other server capable of being deployed with CDRS 1400. According to further aspect, database 1404 can include site data 1406, user profile data 140, performance data 1410, or various other types of EMI data that can be used in association with CDRS 1400 as needed or desired. According to another aspect, CDRS 1400 can also include access to one or more external data source 1412. CDRS 1400 can also interface with an energy buyer/auction 1414 capable of buying available capacity of CDRS 1400.

According to a further aspect, CDRS 1402 can include a monitor 1416, a client interface 1418, and a site interface 1420. According to an aspect, client interface 1418 can be coupled to a first mobile device 1422, a second mobile device 1424, a client system 1426, or any combination thereof. For example, client interface 1418 can be configured as a mobile client interface operable to communicate information using a mobile network. In other forms, client interface 1418 can be coupled to a client system 1426 using an information network such as the Internet.

According to another aspect, CDRS 1402 can include site interface 1420 configured to interface with multiple sites. For example, site interface 1420 can be operably associated with first site 1428 and mobile device 1422. In other forms, site interface 1420 can be operably associated with second site 1430 and mobile device 1424. Site interface 1420 can also be operably associated with third site 1432 and client system 1426. Various other combinations can also be used with CDRS 1400.

During use, CDRS 1400 can be used to determine a desire by an owner of a site to participate in a demand response event. Server 1402 and monitor 1416 can detect a current or future demand response initiative to be deployed at a specific time. Server 1402 can detect an availability of capacity in a specific region, and initiate an inquiry with a site owner, user, administrator, etc. According to an aspect, a text message, email message or other form of electronic or wireless messaging can be initiated to detect a desire by a user to participate. Server 1402 can access site data 106 associated with a specific site to detect if a user may have a default setting to participate. In other forms, a user a user may have set a preference to be contacted via email or text message. As such, server 1402 can initiate a message and detect a desire by one or more users to participate.

According to a further aspect, server 1402 can access performance data of each site elected to participate in a demand response event. For example, historical site data of a site can be stored within database 1404, and performance of a participating site can be determined as performance data 1410. According to an aspect, other EMI data can be accessed from database 1404, external data source 1412, or any combination thereof and used to determine performance of a site. For example, current and future weather conditions can be used to determine performance of a site. Taking weather conditions into consideration, along with a thermal response or characteristic of a site, a capacity to reduce energy can be determined on a site by site basis. The overall or aggregate capacity and desire to participate can be sold to a third party, monetized by an owner of CDRS 1400, or any combination thereof.

Figure 15:
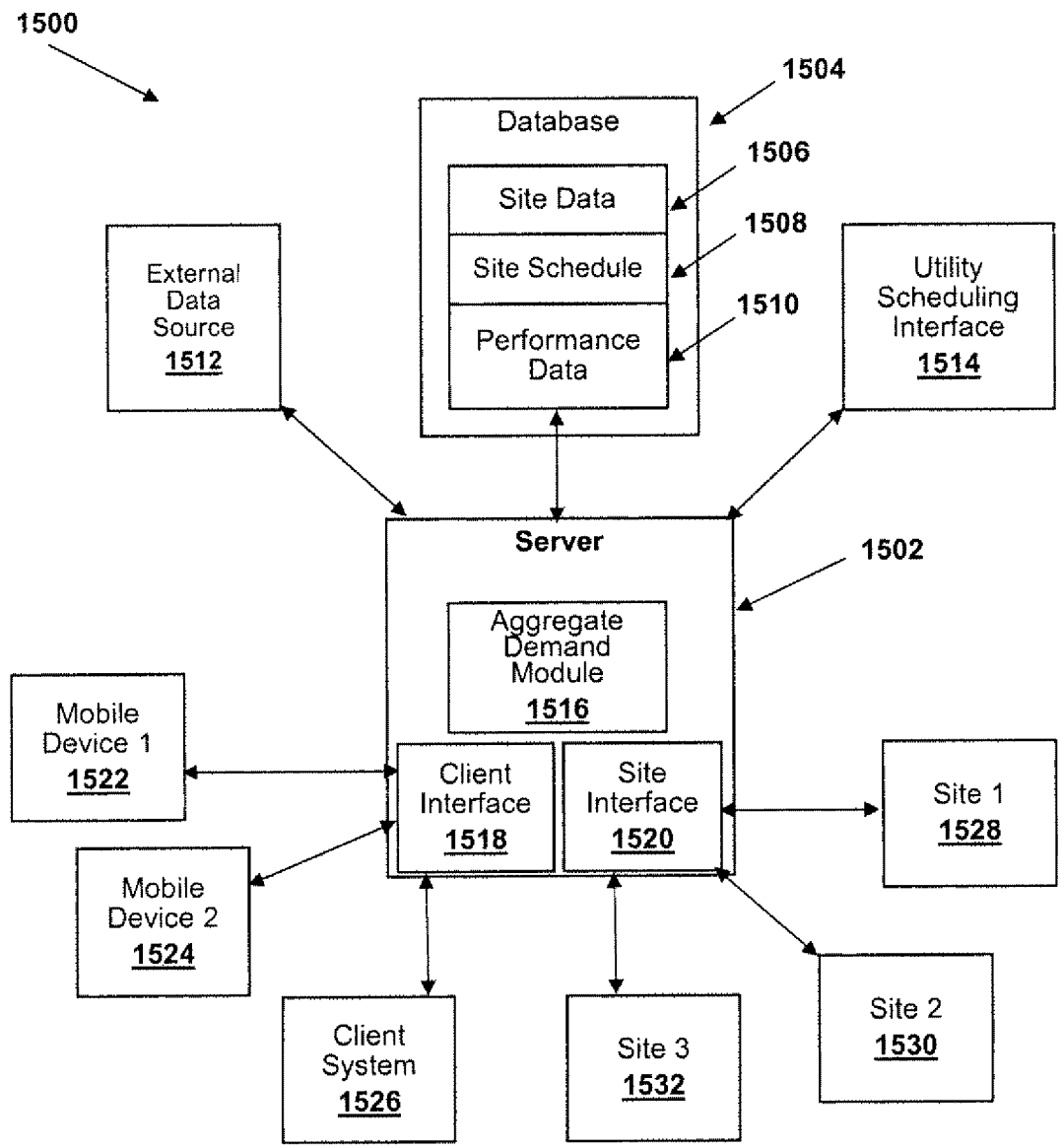
FIG. 15 illustrates a block diagram of a aggregate demand schedule system according to a further aspect of the disclosure.

FIG. 15 illustrates a demand scheduling system (DDS), illustrated generally at 1500, according to an aspect of the disclosure. DSS 1500 can include a server 1502 operably coupled to an information source such as a database 1504. According to a further aspect, server 1502 can include portions or all of server 602 illustrated in FIG. 6, or any other server capable of being deployed with DDS 1500. According to an aspect, database 1504 can include site data 1506, site schedule data 1508, performance data 1510, or various other types of EMI data that can be used in association with DSS 1500 as needed or desired. According to another aspect, DSS 1500 can also include access to one or more external data sources 1512. DSS 1500 can also interface with an utility company, COOP, retail energy provider, or various other energy providers, or any combination thereof, using one or more utility schedule interface 1514. According to an aspect, utility scheduling interface 1514 can be a standard interface however in other forms, utility scheduling interface 1514 can include a custom interface configurable to engage an existing energy company's information network, infrastructure, database, or various other components that can be used by an energy provider to access DDS 1500.

According to a further aspect, DSS 1502 can include an aggregate demand module 1516, a client interface 1518, a site interface 1520, or any combination thereof. According to an aspect, client interface 1518 can be coupled to a first mobile device 1522, a second mobile device 1524, a client system 1526, or any combination thereof. For example, client interface 1518 can be configured as a mobile client interface operable to communicate information using a mobile network. In other forms, client interface 1518 can be coupled to a client system 1526 using an information network such as the Internet.

According to another aspect, DSS 1502 can include site interface 1520 configured to interface with multiple sites. For example, site interface 1520 can be operably associated with a first site 1528 that can be associated with mobile device 1522. In other forms, site interface 1520 can be operably associated with a second site 1530 and mobile device 1524. Site interface 1520 can also be operably associated with third site 1532 and client system 1526. Various other combinations can also be used with DSS 1502.

During use, server 1502 can use EMI data to forecast energy use at sites 1528, 1530, and 1532. For example, each site can include site schedule data 1508 stored within database 1504. For example, EMUI 1000 or another scheduling tool can be used to schedule energy use at a site. Site 1508 schedule data can be used to determine what energy use may be on a site-by-site basis. An aggregate demand of a specific region, zip code, substation, grid location, etc. can also be detected. Aggregate demand module 1516 can then detect what an aggregate level of demand and scheduled demand can then be communicated to a utility company as needed or desired. In this manner, scheduling data that may not have been traditionally accessible on a site by site basis can be used to detect energy demand and schedule energy production. For example, residential sites traditionally use non-programmable and programmable thermostats that do not allow for determining schedules on a site by site basis. DSS 1500 can enable access to scheduling data of each residential site to determine an aggregate demand schedule.

According to an aspect, server 1502 can access performance data of each site to determine scheduled energy demand. For example, historical site data of a site can be stored within database 1504, and performance of a participating site can be determined as performance data 1510. According to an aspect, other EMI data can be accessed from database 1504, external data source 1512, or any combination thereof and used to determine performance of a site. For example, current and future weather conditions can be used to determine performance of a site. Taking weather conditions into consideration, along with a thermal response or characteristic of a site, a capacity to reduce energy can be determined on a site by site basis. The overall or aggregate demand can be used by the owner of DSS 1500 or communicated to a third party on a contractual basis as needed or desired.

Figure 16:
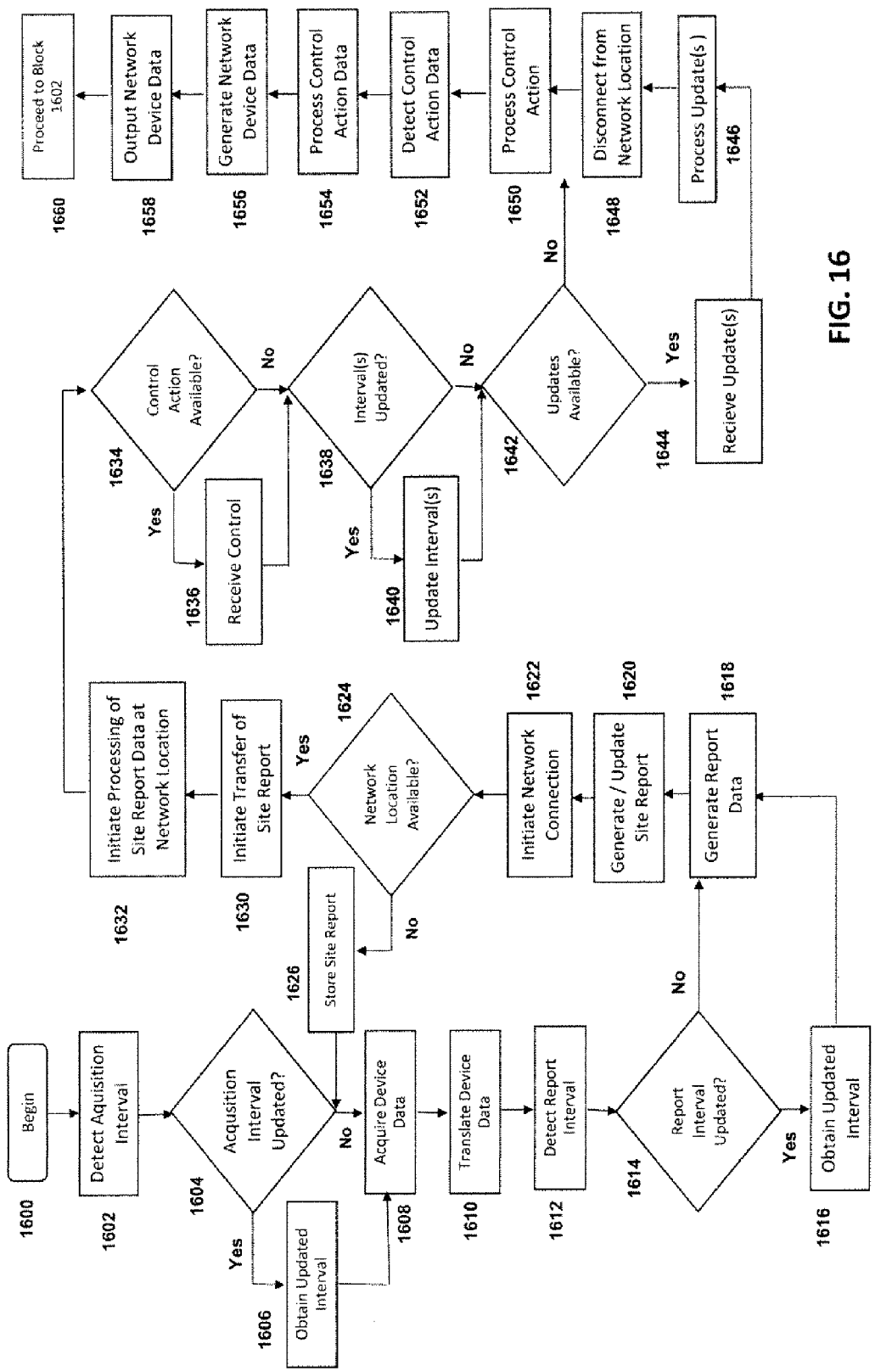
FIG. 16 illustrates a flow diagram of a method of managing energy use at a residence according to a further aspect of the disclosure.

FIG. 16 illustrates a method of managing energy at a site according to an aspect of the disclosure. Portions or all of the method of FIG. 16 can be used with portions or all of the energy management systems, devices, or apparatuses disclosed herein, or any other type of system, controller, device, module, processor, or any combination thereof, operable to employ all, or portions of, the method of FIG. 16. Additionally, the method can be embodied in various types of encoded logic including software, firmware, hardware, or other forms of digital storage mediums, computer readable mediums, or logic, or any combination thereof, operable to provide all, or portions, of the method of FIG. 16.

The method begins generally at block 1600. At block 1602, an acquisition interval to acquire network device data can be detected. For example, network device data can be acquired using a wireless energy network having one or more network devices accessible to the wireless energy network. For example, a wireless energy network can include various types of wireless networks configured to communicated information to manage energy use of a network devices accessible to the wireless network. For example, a wireless energy network can include one or more of any combination or portion of, IEEE 802.15-based wireless communication, Zigbee communication, INSETEON communication, X10 communication protocol, Z-Wave communication, Bluetooth communication, WIFI communication, IEEE 802.11-based communication, WiMAX communication, IEEE 802.16-based communication, various proprietary wireless communications, or any combination thereof.

At decision block 1604, the method can detect whether an acquisition interval may be updated. For example, an acquisition interval can be set to a first interval (such as 1 minute, 2 minutes, 10 minutes etc.), and can then be altered to another interval. According to an aspect, an acquisition interval can be altered in response to a distance a mobile device may be from a site. For example, as a user moves away from a site, an acquisition interval can be increased (e.g. changed from 1 minute to 3 minutes). Similarly, as a mobile device move towards a site, an acquisition interval can be decreased (e.g. changed from 3 minutes to 1 minute). Various combinations of intervals can be used as needed or desired. If at decision block 1604 an acquisition interval has been updated, the method can proceed to block 1606 and an updated interval can be obtained. If at decision block 1604 an acquisition interval has not been changed, the method can proceed to block 1608.

According to an aspect, at block 1608, device data can be acquired. For example, device data can be obtained by sending a request to one or more network devices joined to a wireless energy network. For example, multiple devices can be accessed at an acquisition interval to obtain device data. Device data can be provided in various forms and types of information. According to an aspect, device data can include a device identifier, a network identifier, operation data, security data, various other types of data that can be used to manage energy use, or any combination thereof. According to a further aspect, device data can be formatted based on a wireless communication protocol (e.g. Zigbee, WIFI, WiMax, etc.) being deployed as the wireless energy network.

According to another aspect, the method can be modified to detect an availability of one or more network devices. For example, a first network device may be accessible to a wireless energy network and may use a first device profile to communicate information using the wireless energy network. Additionally, a second network device may be accessible to the wireless energy network and may use a second device profile that may be different from the first.

Upon acquiring device data from one or more network devices, the device data can be translated at step 1610. For example, the device data may be formatted using a device profile, communication protocol, or various other formats to communicate device data using a wireless energy network. At block 1610, device data can be translated into another format to use by another system, process, device, etc. other than the wireless energy network. For example, Zigbee formatted data can be translated into XML encoded data. According to another aspect, device data can be translated to an data object, such as a Java object and the like. Various other translations can also be used.

The method can then proceed to block 1612 and a report interval can be detected. According to an aspect, a report interval can include an interval that may be the same as the acquisition interval, greater than the acquisition interval, or less than the acquisition interval. According to a particular aspect, the report interval can be twice as long as the acquisition interval. As such, exact timing of when to acquire device data can be obviated as at least one data acquisition may be available to generate a report.

At decision block 1614, if a report interval should not be updated, the method can proceed to block 1618 as described below. If a report interval should be updated, the method can proceed to block 1616 and an updated report interval may be obtained. According to an aspect, a report interval can be provided using a data acquisition interval. For example, a report interval can be updated in association with an acquisition interval being updated. In other forms, a report interval can be provided and updated without an acquisition interval being updated. Various combinations of updating a report interval, acquisition interval, or any combination thereof can be used. Upon updating a report interval, the method can proceed to block 1618.

According to an aspect, at block 1618 report data can be generated. For example, report data can include data that can be provided within a site report and can be formatted in various ways. For example, report data can include a XML encoded data, Java objects, textual data or various combinations thereof. According to an aspect, network device data can be converted to a binary representation. For example, to reduce the amount of information to be communicated, a binary representation can include one or more binary bits within a data field that can represent portions or all of the network device data. According to a further aspect, report data can be stored on a device basis until a site report can be generated.

Upon generating report data, the method can proceed to block 1620 and generates a site report. For example, a site report can include data received from one or more network devices. In another form, site report data can include data from another source, device, network, or any combination thereof capable of providing data that can be used within a site report. For example, a home controller may include a data and time setting based on a current time zone. A network device may not have a current or updated date and time stamp provided with the network device data. As such, a current date and time stamp can be provided with the site report data. In other forms, data obtained from another source (e.g. WIFI network, AMI network, WiMax network, etc.) can be provided within a site report. For example, a site report can include network device data that includes a thermostat or HVAC system being placed in an 'on' condition. Additionally, an AMI network can be accessed to detect a current energy consumption level, rate, price, savings or various other types of information that can be provided using an AMI network. The AMI network data can be combined with the network device data within a site report. As such, subsequent processing of site reports can include additional information that can be processed into a rite report to manage and report energy use at a site. Other types and combinations of EMI data from various network locations can be included within a site report as needed or desired.

Upon generating a site report, the method can proceed to block 1622 and a network connection can be initiated. For example, a rested web services approach to making a network connection can be deployed to realize increased network security at a site. For example, a home controller can be used to initiate a network connection using a LAN, broadband network, wireless data network, WiMax network, WIFI network, or various other networks or combinations of networks. A specific network location can be accessed on a secure basis using SSL or other encryption methods. At decision block 1624, if a network may not be available, the method can proceed to block 1626 and store the site report until the network may become available. The method can then proceed to block 1608 as described herein. If at decision block 1624 a network location may be available, the method can proceed to block 1630 and initiates a transfer of a site report. According to an aspect, if multiple site reports are available, the method can initiate a transfer of the multiple site reports.

Upon initiating transfer of the site reports, the method can proceed to block 1632 and can initiate processing site report data at a network location. For example, a network location can include a server configured to process site report data and store site report data within a database. Additional processing of the data can be realized as needed or desired. For example, server 602 described in FIG. 6 includes several modules that can be used to process site report data.

Upon initiating processor of site report data, the method can processed to decision block 1634 to detect if a control action may be available. For example, a control action field or flag associated with a specific site and one or more network devices can be provided within a database or other storage location. In another form, one or more binary values can be used to indicate if control action data be available. If control action may be available, the method can proceed to block 1636 and a control action can be received. For example, a control action can be communicated during a session and can include one or more actions associated with a network device accessible at a site. According to an aspect, a control action can be encoded based on a profile, (e.g. Zigbee Profile, Smart Energy Profile, Home Automation, etc.). In other forms, a control action can be formatted as XML encoded data, HTML encoded data, proprietary data format, or any combination thereof.

Upon receiving a control action at block 1636, or if a control action may not be available, the method can proceed to decision block 1638 and detects if an interval should be updated. For example, a acquisition interval, report interval, or any combination thereof can be available. If an interval should be updated, the method can proceed to block 1640 and one or more intervals can be received and updated. According to an aspect, if an interval may be updated, an update flag can be set to indicate a new or updated interval can be used. In other forms, a current interval field can be updated with a new interval value. If at decision block 1638, an interval may not be updated, the method can proceed to decision block 1642 as described below.

According to an aspect, at decision block 1642 the method can detect if an update may be available. For example, an update can include one or more new or updated profiles that can be used at a site in association with an energy network. In another form, a software or firmware update can be available to update a network device, home controller, or various other systems, apparatuses, methods, devices, or any combination thereof that can be used at a site. If an update may be available, the method can proceed to block 1644 and a method can be received and processed at block 1646 as needed or desired. According to an aspect, an update may be available at another network location. As such, the method can be modified to include an update available flag or data, and another network location can be accessed to receive an update. If at decision block 1642 an update may not be available, the method can proceed to block 1648 as needed or desired.

According to an aspect, at block 1648, the method can disconnect from a network location and proceed to block 1650. If a control action may have been received, the method can processor the control action data, and proceed to block 1652 to detect a control action within the control action data.

According to an aspect, a control action can include various combinations of actions such as obtaining or reading an operating status or value of one or more network device attributes, altering an operating condition of network device, updating an operating schedule of a network device, or various other control actions as needed or desired. In another form, control action data can be stored within a memory and deployed based on a schedule. As such, a period of time (e.g. twelve hours, twenty four hours, etc.) can be stored and deployed in the event of a information network failure at a site.

Upon detecting control action data, the method can proceed to block 1654 and can process control action data. For example, if control action data should be stored, the method can store control action data and deploy at a later time. In another form, control action data can be processed into a format that can be used to output network device data. For example, control action data can be processed into one or more JAVA objects, XML files, or other formats to include a received control action data of a specific device. According to an aspect, a network device can include a specific profile to access features of a network device. As such, control action data can be processed based on a specific profile.

Upon processing control action data, the method can proceed to block 1656 and the processed control action data can be generated into network device data. For example, a network may be deployed to provide an energy network at a site. As such, a protocol to communicate device data as network device data can be deployed. In other forms, a communication device can be coupled to a USB port, UART port, SPI port, other buses, or combinations thereof. As such, control action data can be formatted into a format that can be communicated using a specific bus having a wireless network device or module coupled to a bus. For example, for example. At block 1656 network device data can be formatted to be communicated using a USB bus having Zigbee communication module coupled to the USB bus. In other forms, a network device, such as a wireless WIFI device can be coupled to a UART bus and accessed to output control action data. Upon generating network device data, the method can proceed to block 1658 and the network device data can be output to a communication module that can output the control action data to the network device. The method can then proceed to block 1660, and to block 1602 as needed or desired.

According to another aspect, the present disclosure and include an installation system and method configured to install a system at a site. For example, FIG. 6 described herein includes controller 626 and thermostat 628 installed at a site 604. Installation can include controller 626 including a serial number (not expressly illustrated in FIG. 6), or other unique identifier. Thermostat 628 can also include a serial number (not expressly illustrated in FIG. 6) or other unique identifier. Upon a user or agent installing controller 626, an identifier of controller 626, thermostat 628, or any combination thereof, can be communicated to server 602 to authenticate site 604 and enable energy management at site 604.

According to another aspect, an installation can include controller 626 requesting a list of valid identifiers of one or more network devices that can be installed at site 604. For example, controller 626 can receive a list of one or more valid network devices that may be installed at site 604, and can validate one or more installed devices. For example, controller 626 can detect a network device accessible using an energy network deployed at site 604. A network device can communicate an identifier and controller 626 can detect whether the communicated identifier may be within the list communicated by server 602. As such, an agent that may have an inventory of network devices, controllers, or any combination thereof can install a controller and a network device without having to determine a valid serial number.

According to a further aspect, an installation can include using a mobile device including installation logic, one or more applications, settings, or any combination thereof. For example, mobile device 632 illustrated in FIG. 6 or other mobile devices or systems can be used to install portions or all of an energy management system at site 604. For example, a user can deploy an energy management application on mobile device 632 and can input a serial number or other identifier to into an energy management application. In this manner, a user may modify network devices installed at site 604 by for example, adding new devices, updating new devices, deleting current devices, receiving software updates using a serial number of an installed device, or various combinations thereof. According to a further aspect, an installation, settings, and the like can include prompting a user to use a GPS location in connection with an installation and site 604. As such, a user need not type in an address and can just select a current location to associate mobile device 632 and site 604.

According to another aspect, an installation can include using RFID, bar code, network scan, or various other hands-free identification processes. For example, mobile device 632 can include an energy management application that can include an installation or set-up that includes reading a bar code label of controller 626, TSTAT 628, various other network devices, or any combination thereof. For example, a user can scan a barcode that can include a unique identifier of controller 626, TSTAT 628, or any combinations thereof. According to an aspect, a bar code label can be affixed to a portion of a housing (not expressly illustrated in FIG. 6). In other forms, a bar code can be accessed using a display, such as a display of TSAT 626 or other network devices or systems that can display one or more bar codes (e.g. outputting multiple at a single system, network device, installation sheet or stickers, etc.). Upon a user scanning a bar code label, the installation process can use a network connection, such as WIFI or other wireless data networks to communicate unique data and authenticate a system. An server, such as server 602 can authenticate the data and activate a user's account. According to an aspect, a user can also set a location using a current GPS location of mobile device 632 at site 604. In this manner, and installation process that can include authenticating or activating software on a mobile device, a home controller, a network device, and a server account can be coordinated in an efficient manner thereby reducing the need to have an installation technician or other third party activate an account. Various combinations of associating devices, systems, controllers, mobile devices, etc. can be used to activate portions or all of an energy network using hands-free RF, optical scanning devices, or any combination thereof. According to a further aspect, an installation can be modified to allow a third party technician install a system and can include scanning one or more bar codes that may be affixed to a network device, controller, etc. In other forms, a third party technician can scan bar code labels or other devices and affix the labels to a device, controller, system, etc. in association with an installation. As such, inventory management can also be maintained in association with installing a controller, network device, system, etc.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of managing a site in a mobile environment, comprising:
   detecting an availability of a thermostat wherein the thermostat has an operating condition;
   detecting a location of a mobile device associated with the site;
   providing a proximity control selector within a user interface of the mobile device to manage a proximity detection module disposed on the thermostat, wherein the proximity control selector has an enabled setting of the proximity detection module and a disabled setting of the proximity detection module;
   enabling the proximity detection module in response to the enabled setting of the proximity control selector to allow for the modification of the operating condition of the thermostat based on the detected location of the mobile device relative to the site; and disabling the proximity detection module in response to the disabled setting of the proximity control selector.

2. The method of claim 1, further comprising:
altering an operating condition of the thermostat in response to the enabled proximity detection module and the detected location.

3. The method of claim 2, further comprising:
detecting an availability of a second thermostat; and
altering an operating condition of the second thermostat in response to the detected location and the enabled proximity detection module.

4. The method of claim 1, wherein the enabled proximity control selector is an away setting and the enabled proximity detection module is an away mode and the disabled proximity control selector is a home setting and the disabled proximity detection module is a home mode.

5. The method of claim 4, further comprising:
detecting a setting change of the proximity control selector of the first mobile device; and
communicating the setting change to the network location.

6. The method of claim 1, further comprising:
providing a network location configured to store location information of a plurality of mobile devices including a first mobile device and a second mobile device;
detecting a first location information of the first mobile device relative to the site;
detecting a second location information of the second mobile device relative to the site;
communicating the first location information of the first mobile device and the second distance information of the second mobile device to the network location to be compared; and
initiating a change to the operating condition of the thermostat if a change in the first location of the first mobile device is different than a change in the second location of the second mobile device.

7. The method of claim 1, further comprising:
initiating a reporting interval from the mobile device to a network location in response to the distance; and
initiating communication of a control of the operating mode using the reporting interval and the distance.

8. The method of claim 1, further comprising:
receiving site information of the site at the mobile device;
presenting the site information within the user interface of the mobile device; and
presenting a current settings section within the user interface; and
enabling selection of the current settings section to control the operating condition of the thermostat.

9. The method of claim 1, further comprising;
detecting the availability of a first network location and a second network location, wherein the second network location is different than the first network location;
initiating access of the first network location to detect the operating condition of the thermostat;
initiating access to a second network location to store the distance of the mobile device relative to the site; and
initiating a communication of a control action to the first network location to alter the operating condition of the thermostat.

10. The method of claim 9, further comprising:
initiating access to the second network location to detect a distance of the first mobile device relative to a distance of a second mobile device associated with the site;
initiating access to the first network location to alter the operating condition of the thermostat if the first mobile device is closer to the site than the second mobile device;
storing an updated operating condition within the first mobile device; and
initiating an update of the operating condition at the first network location.

11. The method of claim 1, further comprising:
detecting an availability of a WIFI network including a device connected to the WIFI network;
accessing the device using the WIFI network to detect an operating condition of the device; and
initiating an altering of the operating condition of the network device using the WIFI network.

* * * * *